(12) United States Patent
Vandike et al.

(10) Patent No.: US 12,302,788 B2
(45) Date of Patent: May 20, 2025

(54) RESIDUE CHARACTERISTIC CONFIDENCE AND CONTROL

(71) Applicant: Deere & Company, Moline, IL (US)

(72) Inventors: Nathan R. Vandike, Geneseo, IL (US); Andrew J Peterson, Geneseo, IL (US); Duane M. Bomleny, Geneseo, IL (US)

(73) Assignee: Deere &Company, Moline, IL (US)

( * ) Notice: Subject to any disclaimer, the term of this patent is extended or adjusted under 35 U.S.C. 154(b) by 274 days.

(21) Appl. No.: 17/716,283

(22) Filed: Apr. 8, 2022

(65) Prior Publication Data

US 2023/0320274 A1   Oct. 12, 2023

(51) Int. Cl.
| A01D 41/127 | (2006.01) |
| A01D 41/06 | (2006.01) |
| A01D 41/14 | (2006.01) |

(52) U.S. Cl.
CPC ......... *A01D 41/1278* (2013.01); *A01D 41/06* (2013.01); *A01D 41/1274* (2013.01); *A01D 41/141* (2013.01)

(58) Field of Classification Search
CPC ................ A01D 41/1278; A01D 41/06; A01D 41/1274; A01D 41/141; A01D 41/127; G06V 10/26; G06V 10/764; G06V 20/188; G06V 20/56; A01B 79/005
See application file for complete search history.

(56) References Cited

U.S. PATENT DOCUMENTS

| 2,020,027 | A | 11/1935 | Gore |
| 7,266,477 | B2 | 9/2007 | Foessel |
| 7,272,474 | B1 | 9/2007 | Stentz et al. |
| 7,822,266 | B2 | 10/2010 | Wellington et al. |
| 7,995,637 | B2 | 8/2011 | Wellington et al. |
| 7,995,837 | B2 | 8/2011 | Wellington et al. |
| 8,364,366 | B2 | 1/2013 | Foessel et al. |

(Continued)

FOREIGN PATENT DOCUMENTS

| BR | 102020024925 A2 | 2/2022 |
| BR | 102020026350 A2 | 7/2022 |

(Continued)

OTHER PUBLICATIONS

Extended European Search Report and Written Opinion issued in European Patent Application No. 23161583.2, dated Oct. 16, 2023, in 08 pages.

(Continued)

*Primary Examiner* — James M McPherson
*Assistant Examiner* — Kyle J Kingsland
(74) *Attorney, Agent, or Firm* — Kelly, Holt & Christenson; Joseph R. Kelly

(57) ABSTRACT

An agricultural system obtains a residue map that maps residue characteristics of a field, wherein the residue map is based on data collected at or prior to a first time. The agricultural system obtains supplemental data indicative of characteristics relative to the worksite, the supplemental data collected after the first time. A residue characteristic confidence output, indicative of a confidence level in the residue characteristics indicated by the residue map, is generated based on the residue map and the supplemental data. In some examples, a mobile machine is controlled based on the residue characteristic confidence output.

15 Claims, 19 Drawing Sheets

(56) References Cited

U.S. PATENT DOCUMENTS

| | | |
|---|---|---|
| 8,768,667 B2 | 7/2014 | Lindores |
| 9,009,087 B1 | 4/2015 | Mewes et al. |
| 9,076,118 B1 | 7/2015 | Mewes et al. |
| 9,087,312 B1 | 7/2015 | Mewes et al. |
| 9,113,590 B2 | 8/2015 | Johnson |
| 9,140,824 B1 | 9/2015 | Mewes et al. |
| 9,226,449 B2 | 1/2016 | Bischoff |
| 9,292,796 B1 | 3/2016 | Mewes et al. |
| 9,311,605 B1 | 4/2016 | Mewes et al. |
| 9,336,492 B1 | 5/2016 | Mewes et al. |
| 9,518,753 B2 | 12/2016 | Mewes et al. |
| 9,564,098 B2 | 1/2017 | Casper et al. |
| 9,585,309 B2 | 3/2017 | Posselius et al. |
| 9,615,501 B2 | 4/2017 | Pickett et al. |
| 9,615,601 B2 | 4/2017 | Pickett et al. |
| 9,872,433 B2 | 1/2018 | Acheson et al. |
| 9,881,497 B2 | 1/2018 | Chen et al. |
| 10,524,409 B2 * | 1/2020 | Posselius ............... A01C 7/205 |
| 10,761,544 B2 | 9/2020 | Anderson et al. |
| 10,829,033 B1 | 11/2020 | McKinney et al. |
| 11,222,299 B1 | 1/2022 | Baalke et al. |
| 2007/0156318 A1 | 7/2007 | Anderson et al. |
| 2008/0059015 A1 | 3/2008 | Whittaker et al. |
| 2008/0140431 A1 | 6/2008 | Anderson et al. |
| 2008/0177449 A1 | 7/2008 | Pickett et al. |
| 2011/0153172 A1 | 6/2011 | Anderson |
| 2015/0302305 A1 | 10/2015 | Rupp et al. |
| 2016/0078570 A1 | 3/2016 | Ethington et al. |
| 2016/0202679 A1 | 7/2016 | Bermudez Rodriguez et al. |
| 2016/0215994 A1 | 7/2016 | Mewes et al. |
| 2017/0061050 A1 | 3/2017 | Mewes et al. |
| 2017/0061299 A1 | 3/2017 | Newes et al. |
| 2017/0127606 A1 | 5/2017 | Horton |
| 2017/0258005 A1 | 9/2017 | Cutter |
| 2018/0139898 A1 | 5/2018 | Shearer |
| 2018/0239991 A1 | 8/2018 | Weller et al. |
| 2018/0325015 A1 | 11/2018 | Wolters et al. |
| 2019/0009905 A1 | 1/2019 | Kaechi |
| 2019/0050948 A1 | 2/2019 | Perry et al. |
| 2019/0155275 A1 | 5/2019 | Akamatsu et al. |
| 2019/0307070 A1 | 10/2019 | Dima et al. |
| 2019/0335661 A1 | 11/2019 | Seiders, Jr. |
| 2019/0392263 A1 * | 12/2019 | Ferrari ................ G06F 18/2431 |
| 2020/0012415 A1 | 1/2020 | Miller et al. |
| 2020/0128734 A1 | 4/2020 | Brammeier et al. |
| 2020/0184214 A1 | 6/2020 | Casas et al. |
| 2020/0236853 A1 | 7/2020 | Trowbridge |
| 2020/0271458 A1 | 8/2020 | Berry et al. |
| 2020/0326727 A1 | 10/2020 | Palla et al. |
| 2020/0337240 A1 | 10/2020 | Brimeyer et al. |
| 2020/0359562 A1 | 11/2020 | Hunt et al. |
| 2020/0375107 A1 | 12/2020 | Duerksen et al. |
| 2020/0390035 A1 | 12/2020 | Hunt et al. |
| 2021/0034867 A1 | 2/2021 | Ferrari et al. |
| 2021/0049901 A1 | 2/2021 | Young et al. |
| 2021/0059117 A1 | 3/2021 | Hunt et al. |
| 2021/0079627 A1 | 3/2021 | Subramanian |
| 2021/0102713 A1 | 4/2021 | Kageyama et al. |
| 2021/0120738 A1 | 4/2021 | Ricketts et al. |
| 2021/0176916 A1 | 6/2021 | Sidon et al. |
| 2021/0185877 A1 | 6/2021 | Hunt et al. |
| 2021/0185879 A1 | 6/2021 | Hunt et al. |
| 2021/0185880 A1 | 6/2021 | Martin et al. |
| 2021/0185916 A1 | 6/2021 | Hunt et al. |
| 2021/0185917 A1 | 6/2021 | Hunt et al. |
| 2021/0185919 A1 | 6/2021 | Hunt et al. |
| 2021/0212248 A1 | 7/2021 | Kong et al. |
| 2021/0212254 A1 | 7/2021 | Thomas et al. |
| 2021/0235622 A1 | 8/2021 | Baumgarten et al. |
| 2021/0237982 A1 | 8/2021 | Trowbridge et al. |
| 2021/0272255 A1 * | 9/2021 | Barrick ................ G06V 20/188 |
| 2021/0289702 A1 | 9/2021 | Jung et al. |
| 2021/0289703 A1 | 9/2021 | Hunt et al. |
| 2021/0302969 A1 | 9/2021 | Palla et al. |
| 2021/0307234 A1 | 10/2021 | Jongmans et al. |
| 2021/0307235 A1 | 10/2021 | Jongmans et al. |
| 2021/0307248 A1 | 10/2021 | Missotten et al. |
| 2021/0307249 A1 | 10/2021 | Jongmans et al. |
| 2021/0329837 A1 | 10/2021 | Schnaider et al. |
| 2021/0392814 A1 | 12/2021 | Verhoef et al. |
| 2021/0404829 A1 | 12/2021 | St. Romain et al. |
| 2022/0000023 A1 | 1/2022 | Du et al. |
| 2022/0000024 A1 | 1/2022 | Zielke et al. |
| 2022/0053693 A1 | 2/2022 | Gahres et al. |
| 2022/0061218 A1 | 3/2022 | Karst |
| 2022/0071093 A1 | 3/2022 | Risius |
| 2022/0087101 A1 | 3/2022 | Hunt et al. |
| 2022/0117143 A1 | 4/2022 | Kraus et al. |
| 2022/0167556 A1 | 6/2022 | Peters et al. |
| 2022/0183229 A1 | 6/2022 | Hunt |
| 2022/0225569 A1 | 7/2022 | Zielke et al. |
| 2022/0232770 A1 | 7/2022 | Yanke et al. |
| 2022/0240446 A1 | 8/2022 | Martin et al. |
| 2022/0264798 A1 | 8/2022 | Martin et al. |
| 2022/0304228 A1 | 9/2022 | Hunt et al. |
| 2022/0312676 A1 | 10/2022 | Reubens et al. |
| 2022/0338416 A1 | 10/2022 | Racchella et al. |
| 2022/0354056 A1 | 11/2022 | Hunt et al. |
| 2022/0369556 A1 | 11/2022 | Yanke et al. |
| 2022/0369557 A1 | 11/2022 | Hunt et al. |
| 2022/0369558 A1 | 11/2022 | Scharmann et al. |
| 2022/0377978 A1 | 12/2022 | Laugen et al. |
| 2022/0394927 A1 | 12/2022 | Seiders, Jr. |
| 2022/0394928 A1 | 12/2022 | Seiders, Jr. |
| 2022/0400611 A1 | 12/2022 | Missotten et al. |

FOREIGN PATENT DOCUMENTS

| | | | |
|---|---|---|---|
| CA | 3075884 A1 * | 4/2019 | ............ A01B 49/06 |
| CA | 3079392 A1 * | 11/2020 | ........... A01B 17/002 |
| CN | 106461807 B | 10/2019 | |
| CN | 111226603 A | 6/2020 | |
| CN | 111436276 A | 7/2020 | |
| CN | 111819993 A | 10/2020 | |
| CN | 111903317 A | 11/2020 | |
| CN | 111990062 A | 11/2020 | |
| CN | 212413857 U | 1/2021 | |
| CN | 212589003 U | 2/2021 | |
| CN | 112690089 A | 4/2021 | |
| CN | 113016358 A | 6/2021 | |
| CN | 113099836 A | 7/2021 | |
| CN | 113228939 A | 8/2021 | |
| CN | 113243194 A | 8/2021 | |
| CN | 113607096 A | 11/2021 | |
| CN | 113661827 A | 11/2021 | |
| CN | 214902224 U | 11/2021 | |
| CN | 113966667 A | 1/2022 | |
| CN | 114187353 A | 3/2022 | |
| CN | 114223386 A | 3/2022 | |
| CN | 114303621 A | 4/2022 | |
| CN | 114342665 A | 4/2022 | |
| CN | 114467504 A | 5/2022 | |
| CN | 114631426 A | 6/2022 | |
| CN | 216930906 U | 7/2022 | |
| CN | 114916306 A | 8/2022 | |
| CN | 115067062 A | 9/2022 | |
| EP | 2169507 B1 | 11/2015 | |
| EP | 3643159 A1 | 4/2020 | |
| EP | 3885870 A1 | 9/2021 | |
| EP | 3900512 A1 | 10/2021 | |
| IN | 202021036612 A | 8/2020 | |
| WO | 2016090212 A1 | 6/2016 | |
| WO | 2016118684 A1 | 7/2016 | |
| WO | 2016118685 A1 | 7/2016 | |
| WO | 2016118686 A1 | 7/2016 | |
| WO | 2021062552 A1 | 4/2021 | |
| WO | 2021123963 A1 | 6/2021 | |
| WO | 2021133758 A1 | 7/2021 | |
| WO | 2021217112 A1 | 10/2021 | |
| WO | 2021222592 A1 | 11/2021 | |
| WO | 2021242867 A1 | 12/2021 | |
| WO | 2022003457 A1 | 1/2022 | |
| WO | 2022040765 A1 | 3/2022 | |
| WO | 2022040769 A1 | 3/2022 | |

(56) References Cited

FOREIGN PATENT DOCUMENTS

| WO | 2022077122 | A1 | 4/2022 |
|---|---|---|---|
| WO | 2022147601 | A1 | 7/2022 |
| WO | 2022212355 | A2 | 10/2022 |
| WO | 2022232244 | A1 | 11/2022 |
| WO | 2023278658 | A1 | 1/2023 |

OTHER PUBLICATIONS

U.S. Appl. No. 17/086,756 Office Action dated Aug. 30, 2022, 13 pages.
U.S. Appl. No. 17/086,756 Non Final Office Action dated Jun. 13, 2023, 15 pages.
U.S. Appl. No. 17/086,756 Final Office Action dated Feb. 21, 2023, 16 pages.
Non Final Office Action for U.S. Appl. No. 17/086,756 dated Nov. 1, 2023, 16 pages.
U.S. Appl. No. 17/086,756 Non Final Office Action dated Dec. 22, 2022, 17 pages.
U.S. Appl. No. 17/086,756 Notice of Allowance dated Jun. 11, 2024, 7 pages.
Renschler and Harbor. "Soil erosion assessment tools from point to regional scales—the role of geomorphologists in land management research and implementation", Geomorphology 47 (2002) 21 pages.
Gelder et al. "The Daily Erosion Project—daily estimates of water runoff, soil detachment, and erosion". Earth Surface Processes and Landlorms 43 (Apr. 2018) 13 pages.
Wikipedia "Soil Erosion" https://en.wikipedia.org/wiki/Sail_erosion. [Retrieved on Oct. 29, 2020] 20 pages.
U.S. Appl. No. 17/086,756 Application and Drawings, filed Nov. 2, 2020, 80 pages.
Overheu et al. Water erosion in the agricultural region of Western Australia, last updated Feb. 18, 2019 [retrieved on Aug. 27, 2024] 10 pages. Retrieved from the Internet. <https://web.archive.org/web/20200413233055/https://www.agric.wa.gov.au/water-erosion/water-erosion-agricultural-region-western-australia>.
U.S. Appl. No. 17/346,993 Application and Drawings filed Jun. 14, 2021, 127 pages.
U.S. Appl. No. 17/346,993 Non-Final Office Action dated Jan. 4, 2024, 31 pages.
U.S. Appl. No. 17/346,993 Non-Final Office Action dated Aug. 18, 2023, 16 pages.
U.S. Appl. No. 17/346,993 Final Office Action dated May 9, 2023, 16 pages.
U.S. Appl. No. 17/346,993 Non-Final Office Action dated Jan. 5, 2023, 24 pages.
U.S. Appl. No. 17/346,993 Non-Final Office Action dated Jan. 4, 2024, 17 Pages.

* cited by examiner

RESIDUE CHARACTERISTIC CONFIDENCE AND CONTROL

FIELD OF THE DESCRIPTION

The present description generally relates to the use of a wide variety of different mobile work machines in a variety of operations. More specifically, the present description relates to the use of computing systems in improving control and performance of the various different agricultural work machines in various agricultural operations.

BACKGROUND

There are a wide variety of different types of machines, such as agricultural machines, forestry machines, and construction machines. These types of machines are often operated by an operator and have sensors that generate information during operation. Additionally, the operators of these types of machines can rely on various data relative to a worksite for the control and operation of the various types of machines, for example, a map of the worksite that shows characteristics across the worksite.

Agricultural machines can include a wide variety of machines such as harvesters, material application machines, such as sprayers, planting machines, such as planters or air seeders, tillage machines, among others. Agricultural machines can be operated by an operator and have many different mechanisms that are controlled by the operator. The machines may have multiple different mechanical, electrical, hydraulic, pneumatic, electromechanical (and other) subsystems, some or all of which can be controlled, at least to some extent, by the operator. Some or all of these subsystems may communicate information that is obtained from sensors on the machine (and from other inputs). Additionally, the operator may rely on the information communicated by the subsystems as well as various types of other information, such as agricultural characteristic data, for the control of the various subsystems. For example, an operator may rely on agricultural characteristic information, such as an agricultural characteristic map of a field, for setting or controlling various parameters of various subsystems of the agricultural machine. In other examples, the agricultural machine may have a level of autonomy such that the operator plays a supervisory role in machine operation.

The accuracy and freshness of the information provided to the operator can be important to ensure that the operational parameters of the machines are set to desired levels. Current systems can experience difficulty in providing accurate and fresh information to the operator for the purpose of controlling machines settings.

The discussion above is merely provided for general background information and is not intended to be used as an aid in determining the scope of the claimed subject matter.

SUMMARY

An agricultural system obtains a residue map that maps residue characteristics of a field, wherein the residue map is based on data collected at or prior to a first time. The agricultural system obtains supplemental data indicative of characteristics relative to the worksite, the supplemental data collected after the first time. A residue characteristic confidence output, indicative of a confidence level in the residue characteristics indicated by the residue map, is generated based on the residue map and the supplemental data. In some examples, a mobile machine is controlled based on the residue characteristic confidence output.

Example 1 is a method of controlling a mobile agricultural machine, comprising:

obtaining a residue map of a worksite that maps values of a residue characteristic to different geographic locations in a worksite, wherein the residue map is based on data collected at or prior to a first time;

obtaining supplemental data indicative of a characteristic relative to the worksite, the supplemental data collected after the first time;

generating a residue characteristic confidence output indicative of a confidence level in the values of the residue characteristic of the worksite as indicated by the residue map, based on the residue map and the supplemental data; and generating an action signal to control an action of the mobile agricultural machine based on the residue characteristic confidence output.

Example 2 is the method of any or all previous examples, wherein generating the residue characteristic confidence output further comprises:

determining the confidence level, wherein the confidence level is indicative of a likelihood that a value of the residue characteristic of the worksite, as indicated by the residue map, has changed; and generating a representation of the confidence level.

Example 3 is the method of any or all previous examples, wherein generating the residue characteristic confidence output comprises:

generating a map of the worksite that includes an indication of the confidence level.

Example 4 is the method of any or all previous examples, wherein generating the residue characteristic confidence output comprises:

determining a plurality of confidence levels, wherein each one of the plurality of confidence levels is indicative of a likelihood that a value of the residue characteristic of a corresponding one of a plurality of geographic locations within the worksite, as indicated by the residue map, has changed.

Example 5 is the method of any or all previous examples, and further comprising:

determining a plurality of confidence zones, each one of the plurality of confidence zones corresponding to a respective one of the plurality of confidence levels, wherein an operation of the mobile agricultural machine is based on a presence of the mobile agricultural machine in one of the plurality of confidence zones.

Example 6 is the method of any or all previous examples, wherein generating an action signal to control an action of the mobile agricultural machine comprises:

controlling the mobile agricultural machine to collect additional data corresponding to the worksite.

Example 7 is the method of any or all previous examples, wherein generating an action signal to control an action of the mobile agricultural machine comprises:

controlling an actuator of the mobile agricultural machine to drive movement of a component of the mobile agricultural machine to change a position of the component relative to a surface of the worksite.

Example 8 is the method of any or all previous examples, wherein generating an action signal to control an action of the mobile agricultural machine comprises:

controlling a propulsion subsystem of the mobile agricultural machine to control a speed at which the mobile agricultural machine travels over the worksite.

Example 9 is the method of any or all previous examples, wherein generating an action signal to control an action of the mobile agricultural machine comprises:

controlling a steering subsystem of the mobile agricultural machine to control a heading of the mobile agricultural machine as it travels over the worksite.

Example 10 is the method of any or all previous examples, wherein generating an action signal to control an action of the mobile agricultural machine comprises:

controlling an interface mechanism communicably coupled to the mobile agricultural machine to provide an indication of the residue characteristic confidence output.

Example 11 is an agricultural system comprising:

a control system comprising:

a residue characteristic confidence system configured to:

obtain a residue map of a worksite that indicates a residue characteristic of the worksite, wherein the residue map is based on data collected at or prior to a first time;

obtain supplemental data indicative of a characteristic relative to the worksite, the supplemental data collected after the first time; and generate a residue characteristic confidence output indicative of a confidence level in the residue characteristic of the worksite as indicated by the residue map, based on the residue map and the supplemental data; and an action signal generator configured to generate an action signal based on the residue characteristic confidence output.

Example 12 is the agricultural system of any or all previous examples, wherein the residue characteristic confidence system further comprises:

a residue characteristic change detector that determines a likelihood that the residue characteristic of the worksite, as indicated by the residue map, has changed based on the supplemental data; and a residue characteristic confidence analyzer that determines the residue characteristic confidence level based on the likelihood that the residue characteristic of the worksite, as indicated by the residue map, has changed.

Example 13 is the agricultural system of any or all previous examples, wherein the residue characteristic confidence output includes a representation of the residue characteristic confidence level.

Example 14 is the agricultural system of any or all previous examples, wherein the residue characteristic confidence system further comprises:

a map generator that generates a map of the worksite that includes an indication of the residue characteristic confidence level.

Example 15 is the agricultural system of any or all previous examples, wherein the action signal is provided to an actuator of the mobile agricultural machine to drive movement of a component of the mobile agricultural machine.

Example 16 is the agricultural system of any or all previous examples, wherein the action signal is provided to a propulsion subsystem of the mobile agricultural machine to control a speed at which the mobile agricultural machine travels over the worksite.

Example 17 is the agricultural system of any or all previous examples, wherein the action signal is provided to a steering subsystem of the mobile agricultural machine to control a heading of the mobile agricultural machine as the mobile agricultural machine travels over the worksite.

Example 18 is the agricultural system of any or all previous examples, wherein the action signal is provided to an interface mechanism to provide a recommendation to collect additional data corresponding to the worksite.

Example 19 is the agricultural system of any or all previous examples, wherein the residue map indicates a plurality of residue characteristics that includes a first residue characteristic and a second residue characteristic;

wherein the control system is configured to generate the residue characteristic confidence output indicative of a confidence level in the first residue characteristic of the worksite, as indicated by the residue map, based on the supplemental data and based on the second residue characteristic as indicated by the residue map.

Example 20 is a mobile agricultural machine comprising:

a controllable subsystem; and a control system configured to:

obtain a residue map of a worksite that indicates values of a residue characteristic at different geographic locations in the worksite, wherein the residue map is based on data collected at or prior to a first time;

obtain supplemental data indicative of one or more characteristics relative to the worksite, the supplemental data generated after the first time;

generate a residue characteristic confidence output indicative of a confidence level in the values of the residue characteristic as indicated by the residue map, based on the residue map and the supplemental data; and generate an action signal to control the controllable subsystem based on the residue characteristic confidence output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
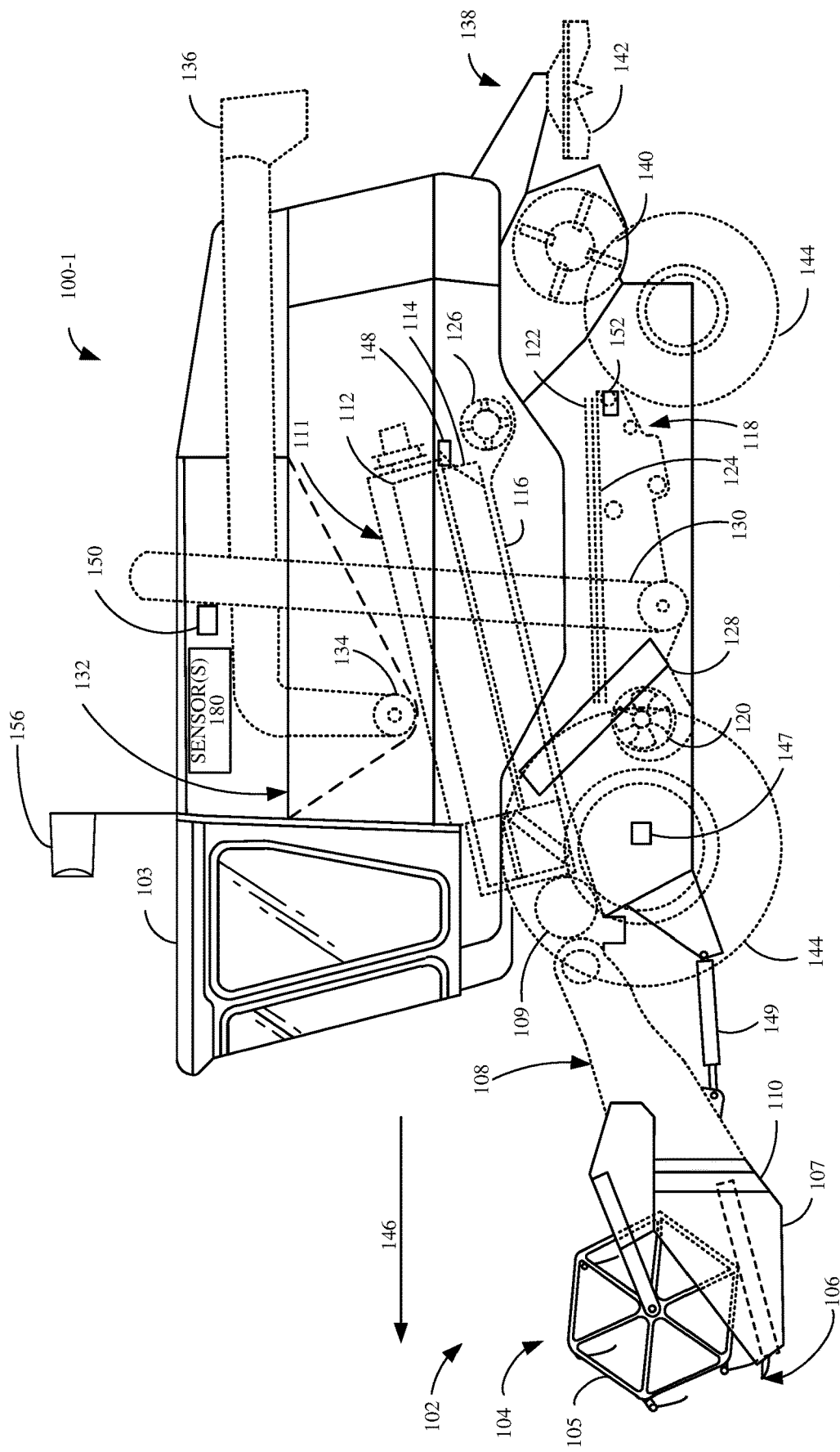
FIG. 1 is a partial pictorial, partial schematic illustration showing one example of a mobile agricultural machine, as a mobile harvesting machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In current agricultural systems, the autonomous controls and human operators of various agricultural machines can rely on maps of the worksite (e.g., field) upon which they operate for the purpose of controlling machine settings and various other operating parameters. These maps can include representations, such as values (e.g., predictive values, estimated values, measured values, etc.), of various different characteristics. One example of a map is a residue map that maps residue characteristics (or values thereof) to different geographic locations across the field. Residue characteristics can include presence, level (amount), distribution, residue size, residue direction (e.g., crop/stubble row direction), residue orientation (e.g., standing, leaning, lying, etc.), as well as various other characteristics. Residue mappings can take various data into account, for predicting, estimating, identifying, determining, etc., the residue characteristics. For example, sensor data collected during a previous operation on the field of interest may be used to generate the residue map. For instance, sensed parameters of the residue handling subsystem of an agricultural harvester may indicate characteristics of the residue on the field, such as the amount and distribution of the residue. Other machines, performing other operations may be outfitted with sensors (e.g., cameras, optical sensors, etc.) that detect residue characteristics at the field. In other examples, aerial images of the field of interest, such as aerial images generated by sensors on satellites, drones, and various other aerial vehicles, may be used to generate the residue map. For instance, an aerial vehicle may be outfitted with one or more sensors that detect wavelengths of electromagnetic radiation that is reflected from the field to indicate the presence, amount, and distribution of residue on the field.

The various data used for the residue mapping is often collected prior to a current operation in which the residue map is to be used, such as during a previous operation on the field or during an aerial survey of the field. While the residue map can be made with accuracy at the time the data is collected and can include predictive, estimated, measured, identified, and/or determined values of residue characteristics, in the passage of time between conducting the survey or previous operation (or both) and the current operation to be conducted on the field, anomalies and/or events can occur that can dynamically alter the residue characteristics of the field (as well as other characteristics of the field). For example, wind may shift (or move) residue from one location to another. In another example, heavy precipitation or water run-off may shift (or move) residue from one location to another. These are merely some examples.

Thus, the residue characteristics at the time the current operation is performed may be different than the residue characteristics as reflected in the residue map that is to be used for control in the current operation. Thus, the machine settings and other operating parameters commanded by the operator (or the control system) based on the residue map can lead to error or other deviation in the performance of the agricultural machines.

Additionally, it should be understood that further data collection more immediately prior to the current operation to be conducted on the field, such as by various surveys (e.g., aerial, human, machine, etc.), may not be possible. In some examples, residue characteristics may only be detectable and/or certain sensing techniques may only be accurate at certain times of the growing season, for instance, field surface imaging may only provide accurate results during bare field conditions and/or during early parts of the growing season when the crop is not present or does not interfere with the sensor's field of vision. In another example, satellite-based sensing may only be available for a given location during certain time periods, such as per the orbit schedule of the satellite (e.g., once every three weeks) and thus there may be a window of time during which satellite-based data is not available. Additionally, even if satellite-based sensing is available, if the weather or meteorological conditions obscure the view of the satellite-based sensors, the resulting data of the field may be affected or otherwise unavailable. In another example, drone-based sensing may also present difficulties, for instance, certain operators may not have access to drones, the drones may not have a particular type of sensor and/or an adequate sensor for the particular agricultural characteristic of interest, obscurants on the field or in the environment of the field may affect the data collected by the drone, as well as various other difficulties.

Some systems can utilize machines that work in concert with the agricultural machines (such as drones that fly and/or observe ahead of the agricultural machines). However, the sensor systems of these support machines may not observe the variance at the field in a timely or reliable way. For example, vegetation growth on the field or other obscurants at the field may obscure the view of such systems. Further, additional surveys can be performed at a time closer to the time when the operation is to be performed to, for instance, correct or otherwise supplement the original (e.g., baseline) residue map. However, and particularly with certain operations, the residue characteristics of the worksite can be such that additional surveys may not be able to accurately ascertain exact residue characteristic information. For example, at or close to the time that the operation is to be performed, the vegetation on the field can be quite dense and tall, and thus the ability of the sensors on the survey machines to collect residue characteristic data can be diminished or otherwise impeded, as a view of certain residue characteristics of the field can often be inconsistently visible if not completely obscured. Thus, the residue characteristic information of the field may be incomplete or will not otherwise accurately reflect a current residue characteristic of the field, and thus, the control of the machine can be sub-optimal. Additionally, operators, managers, farmers, etc., may not have access to additional machinery and/or equipment (e.g., sensors) to provide additional data close to the time of the operation to be performed, for various reasons. Additionally, operators, managers, farmers, etc., may not have time available to gather additional data close to the time of the operation to be performed. For example, there can be a time schedule (e.g., deadline) or window of time available for performing operations, and in that time other events (e.g., weather) can diminish the time available. Even where additional scouting machines (e.g., drones, ground vehicles, etc.), are available it may be difficult to justify the time or expense of further survey without some indication of the likelihood that some change has occurred.

Additionally, a mobile machine performing the current operation can have on-board sensors, such as imaging systems, as well as various other types of sensors, which can provide near real-time information indicative of the residue characteristics of the field. However, such sensor-based system sensors may not capture and feed information back to the operator (or control system) quickly enough to adjust the machine settings or operating parameters of the agricultural machines to avoid the error or deviation in performance. That is, such systems may have latency that results in less than ideal control. Additionally, obscurants at the field, such as dust, as well as various other obscurants, may also render the on-board sensor systems less useful or otherwise cause the on-board sensor systems to provide unreliable data.

To address at least some of these difficulties, the present description provides a control system including, among other things, a residue characteristic confidence system. As will be discussed further below, the control system obtains (e.g., as a baseline) a residue map of a field to be operated upon. The control system further obtains supplemental data relative to the field that is gathered after the time the data for the baseline residue map was collected and prior to the time the current operation is performed on the field or before the current operation is performed at a particular geographic location on the field. The control system performs a confidence analysis on the baseline residue map, based on the supplemental data as well as various algorithmic processes, and generates a residue characteristic confidence output, such as a residue characteristic confidence level or a residue characteristic confidence map of the field indicative of, among other things, a confidence in residue characteristics of the field as indicated by the baseline residue map. In some examples, the confidence level may be expressed as a percent likelihood that the actual residue characteristic value is within a certain range of the baseline residue characteristic value for a portion of the field (e.g., there is 95% confidence that the actual residue characteristic is within 5% of the baseline residue characteristic, as indicated by the baseline residue map). In other examples, the confidence level may be expressed as a likelihood that the residue characteristic has changed (e.g., confidence in the baseline residue map for a portion of a field is LOW following high winds or high precipitation, or both, at the field in the time after the data for the baseline map was collected).

The system uses the residue characteristic confidence output to generate various action signals. The action signals can be used to automatically or semi-automatically control the machine to improve overall performance by, for example, automatically controlling machine subsystems, providing operator assistance features, and providing recommendations and/or indications on interfaces or interface mechanisms that represent various information, including, but not limited to, the residue characteristic confidence output, such as the residue characteristic confidence level and/or the residue characteristic confidence map of the field.

Figure 2:
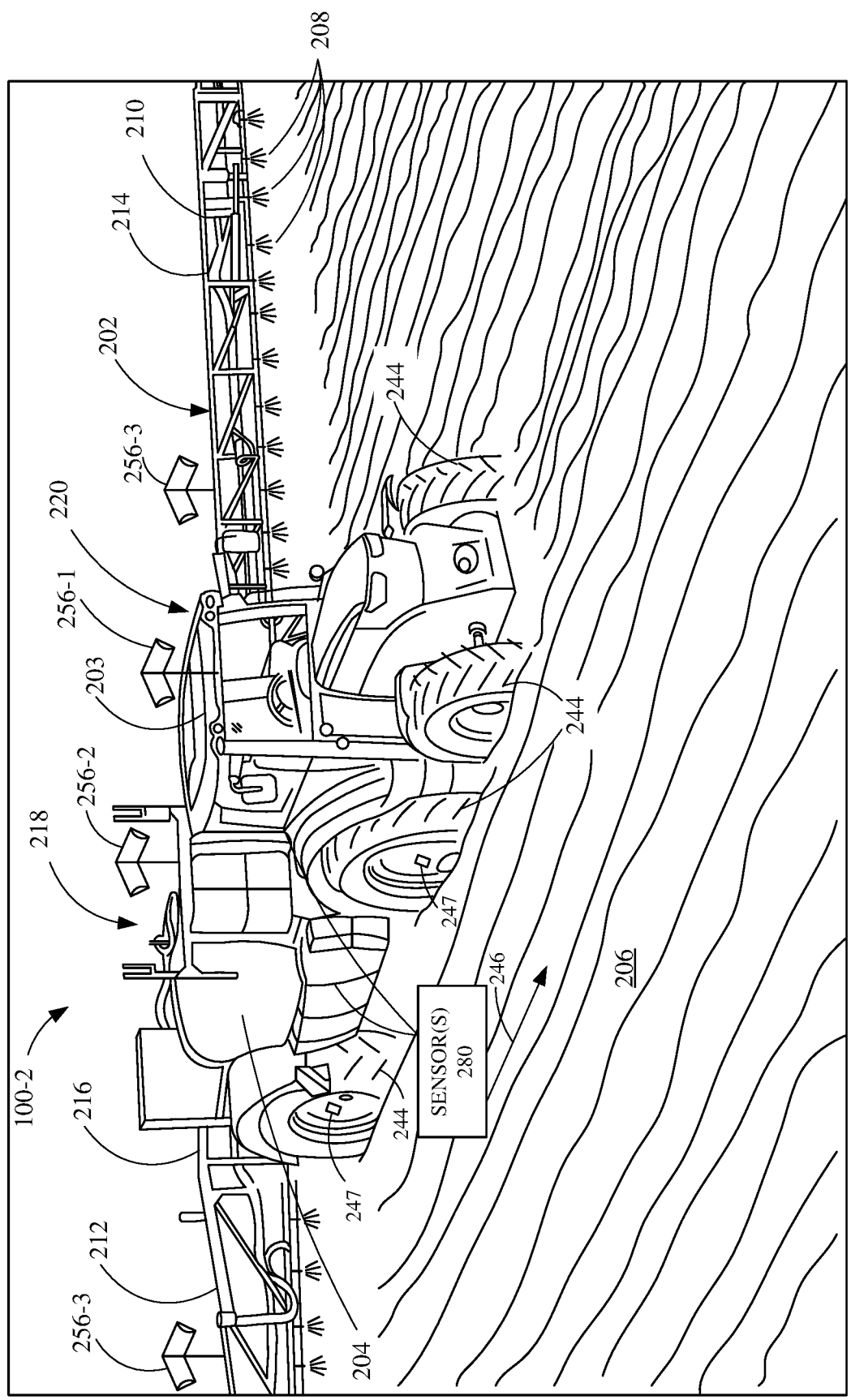
FIG. 2 is a perspective view showing one example of a mobile agricultural machine, as a mobile spraying machine.
Figure 3:
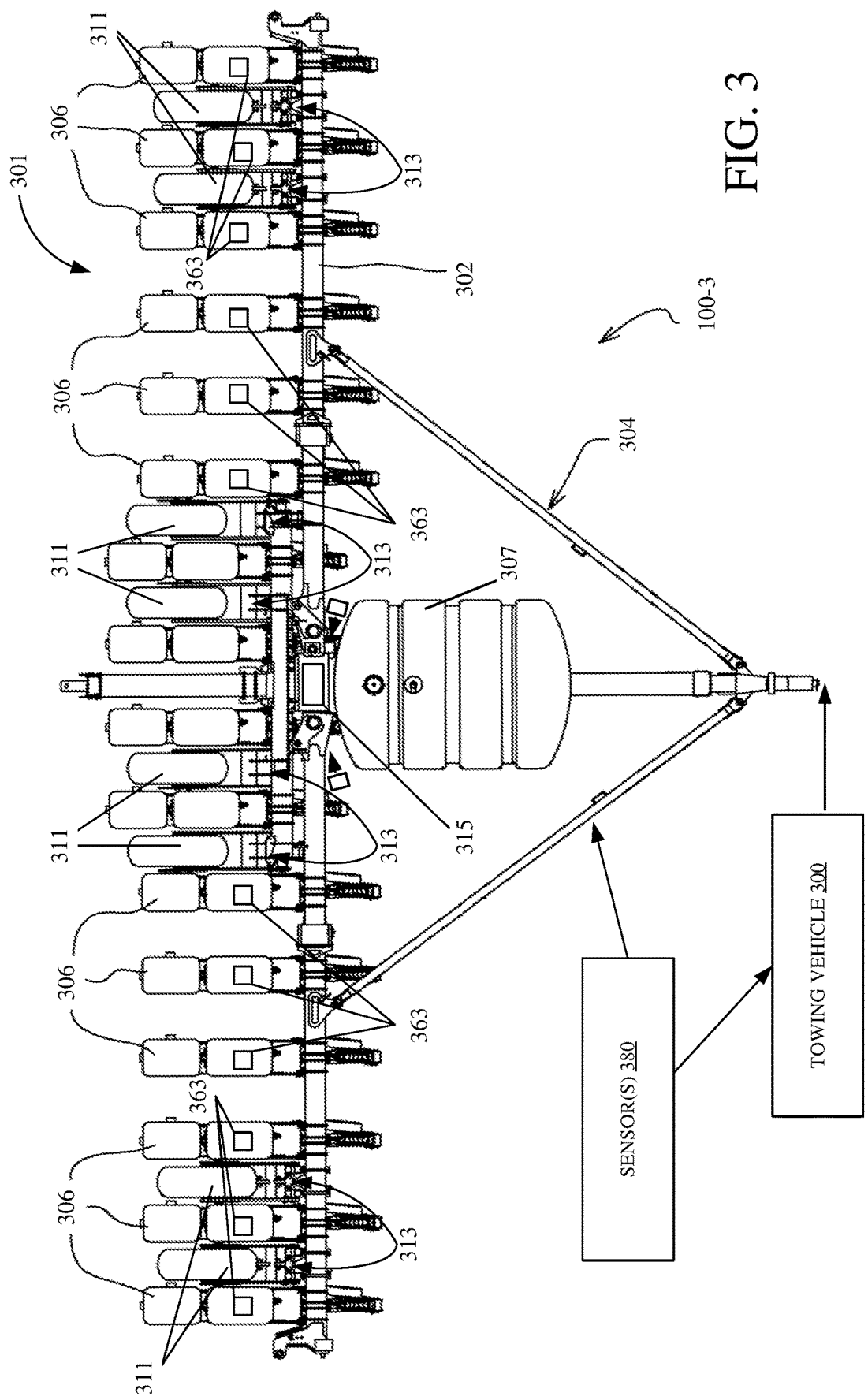
FIG. 3 is a partial plan view, partial block diagram showing one example of a mobile agricultural machine, as a mobile planting machine.
Figure 5:
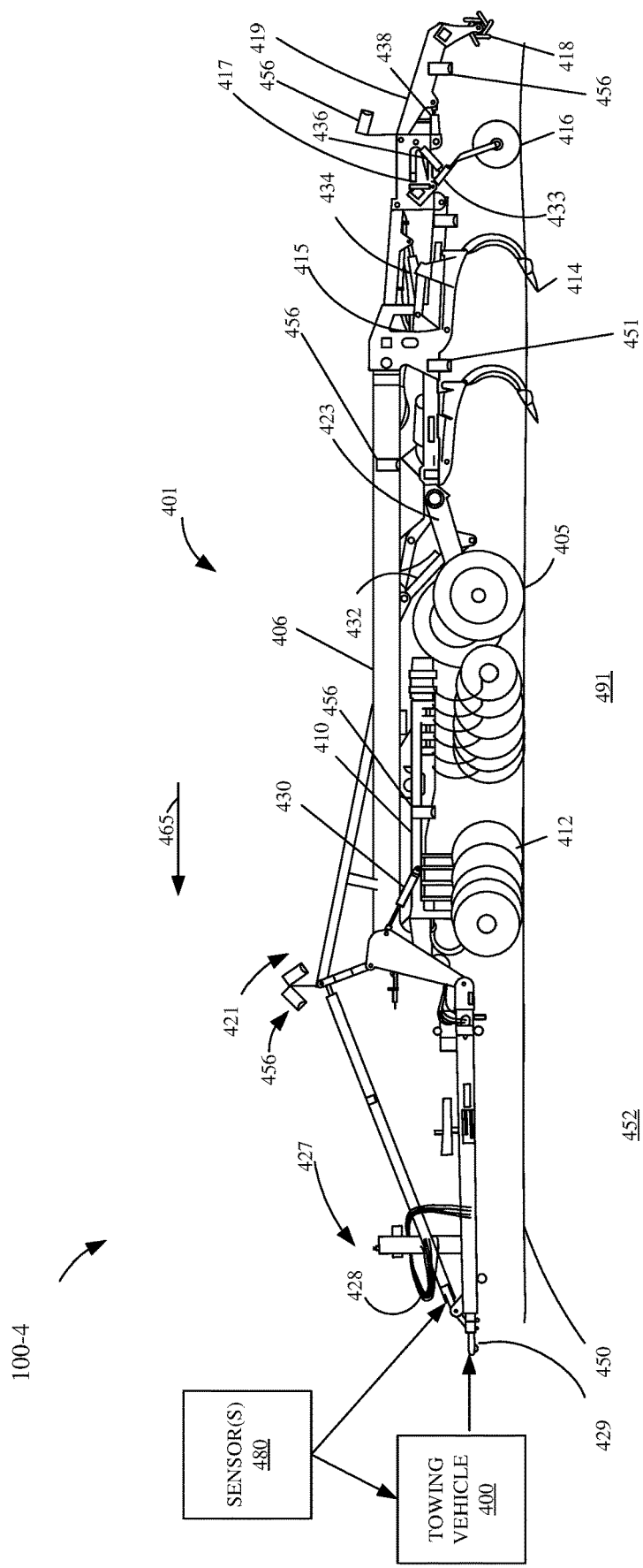
FIG. 5 is a partial side view, partial block diagram showing one example of a mobile agricultural machine, as a mobile tillage machine.

The present description can apply to any of a wide variety of mobile machines, such as mobile agricultural machines, mobile construction machines, mobile forestry machines, mobile turf management machines. The present description proceeds with examples with reference to particular mobile agricultural machines. These particular mobile agricultural machines are described herein as examples only. FIG. 1 illustrates, as an example mobile agricultural machine 100, a mobile harvester 100-1. FIG. 2 illustrates, as an example mobile agricultural machine 100, a mobile sprayer 100-2. FIG. 3 illustrates, as an example mobile agricultural machine 100, a mobile planter 100-3. FIG. 5 illustrates, as an example mobile agricultural machine 100, a mobile tillage machine 100-4. Again, these are only examples of the different types of mobile machines that the present description contemplates.

FIG. 1 is a partial pictorial, partial schematic, illustration of a mobile agricultural machine 100, in an example where mobile machine 100 is a mobile agricultural harvester 100-1 (illustratively a combine harvester). It can be seen in FIG. 1 that combine 100-1 illustratively includes an operator compartment 103, which can have a variety of different operator interface mechanisms for controlling combine 100-1. Operator compartment 103 can include one or more operator interface mechanisms that allow an operator to control and manipulate combine 100-1. The operator interface mechanisms in operator compartment 103 can be any of a wide variety of different types of mechanisms. For instance, they can include one or more input mechanisms such as steering wheels, levers, joysticks, buttons, pedals, switches, etc. In addition, operator compartment 103 may include one or more operator interface display devices, such as monitors, or mobile devices that are supported within operator compartment 103. In that case, the operator interface mechanisms can also include one or more user actuatable elements displayed on the display devices, such as icons, links, buttons, etc. The operator interface mechanisms can include one or more microphones where speech recognition is provided on combine 100-1. The operator interface mechanisms also include one or more audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc.

Combine 100-1 includes a set of front-end machines forming a cutting platform 102 that includes a header 104 having a cutter generally indicated at 106. It can also include a feeder house 108, a feed accelerator 109, and a thresher generally indicated at 111. Thresher 111 illustratively includes a threshing rotor 112 and a set of concaves 114. Further, combine 101 can include a separator 116 that includes a separator rotor. Combine 101 can include a cleaning subsystem (or cleaning shoe) 118 that, itself, can include a cleaning fan 120, a chaffer 122 and a sieve 124. The material handling subsystem in combine 100-1 can include (in addition to a feeder house 108 and feed accelerator 109) discharge beater 126, tailings elevator 128, clean grain elevator 130 (that moves clean grain into clean grain tank 132) as well as unloading auger 134 and spout 136.

Combine 100-1 can further include a residue subsystem 138 that can include chopper 140 and spreader 142. Combine 100-1 can also have a propulsion subsystem that includes an engine (or other power source) that drives ground engaging elements 144 (such as wheels, tracks, etc.). It will be noted that combine 100-1 can also have more than one of any of the subsystems mentioned above (such as left and right cleaning shoes, separators, etc.).

As shown in FIG. 1, header 104 has a main frame 107 and an attachment frame 110. Header 104 is attached to feeder house 108 by an attachment mechanism on attachment frame 110 that cooperates with an attachment mechanism on feeder house 108. Main frame 107 supports cutter 106 and reel 105 and is movable relative to attachment frame 110, such as by an actuator (not shown). Additionally, attachment frame 110 is movable, by operation of actuator 149, to controllably adjust the position of front-end assembly 102 relative to the surface (e.g., field) over which combine 100-1 travels in the direction indicated by arrow 146, and thus controllably adjust a position of header 104 from the surface. In one example, main frame 107 and attachment frame can be raised and lowered together to set a height of cutter 106 above the surface over which combine 100-1 is traveling. In another example, main frame 107 can be tilted relative to attachment frame 110 to adjust a tilt angle with which cutter 106 engages the crop on the surface. Also, in one example, main frame 107 can be rotated or otherwise moveable relative to attachment frame 110 to improve ground following performance. In this way, the roll, pitch, and/or yaw of the header relative to the agricultural surface can be controllably adjusted. The movement of main frame 107 together with attachment frame 110 can be driven by actuators (such as hydraulic, pneumatic, mechanical, electromechanical, or electrical actuators, as well as various other actuators) based on operator inputs or automated inputs.

In operation, and by way of overview, the height of header 104 is set and combine 100-1 illustratively moves over a field in the direction indicated by arrow 146. As it moves, header 104 engages the crop to be harvested and gather it towards cutter 106. After it is cut, the crop can be engaged by reel 105 that moves the crop to a feeding system. The feeding system move the crop to the center of header 104 and then through a center feeding system in feeder house 108 toward feed accelerator 109, which accelerates the crop into thresher 111. The crop is then threshed by rotor 112 rotating the crop against concaves 114. The threshed crop is moved by a separator rotor in separator 116 where some of the residue is moved by discharge beater 126 toward a residue subsystem. It can be chopped by a residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100-1 toward the residue handling subsystem 138.

Tailings can be moved by tailing elevator 128 back to thresher 110 where they can be re-threshed. Alternatively, the tailings can also be passed to a separate re-threshing mechanism (also using a tailings elevator or another transport mechanism) where they can re-threshed as well.

FIG. 1 also shows that, in one example, combine 100-1 can include a variety of one or more sensors 180, some of which are illustratively shown. For example, combine 100-1 can include ground speed sensors 147, one or more separator loss sensors 148, a clean grain camera 150, one or more cleaning shoe loss sensors 152, and one or more observation systems 156. Ground speed sensor 147 illustratively senses the travel speed of combine 100 over the ground. This can be done by sensing the speed of rotation of ground engaging elements 144, the drive shaft, the axle, or various other components. The travel speed can also be sensed by a positioning system, such as a global positioning system (GPS), a dead-reckoning system, a LORAN system, or a wide variety of other systems or sensors that provide an indication of travel speed.

Observation system 156 is mounted to and illustratively senses the field (and characteristics thereof) in front of and/or around (e.g., to the sides, behind, etc.) combine 100-1 (relative to direction of travel 146) and generates sensor signal(s) (e.g., an image) indicative of those characteristics. For example, observation system 156 can generate a sensor signal indicative of residue characteristics in the field ahead of and/or around combine 100-1. Observation sensor systems 156 can include one or more sensors, such as one or more imaging systems (e.g., mono or stereo cameras), optical sensors, radar, lidar, ultrasonic sensors, thermal or infrared sensors, as well as various other sensors, such as sensors that emit and/or receive electromagnetic radiation. While shown in a specific location in FIG. 1, it will be noted that observation system 156 can be mounted to various locations on combine 100-1 and is not limited to the depiction shown in FIG. 1. Additionally, while only one observation system 156 is illustrated, it will be noted that combine 100-1 can include any number of observation systems 156, mounted to any number of locations on combine 100-1, and configured to view any number of directions around combine 100-1.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise on a single sensor as well, instead of separate sensors for each shoe.

Separator loss sensors 148 provide signals indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will be appreciated, and as will be discussed further herein, sensors 180 can include a variety of other sensors not illustratively shown in FIG. 1. For instance, they can include residue setting sensors that are configured to sense whether combine 100 is configured to chop the residue, drop a windrow, etc. They can include cleaning shoe fan speed sensors that can be configured proximate fan 120 to sense the speed of the fan. They can include threshing clearance sensors that sense clearance between the rotor 112 and concaves 114. They can include threshing rotor speed sensors that sense a rotor speed of rotor 112. They can include chaffer clearance sensors that sense the size of openings in chaffer 122. They can include sieve clearance sensors that sense the size of openings in sieve 124. They can include material other than grain (MOG) moisture sensors that can be configured to sense the moisture level of the material other than grain that is passing through combine 100-1. They can include machine settings sensors that are configured to sense the various configured settings on combine 100-1. They can also include machine orientation sensors that can be any of a wide variety of different types of sensors that sense the orientation of combine 100-1, and/or components thereof. They can include crop property sensors that can sense a variety of different types of crop properties, such as crop height, crop moisture, and other crop properties. The crop property sensors can also be configured to sense characteristics of the crop as they are being processed by combine 100-1. For instance, they can sense grain feed rate, as it travels through clean grain elevator 120. They can sense mass flow rate of grain through elevator 130 or provide other output signals indicative of other sensed variables. Sensors 180 can include soil property sensors that can sense a variety of different types of soil properties, including, but not limited to, soil type, soil compaction, soil moisture, soil structure, among others.

Some additional examples of the types of sensors that can be used are described below, including. but not limited to a variety of position sensors that can generate sensor signals indicative of a position (e.g., geographic location, orientation, elevation, etc.) of combine 100-1 on the field over which combine 100-1 travels or a position of various components of combine 100-1 (e.g., header 104) relative to, for example, the field over which combine 101 travels.

As combine 100-1 moves in the direction indicated by arrow 146, it may be that residue characteristics (e.g., amount and distribution) ahead of, or otherwise around combine 100-1, vary. For example, the amount of residue in front of the combine 100-1 may increase. Residue may be engaged by the header 104. The residue may accumulate at the front of header 104 such that header 104 begins to push a pile of residue. This may cause damage to the field, may limit the effectiveness of cutter 106, increase wear, as well as various other deleterious effects. For example, high levels/build-up of residue may prevent cutter 106 from effectively cutting crop and thus may cause combine 100-1 to push the crop over. In addition, the additional residue may tangle around reel 105 or otherwise disrupt crop flow, including, in some cases, causing plugging. In operation, the operator sets the position of header 104 to a certain height from the field and to a certain angle (e.g., tilt) such that header 104 effectively engages the crop and sets the travel speed of the combine 101, in order to maintain a federate, reduce losses (e.g., optimize yield), as well as to achieve various other performance parameters. Variations in residue characteristics, can cause poor performance unless operation of the combine 100-1 is changed to account for the variability. For instance, it may be desirable to raise the header 104 to go over residue on the ground. In other examples, it may be desirable to reduce the speed of the combine 100-1 to maintain feedrate given the increase in residue. In other examples, it may be desirable to adjust various other settings of the harvester given the increased residue. For example, it may be desirable to adjust the float pressure of header 104. Float pressure dictates how much of the header weight is being carried by the ground as opposed to the amount of weight of the header being carried by the float circuit (which includes actuator 149). The more float pressure, the more weight of the header being carried by the float circuit. In areas of high residue, for instance, it may be desirable to increase float pressure to reduce the risk of the header 104 pushing residue across the ground.

FIG. 2 is a perspective showing one example of a mobile agricultural machine, in an example where mobile agricultural machine 100 is a mobile agricultural spraying machine 100-2. It can be seen in FIG. 2 that agricultural sprayer 100-2 includes a towing vehicle 220 and a spraying system 202 having a tank 204 containing a liquid that is to be applied to field 206 as agricultural sprayer 100-2 travels in the direction indicated by arrow 246. Tank(s) 204 are fluidically coupled to spray nozzles 208 by a delivery system comprising a set of conduits that define a flow path for the liquid from tank 204 to one or more spray nozzles 208. A fluid conveyance system (e.g., one or more pumps) is configured to convey the liquid from tank(s) 204 through the conduits to and through nozzles 208. The operation of the fluid conveyance system is adjustable, such as automatically or manually, to vary a pressure, a flow rate of liquid, as well as various other fluid characteristics of spraying system 202. Spray nozzles 208 are coupled to and spaced apart along boom 210. In one example, the operation and position of spray nozzles 208 can be adjusted, such as automatically, semi-automatically, or manually. For example, the position (e.g., height) of nozzles 208 can be adjusted (e.g., by lowering or raising boom 210), as well as the volume or flow rate of liquid passing through nozzles 208 (such as by operation of a controllable valve). Boom 210 includes arms 212 and 214 which can articulate or pivot relative to a center frame 216. Thus, arms 212 and 214 are movable between a storage or transport position and an extended or deployed position (shown in FIG. 2). The position (e.g., height, orientation, tilt, etc.) of boom 210 and/or arms 212 and 214 can be adjustable by actuation or operation of a controllable actuator (not shown) to drive movement of the boom 210 and/or arms 212 and 214. For example, but not by limitation, the distance (e.g., height) of boom 210 and/or arms 212 and 214 from field 206 can be varied, such as automatically or manually.

In the example illustrated in FIG. 2, sprayer 100-2 comprises a towed implement 218 that carries spraying system 202 and is towed by a towing or support machine 220 (illustratively a tractor) having an operator compartment 203, which can have a variety of different operator interface mechanisms for controlling sprayer 201. Operator compartment 203 can include one or more operator interface mechanisms that allow an operator to control and manipulate sprayer 100-2. The operator interface mechanisms in operator compartment 203 can be any of a wide variety of different types of mechanisms. For instance, they can include one or more input mechanisms such as steering wheels, levers, joysticks, buttons, pedals, switches, etc. In addition, operator compartment 203 may include one or more operator interface display devices, such as monitors, or mobile devices that are supported within operator compartment 203. In that case, the operator interface mechanisms can also include one or more user actuatable elements displayed on the display devices, such as icons, links, buttons, etc. The operator interface mechanisms can include one or more microphones where speech recognition is provided on sprayer 201. They can also include audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc.

Sprayer 100-2 includes a set of ground engaging elements 244, such as wheels, tracks, etc. Sprayer 100-2 can also have a propulsion subsystem that includes an engine (or other power source) that drives ground engaging elements 244. It will be noted that in other examples, sprayer 100-2 is self-propelled. That is, rather than being towed by a towing machine, the machine that carries the spraying system also includes propulsion and steering systems.

In operation, and by way of overview, the height of boom 210 (or arms 212 and 214) are set and sprayer 201 moves over field 206 in the direction indicated by arrow 246. As it moves, substance is conveyed from tank 204 through conduits in boom 210 and to and through nozzles 208 to be applied to the field 206. The application of substance on field 206 can be controllably adjusted, for example, but not by limitation, by varying the height of boom 210 (or arms 212 and 214) off of field 206, by varying the position of nozzles 208, by varying the flow characteristics of the substance through the spraying system (e.g., by controlling pumps or valves), to disable spraying of certain nozzles or sections, by varying the speed of sprayer 100-2, etc.

As the residue characteristics at the field vary, it may be desirable to also vary one or more operating parameters of sprayer 100-2. For example, it may be desirable to vary the application of substance to the field based on the residue characteristics.

FIG. 2 also shows that, in one example, sprayer 100-2 can include a variety of one or more sensors 280, some of which are illustratively shown. For example, sprayer 100-2 can include one or more ground speed sensors 247, and one or more observation systems 256 (e.g., forward-looking systems, such as a camera, lidar, radar, etc., as well as various other observation systems). Ground speed sensors 247 illustratively sense the travel speed of sprayer 100-2 over field 206. This can be done by sensing the speed of rotation of ground engaging elements 244, the drive shaft, the axle, or various other components. The travel speed can also be sensed by a positioning system, such as a global positioning system (GPS), a dead-reckoning system, a LORAN system, or a wide variety of other systems or sensors that provide an indication of travel speed.

Observation systems 256 (identified as 256-1 to 256-3) are mounted at various locations on sprayer 100-2 and illustratively sense the field (and characteristics thereof) in front of or around (e.g., to the sides, behind, etc.) sprayer 100-2 (relative to direction of travel 246) and generate sensor signal(s) (e.g., images) indicative of those characteristic. For example, observation systems 256 can generate sensor signals indicative of residue characteristics of field 206 ahead of or around sprayer 100-2, as well as various other characteristics. While shown in specific location in FIG. 2, it will be noted that observation systems 256 can be mounted at various locations on sprayer 100-2 and are not limited to the depiction shown in FIG. 2.

Additionally, while a particular number of observation systems 256 are shown in the illustration, it will be noted that any number of observation systems can be placed at any number of locations on sprayer 100-2. FIG. 2 shows that the observation systems 256 can be mounted at one or more locations within sprayer 100-2. For example, they can be mounted on towing vehicle 220, as indicated by observation systems 256-1. They can be mounted on implement 218, as indicated by observation systems 256-2. They can be mounted on and spaced apart along boom 210, including each of boom arms 212 and 214, as indicated by observation systems 256-3. Observation systems 256 can be forward-looking systems configured to look ahead of components of sprayer 100-2, side-looking systems configured to look to the sides of components of sprayer 100-2, or rearward-looking systems configured to look behind components of sprayer 100-2. Observation systems 256 can be mounted on sprayer 100-2 such that they travel above or below a canopy of vegetation on agricultural surface 206. It is noted that these are only some examples of locations of observation systems 256, and that observation systems 256 can be mounted at one or more of these locations or various other locations within sprayer 100-2 or any combinations thereof.

It will be appreciated, and as will be discussed further herein, sensors 280 can include a variety of other sensors not illustratively shown in FIG. 2. For instance, they can include machine parameter sensors that are configured to sense the various operating parameters of sprayer 100-2. Sensors 280 can also include machine orientation sensors that can be any of a wide variety of different types of sensors that sense the orientation of sprayer 100-2, or the orientation of components of sprayer 100-2. Sensors 280 can include crop property sensors that can sense a variety of different types of crop properties, such as crop height, crop moisture, and other crop properties. Sensors 280 can include soil property sensors that can sense a variety of different types of soil properties, including, but not limited to, soil type, soil compaction, soil moisture, soil structure, among others.

Some additional examples of the types of sensors that can be used are described below, including. but not limited to a variety of position sensors that can generate sensor signals indicative of a position of sprayer 100-2 on the field over which sprayer 100-2 travels or a position of various components of sprayer 100-2 (e.g., nozzles 208, boom 210, arms 212 and 214, etc.) relative to, for example, the field over which sprayer 100-2 travels or relative to another item of sprayer 100-2.

FIG. 3 is a partial top view, partial block diagram showing one example of a mobile agricultural machine, in an example where mobile agricultural machine 100 is an agricultural planting machine 100-3. As illustrated in FIG. 3, mobile agricultural planting machine 100-3 includes a planting implement 301 (illustratively a row crop planter) and a towing vehicle 300. Towing vehicle 300 may be similar to towing vehicle 220 shown in FIG. 2, or may be another type of towing vehicle.

Planting implement 301 is a row crop planting machine that illustratively includes a toolbar 302 that is part of a frame 304. FIG. 3 also shows that a plurality of planting row units 306 are mounted to the toolbar 302. Agricultural planter 100-3 can be towed behind towing vehicle 300, such as a tractor. FIG. 3 shows that material, such as seed, fertilizer, etc. can be stored in a tank(s) 307 and pumped, using one or more pumps 315, through supply lines to the row units. The seed, fertilizer, etc., can also be stored on the row units themselves. As shown in the illustrated example of FIG. 3, each row unit can include a controller 363 which can be used to control operating parameters of each row unit, such as the downforces, tool positions (e.g., angle, depth, etc.), as well as various other operating parameters. Planting implement 301 can also includes a set of frame wheels 311, attached to tool bar 102 or another frame, that support the planting implement 301 over the surface at which it operates. Planting implement 301 can also include a suspension subsystem. For instance, frame wheels 311 can include a respective controllable suspension 313 (e.g., air suspension, hydraulic suspension, electromechanical suspension, etc.) which can be controllably adjusted, such as by controlling an amount or pressure of fluid (e.g., air or hydraulic fluid) or controlling resistance. The frame wheel actuators 313 are controllable to, among other things, raise and lower wheels 311 to raise and lower toolbar 102 or frame 104.

FIG. 3 also illustrates that agricultural planting machine 100-3 can include one or more sensors 380 which may be distributed between the towing vehicle 300 and the planting implement 301. Some examples of the sensors 380 are shown in FIG. 4.

Figure 4:
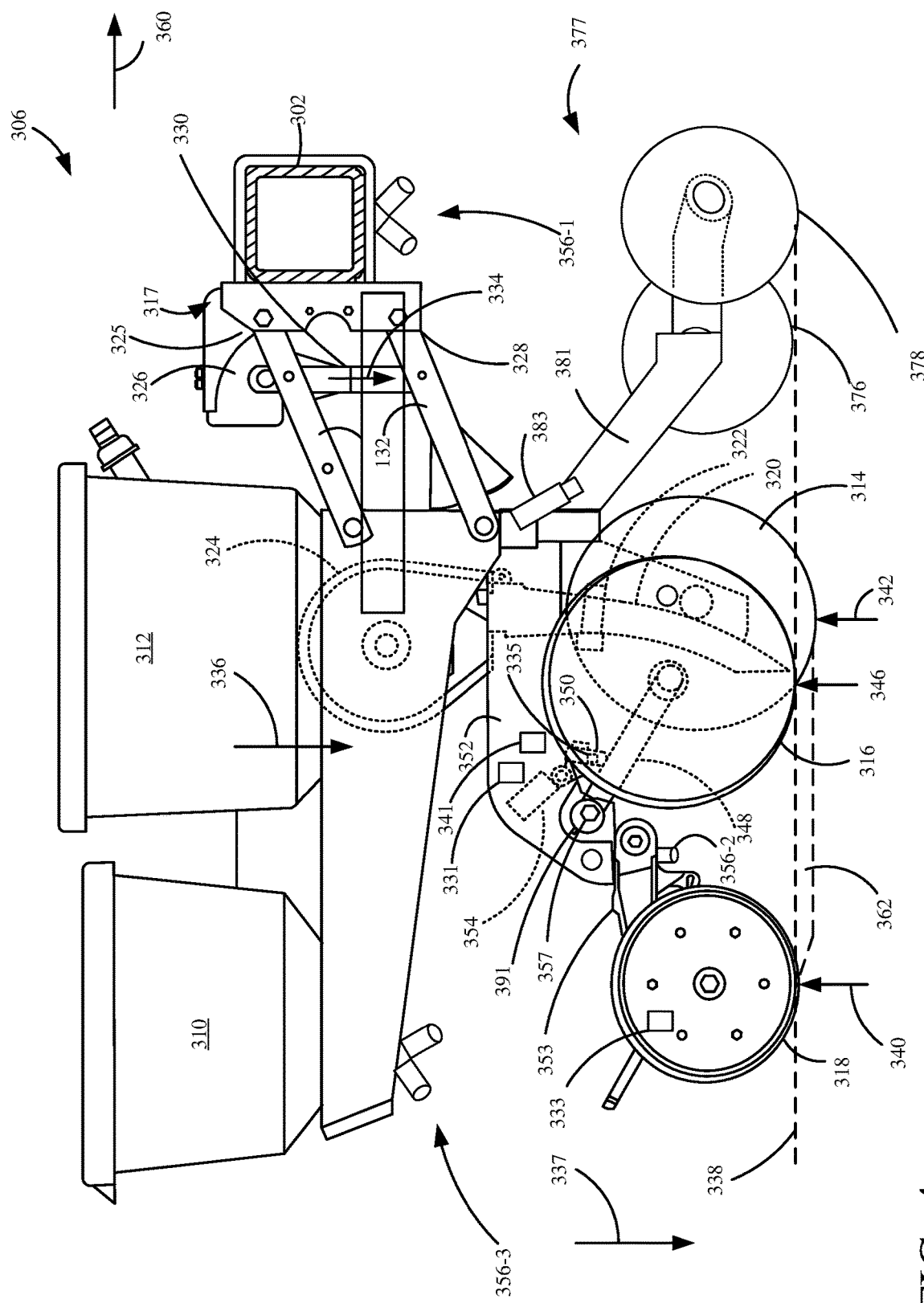
FIG. 4 is a side view showing one example of a row unit that can be used with the mobile planting machine shown in FIG. 4.

FIG. 4 is a side view showing one example of a row unit 306. In the example shown in FIG. 4, row unit 306 illustratively includes a chemical tank 310 and a seed storage tank 312. Row unit 306 also illustratively includes, as ground engaging tools, a disk opener 314 (that opens a furrow 362), a set of gauge wheels 316, a set of closing wheels 318 (that close furrow 362), as well as a row (or residue) cleaner 378. Seeds from tank 312 are fed by gravity into a seed meter 324. The seed meter 324 controls the rate which seeds are dropped into a seed tube 320 or other seed delivery system, such as a brush belt or flighted brush belt, from seed storage tank 312. The seeds can be sensed by an observation sensor system 356-2 or sensor 322, or both.

Observation sensor system 356-2 observes the furrow 362 opened by row unit 306 and can detect various characteristics, such as the presence, distribution, and amount of residue. In addition, sensor system 356-2 can detect the presence and position of seeds (or other material) in the furrow 362. Sensor system 356-2 may detect (or have a field of view that includes) the furrow 362, as well as area surrounding the furrow.

As illustrated in FIG. 4, row unit 306 can also include one or more other observation sensor systems 356 that detect, among other things, residue characteristics. For example, observation sensor system 356-1 can detect ahead of the row unit 306 or ahead of a component of the row unit 306 (e.g., row cleaner 378) to detect various characteristics, such as residue characteristics of the field. Observation sensor-system 356-3 can detect behind the row unit 306 or behind a component of the row unit (e.g., closing wheels 318) to detect various characteristics, such as residue characteristic. Observation sensor systems 356 can include one or more sensors, such as one or more imaging systems (e.g., mono or stereo cameras), optical sensors, radar, lidar, ultrasonic sensors, thermal or infrared sensors, as well as various other sensors, such as sensors that emit and/or receive electromagnetic radiation.

Additionally, while the example shown in FIG. 4 illustrates observation sensor systems being disposed on implement row unit 306 or tool bar 302, in other examples, at least some observation sensor systems can be disposed, alternatively or additionally, on other parts of implement 301 or on other parts of machine 100-3, such as on towing vehicle 300.

Some parts of the row unit 306 will now be discussed in more detail. First, it will be noted that there are different types of seed meters 324, and the one that is shown is shown for the sake of example only. For instance, in one example, each row unit 306 need not have its own seed meter. Instead, metering or other singulation or seed dividing techniques can be performed at a central location, for groups of row units 306. The metering systems can include rotatable disks, rotatable concave or bowl-shaped devices, among others. The seed delivery system can be a gravity drop system (such as seed tube 320 shown in FIG. 4) in which seeds are dropped through the seed tube 120 and fall (via gravitational force) through the seed tube and out the outlet end 321 into the furrow (or seed trench) 362. Other types of seed delivery systems are assistive systems, in that they do not simply rely on gravity to move the seed from the metering system into the ground. Instead, such systems actively capture the seeds from the seed meter and physically move the seeds from the meter to a lower opening where the exit into the ground or trench.

A downforce generator or actuator 326 is mounted on a coupling assembly 328 that couples row unit 306 to toolbar 302. Downforce actuator 326 can be a hydraulic actuator, a pneumatic actuator, an electromechanical actuator, a spring-based mechanical actuator or a wide variety of other actuators. In the example shown in FIG. 4, a rod 330 is coupled to a parallel linkage and is used to exert an additional downforce (in the direction indicated by arrow 334) on row unit 306. The total downforce (which includes the force indicated by arrow 334 exerted by actuator 326, plus the force due to gravity acting on the row unit 306, and indicated by arrow 336) is offset by upwardly directed forces acting on closing wheels 318 (from ground 338 and indicated by arrow 340) and furrow opener 314 (again from ground 338 and indicated by arrow 342). The remaining force (the sum of the force vectors indicated by arrows 334 and 336, minus the force indicated by arrows 340 and 342) and the force on any other ground engaging component on the row unit (not shown), is the differential force indicated by arrow 346. The differential force may also be referred to herein as downforce margin. The force indicated by arrow 346 acts on the gauge wheels 316. This load can be sensed by a gauge wheel load sensor 335 which may located anywhere on row unit 306 where it can sense that load. It can also be placed where it may not sense the load directly, but a characteristic indicative of that load. For example, it can be disposed near a set of gauge wheel control arms (or gauge wheel arm) 348 that movably mount gauge wheels to shank 352 and control an offset between gauge wheels 316 and the disks in double disk opener 314 to control planting depth. Percent ground contact is a measure of a percentage of time that the load (downforce margin) on the gauge wheels 316 is zero (indicating that the gauge wheels are out of contact with the ground). The percent ground contact is calculated on the basis of sensor data provided by the gauge wheel load sensor 335. In one example, gauge wheel load sensor 335 is incorporated in mechanical stop (or arm contact member or wedge) 350.

In addition, there may be other separate and controllable downforce actuators, such as one or more of a closing wheel downforce actuator 353 that controls the downforce exerted on closing wheels 318. Closing wheel downforce actuator 353 can be a hydraulic actuator, a pneumatic actuator, an electrical actuator, a spring-based mechanical actuator or a wide variety of other actuators. The downforce exerted by closing wheel downforce actuator 353 is represented by arrow 337. It will be understood that each row unit 306 can include the various components described with reference to FIG. 4.

In the illustrated example, arms (or gauge wheel arms) 348 illustratively abut a mechanical stop (or arm contact member or wedge) 350. The position of mechanical stop 350 relative to shank 352 can be set by a planting depth actuator assembly 354. Planting depth actuator assembly 354 can include a hydraulic actuator, a pneumatic actuator, an electrical actuator, or various other types of controllable actuators. Control arms 348 illustratively pivot around pivot point 356 so that, as planting depth actuator assembly 354 actuates to change the position of mechanical stop 350, the relative position of gauge wheels 316, relative to the furrow opener 314, changes, to change the depth at which seeds are planted. Additionally, row unit 306 can include a depth sensor 357, such a potentiometer, hall effect sensor, or other suitable sensor, that detects a displacement of control arms 348 to indicate the position of gauge wheels 316 and thus the operating depth of opener 314.

In operation, row unit 306 travels generally in the direction indicated by arrow 360. The furrow opener 314 opens the furrow 362 in the soil 338, and the depth of the furrow 362 is set by planting depth actuator assembly 354, which, itself, controls the offset between the lowest parts of gauge wheels 316 and disk opener 314. Seeds are dropped through seed tube 320 into the furrow and closing wheels 318 close the soil.

As the seeds are dropped through seed tube 320, they can be sensed by seed sensor 322. Some examples of seed sensor 322 are an optical sensor or a reflective sensor, and can include a radiation transmitter and a receiver. The transmitter emits electromagnetic radiation and the receiver the detects the radiation and generates a signal indicative of the presences or absences of a seed adjacent to the sensor. These are just some examples of seed sensors. As previously discussed, row unit 306 also includes sensor system 356-2 that can be used in addition to, or instead of, seed sensor 322. Sensor system 356-2 performs furrow sensing, including in-furrow seed sensing.

In addition to seed sensors, furrow sensors, and observation sensor systems, the individual row units 306 can include a wide variety of different types of sensors 380, some examples of which are shown in FIG. 4. For instance, row unit 106 can include a ride quality sensor 331, such as an accelerometer that senses acceleration (bouncing) of row unit 306 (or planting implement 301). In the example shown in FIG. 4, accelerometer 331 is shown mounted to shank 352. This is only an example. In other examples, accelerometer 331 can be mounted in other places as well, such as on toolbar 302 or frame 304. In some examples, accelerometer 331 can be a single axis or a multi-axis (e.g., three axis) accelerometer. In some examples, accelerometer 331 is part of an inertial measurement unit which senses, in addition to acceleration of row unit 306, other characteristics such as position and orientation (e.g., pitch, roll, and yaw). For example, sensors 380 can include machine dynamics sensors 341 that sense machine dynamics characteristics (e.g., pitch, roll, and yaw) of each row unit 306 or of planting implement 301. Machine dynamics sensors 341 can include inertial measurement units, which can include, among other things (e.g., gyroscopes, magnetometers, etc.), an accelerometer, such as accelerometer 331. Thus, while ride quality sensors 331 and machine dynamics sensors 341 are shown as separate, in some examples, ride quality and machine dynamics may be sensed by the same sensor system. Additionally, machine dynamics sensors 341 are shown mounted to shank 352, in other examples, machine dynamics sensors 341 can be mounted in other places as well, such as on toolbar 302 or frame 304.

Sensors 380 can also include one or more closing wheel downforce sensors 333 which can be used to detect force on closing wheels 318.

In addition, FIG. 4 shows that row unit 306 can include, as a ground engaging tool, a row cleaner unit 377 which includes a row cleaner 378 (illustratively shown as one or more opposing disks) that travel in the travel path of furrow opener 314 to clean residue, debris, as well as other obstacles, from the path of furrow opener 314. Row cleaner unit 377 also includes control arm 381 that is coupled to the one or more disks forming row cleaner 378 and pivotally coupled to shank 352. A row cleaner actuator 383 is controllable to change a position (e.g., depth of engagement) of row cleaner disks 378 as well as apply a downforce to row cleaner unit 377. FIG. also shows that row unit 306 can include a coulter 376 (e.g., a coulter disk) that is removably coupled to row unit 306 by an attachment mechanism (not shown). Coulter 376 travels in the travel path of furrow opener 314 and acts to break open the ground. Coulters are often used on planting machines operating at fields where minimal or no tilling has occurred.

As residue characteristics at the field vary, it may be desirable to also vary one or more operating parameters of planting machine 100-3. For example, where residue is present, it may be desirable to actuate row cleaner unit 377 such that row cleaner 378 engages the ground to clean ahead of furrow opener 314. In another example, as the amount of residue increases, it may be desirable to increase the downforce exerted on row cleaner 378 or increase the depth of engagement of row cleaner 378, or both. Further, it may be desirable to adjust the downforce exerted to row unit 306 based on the residue characteristics at the field. For example, more or less downforce may be needed depending on the amount of residue. Various other operating parameters of planting machine 100-3 may be adjusted based on the residue characteristics at the field, for example, the depth of furrow opener 114, the downforce applied to closing wheel 318, as well as various other operating parameters.

FIG. 5 is a partial side view, partial block diagram showing one example of a mobile agricultural machine, in an example where mobile agricultural machine 100 is a mobile tillage machine 100-4. As shown in FIG. 4, mobile tillage machine 100-4 includes a towing vehicle 400 and a tillage implement 401. Tillage implement 401 is towed by towing vehicle 400 in the direction indicated by arrow 165 and operates at a field 491. Towing vehicle 400 may be similar to towing vehicle 220, or towing vehicle 300, or may be another type of towing vehicle. Tillage implement 401 includes a plurality of tools that can engage the surface 450 of the ground or penetrate the sub-surface 452 of the ground. As illustrated, implement 401 may include a connection assembly 427 for coupling to the towing vehicle 400. Connection assembly 427 includes a mechanical connection mechanism 429 (shown as a hitch) as well as a connection harness 428 which may include a plurality of different connection lines, which may provide, among other things, power, fluid (e.g., hydraulics or air, or both), as well as communication. In some examples, implement 401 may include its own power and fluid sources. The connection lines of connection harness 428 may form a conduit for delivering power and/or fluid to the various actuators on implement 401.

As illustrated in FIG. 5, implement 401 can include a plurality of actuators. Actuators 430 are coupled between subframe 410 and frame 406 and are controllably actuatable to change a position of the subframe 410 relative to the mainframe 406 in order to change a position (e.g., depth, angle, etc.) of the disks 412 relative to the mainframe 406 as well as to apply a downforce to the disks 412.

Actuators 432 are coupled between a wheel frame 423 and main frame 406 and are controllably actuatable to change a position of the wheels 405 relative to the main frame 406 and thus change a distance between main frame 406 and the surface 450 of the field 491 as well as to apply a downforce to the wheels 405. Thus, actuators 432 can be used to control the depth of the various tools of implement 401. Additionally, each wheel 405 can include a respective actuator 432 that is separately controllable such that the implement 401 can be leveled across its width. For instance, where the ground near a left wheel 405 is lower than the ground by a right wheel, the left wheel can be extended farther, by controllably actuating a respective actuator 432, than the right wheel 405 to level the implement 401 across its width. Additionally, a tillage implement 401 may include a plurality of wheels 405 across both its width and across its fore-to-aft length such that both side-to-side leveling and fore-to-aft (e.g., front-to-back, or vice versa) leveling can be achieved by variably controlling the separate wheels. These additional wheels can be coupled to the main frame or to subframes such that wing leveling can also occur.

Actuators 434 are coupled between tool frame 415 and main frame 406 and are controllably actuatable to change a position of tools 414 as well as to apply a downforce to tools 414. While tools 414 are shown as ripper shanks, in other examples a tillage implement 401 may include other tools, alternatively or in addition to ripper shanks, such as tines.

Actuators 436 are coupled between tool frame 417 and tool subframe 433 and are controllably actuatable to change a position of tools 416 as well as to apply a downforce to tools 416. While tools 416 are shown as disks, in other examples a tillage implement 401 may include other tools, alternatively or in addition to disks 416, such as tines.

Actuators 438 are coupled between tool frame 417 and tool frame 419 and are actuatable to change a position of tools 418 as well as apply a downforce to tools 418. Tools 418 are illustratively roller (or finishing) baskets.

FIG. 5 also shows that tillage machine 100-4 can include one or more sensors 480, some of which are shown in FIG. 5. Sensors 480 can be disposed on towing vehicle 400 or implement 401, or both. In the illustrated example, tillage machine 100-4 can include one or more observation sensors 456. Observation sensor system 456 can detect various characteristics at the field ahead of or around planting machine 100-4, for example, residue characteristics. Observation sensor systems 456 can include one or more sensors, such as one or more imaging systems (e.g., mono or stereo cameras), optical sensors, radar, lidar, ultrasonic sensors, thermal or infrared sensors, as well as various other sensors, such as sensors that emit and/or receive electromagnetic radiation.

As residue characteristics at the field vary, it may be desirable to also vary one or more operating parameters of tillage machine 100-4. For example, where residue is relatively heavy (e.g., relative to a threshold) it may be desirable to increase an operating depth or increase an angle (e.g., aggressiveness) of one or more tools. In other examples, where residue is relatively heavy, it may be desirable to disengage or reduce the operating depth of one or more tools, for instance, it may be desirable to disengage ground engaging tools, such as disk gangs 412 or roller baskets 418 to prevent plugging of the ground engaging tools where residue is heavy. In some examples, it may be desirable to reduce the operating depth or the aggressiveness where residue coverage is relatively light (e.g., relative to a threshold). These are merely some examples. Various operating parameters of tillage machine 100-4 may be controlled based on residue characteristics at the field.

Figure 6:
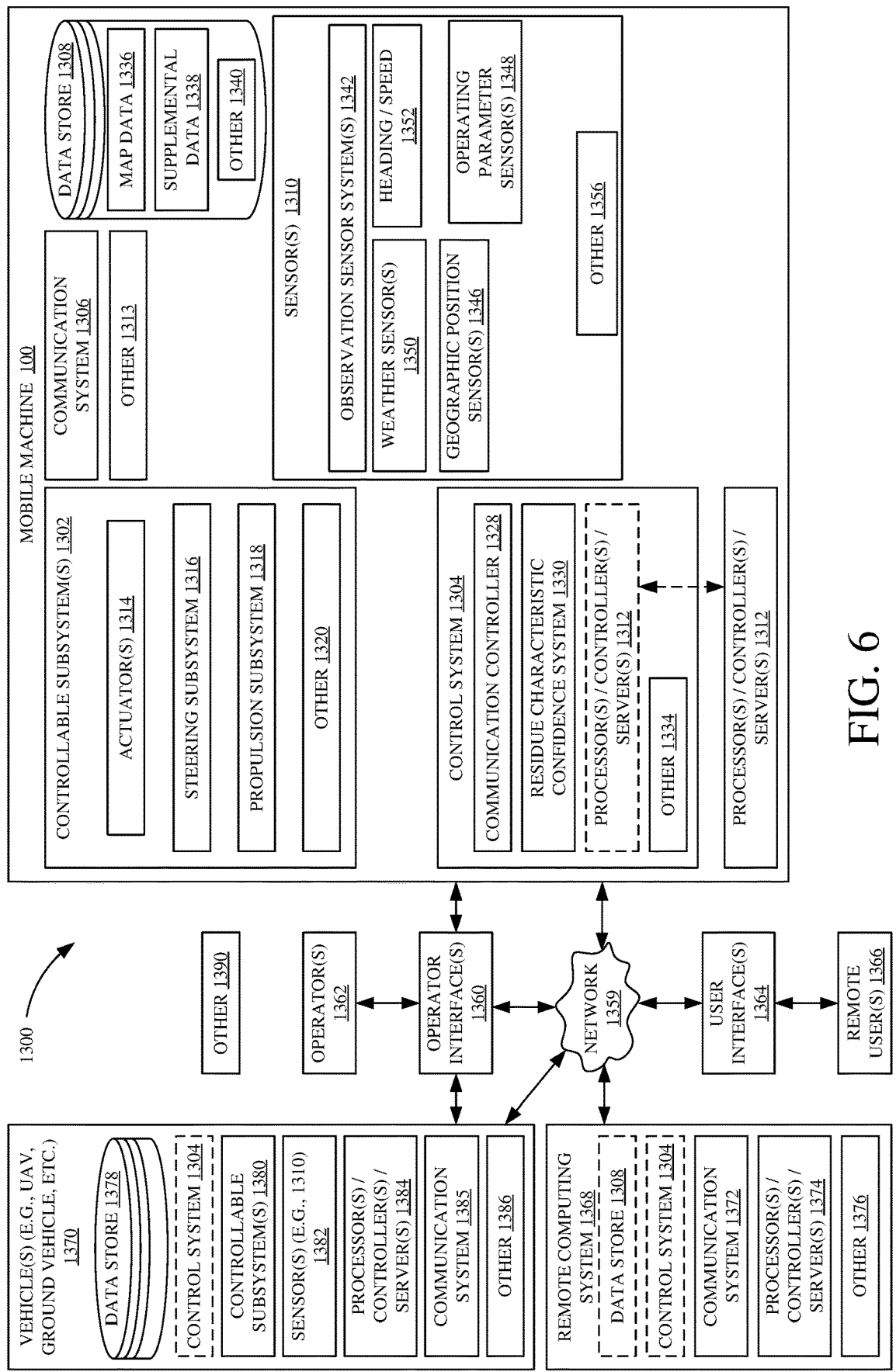
FIG. 6 is a block diagram of one example of an agricultural system architecture that includes, among other things, a mobile agricultural machine.

FIG. 6 is a block diagram of one example of an agricultural system architecture 1300 having, among other things, a mobile agricultural machine 100 (e.g., mobile agricultural harvester 100-1, mobile agricultural sprayer 100-2, mobile agricultural planting machine 100-3, mobile agricultural tillage machine 100-4, etc.) configured to perform an operation (e.g., harvesting, spraying, planting, tillage, etc.) at a worksite (e.g., a field). FIG. 6 shows that agricultural system 1300 includes mobile machine 100, network 1359, one or more operator interfaces 1360, one or more user interfaces 1364, one or more remote computing systems 1368, one or more vehicles 1370, and can include other items 1390 as well. Mobile machine 100 can include one or more controllable subsystems 1302, control system 1304, communication system 1306, one or more data stores 1308, one or more sensors 1310, one or more processors, controllers, or servers 1312, and it can include other items 1313 as well. Controllable subsystems 1302 can include one or more actuator(s) 1314, steering subsystem 1316, propulsion subsystem 1318, and can include other items 1320 as well, such as other controllable subsystems, including, but not limited to those described above with reference to FIGS. 1-5.

Control system 1304 can include one or more processors, controllers, or servers 1312, communication controller 1328, residue characteristic confidence system 1330, and can include other items 1334. Data stores 1308 can include map data 1336, supplemental data 1338, and can include other data 1340. As illustrated in FIG. 6, the one or more processors, controllers, or servers 1312 can be a part of control system 1304 or can be a part of the mobile machine 100 and can be utilized by the control system 1304, or can be dispersed among mobile machine 100 and control system 1304. Various other components of mobile machine 100 can be controlled by and/or implemented by the one or more processors, controllers, or servers 1312.

FIG. 6 also shows that sensors 1310 can include any number of different types of sensors that sense or otherwise detect any number of characteristics, such as, characteristics relative to the field at which mobile machine 100 is operating. Further, sensors 1310 can sense or otherwise detect characteristics relative to the components in agricultural system 1300, such as operating parameters of mobile machine 100 or vehicles 1370. In the illustrated example, sensors 1310 can include one or more observation sensor systems 1342 (e.g., 156, 256, 356, and 456), one or more geographic position sensors 1346, heading/speed sensors 1352, one or more operating parameter sensors 1348, one or more weather sensors 1350, and can include other sensors 1352 as well, such as, any of the sensors described above with reference to FIGS. 1-5 (e.g., sensors 180, 280, 380, 480, etc.), as well as various other sensors that can sense a variety of characteristics, such as a variety of agricultural characteristics. For example, other sensors 1352 can include soil characteristic sensors (e.g., soil moisture, soil type, etc.), crop characteristic sensors (e.g., yield, biomass, crop height, crop volume, etc.), machine dynamics sensors, such as inertial measurement units, that detect the pitch, roll, and yaw of the mobile machine 100, as well as a variety of other sensors that sense a variety of other characteristics.

Additionally, sensors 1310 can, in some examples, be a component of mobile machine 100, or can be separate from mobile machine 100 but accessible (e.g., data can be obtained from) by mobile machine 100 (as well as other components of architecture 1300). Thus, in some examples, sensors 1310 can be a component of other machines, placed at various locations (e.g., fixed locations at or around a field or location of interest), or can be a part of another system.

Control system 1304 is configured to control other components and systems of agricultural system 1300, such as components and systems of mobile machine 100 or vehicles 1370. For instance, communication controller 1328 is configured to control communication system 1306. Communication system 1306 is used to communicate between components of mobile machine 100 or with other systems such as vehicles 1370 or remote computing systems 1368 over network 1359. Network 1359 can be any of a wide variety of different types of networks such as the Internet, a cellular network, a wide area network (WAN), a local area network (LAN), a controller area network (CAN), a near-field communication network, or any of a wide variety of other networks or combinations of networks or communication systems.

Operators 1362 are shown interacting with other components of agricultural system 1300, such as through operator interface mechanisms 1360 and over network 1359. In some examples, operator interface mechanisms 1360 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 1362 may interact with operator interface mechanisms 1360 using touch gestures. In some examples, at least some operator interface mechanisms 1360 may be disposed in an operator compartment of mobile machine 100. In some examples, at least some operator interface mechanisms 1360 may be remote (or separable) from mobile machine 100 but are in communication therewith. Thus, the operator 1362 may be local or remote. These examples described above are provided as illustrative examples and are not intended to limit the scope of the present disclosure. Consequently, other types of operator interface mechanisms 1360 may be used and are within the scope of the present disclosure.

Remote users 1366 are shown interacting with other components of agricultural system 1300, such as through user interfaces 1364 over network 1359. In some examples, user interface mechanisms 1364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, user 1366 may interact with user interface mechanisms 1364 using touch gestures. These examples described above are provided as illustrative examples and are not intended to limit the scope of the present disclosure. Consequently, other types of user interface mechanisms 364 may be used and are within the scope of the present disclosure.

Remote computing systems 1368 can be a wide variety of different types of systems. For example, remote computing systems 1368 can be in a remote server environment. Further, it can be a remote computing system (such as a mobile device), a remote network, a farm manager system, a vendor system, or a wide variety of other remote systems. Remote computing systems 1368 can include one or more processors, controllers, or servers 1374, a communication system 1372, and it can include other items 1376. As shown in the illustrated example, remote computing system 1368 can also include one or more data stores 1308 and control system 1304 (or a control system similar to control system 1304). For example, the data stored and accessed by various components in agricultural system 1300 can be remotely located in data stores 1308 on remote computing systems 1368. Additionally, various components of agricultural system 1300 (e.g., controllable subsystems 1302) can be controlled by a control system 1304 located remotely at a remote computing system 1368. Thus, in one example, a remote user 1366 can control mobile machine 100 or vehicles 1370 remotely, such as by a user input received by user interfaces 1364. These are merely some examples of the operation of computing architecture 1300.

Vehicles 1370 (e.g., UAV, ground vehicle, etc.) can include one or more data stores 1378, one or more controllable subsystems 1380, one or more sensors 1382, one or more processors, controllers, or servers 1384, a communication system 1385, and it can include other items 3186. In the illustrated example, vehicles 1370 can also include control system 1304 (or a control system similar to control system 1304). Vehicles 1370 can be used in the performance of an operation at a worksite, such as a spraying or harvesting operation on an agricultural surface. For instance, a UAV or ground vehicle 1370 can be controlled to travel over the worksite, including ahead of or behind mobile machine 100. Sensors 1382 can include any number of a wide variety of sensors, such as, sensors 1310. For example, sensors 1382 can include observation sensor systems 1342. In a particular example, vehicles 1370 can travel the field ahead of mobile machine 100 and detect any number of characteristics that can be used in the control of mobile machine 100, such as, detecting residue characteristics ahead of mobile machine 100 to control various other operating parameters of mobile machine 100. In another example, vehicles 1370 can travel the field behind mobile machine 100 and detect any number of characteristics that can be used in the control of mobile machine 100, so that vehicles 1370 can enable closed-loop control of mobile machine 100. In another example, vehicles 1370 can be used to perform a scouting operation to collect additional data, such as residue characteristic data, relative to the worksite or particular geographic locations of the worksite.

Additionally, control system 1304 can be located on vehicles 1370 such that vehicles 1370 can generate action signals to control an action of mobile machine 100 (e.g., adjusting an operating parameter of one or more controllable subsystems 1302), based on residue characteristics sensed by sensors 1382. Further, a residue characteristic confidence output, such as a residue characteristic confidence map can be generated by control system 1304 on vehicles 1370, or on the basis of data collected by vehicles 1370, to be used for the control of mobile machine 100.

As illustrated, vehicles 1370 can include a communication system 1385 configured to communicate with other components of agricultural system 1300, such as mobile machine 100 or remote computing systems 1368, as well as between components of vehicles 1370.

Before discussing the overall operation of mobile machine 100, a brief description of some of the items in mobile machine 100, and their operation, will first be provided.

Communication system 1306 can include wireless communication logic, which can be substantially any wireless communication system that can be used by the systems and components of mobile machine 100 to communicate information to other items, such as among control system 1304, data stores 1308, sensors 1310, controllable subsystems 1302, and residue characteristic confidence system 1330. In another example, communication system 1306 communicates over a controller area network (CAN) bus (or another network, such as an Ethernet network, etc.) to communicate information between those items. This information can include the various sensor signals and output signals generated by the sensor characteristics and/or sensed characteristics, and other items. Thus, in some examples, communication system 1306 can be a wireless communication system, a wired communication system, or include a combination of both.

Observation sensor systems 1342 are configured to sense various characteristics around mobile machine 100, such as residue characteristics relative to the worksite (e.g., field) at which mobile machine 100 operates. Observation sensor systems 1342 can, in one example, include imaging systems, such as cameras. In other examples, perceptions systems 1342 can include lidars, radars, as well as a variety of other sensing systems. Observation sensor systems 1342 can include one or more sensors, such as one or more imaging systems (e.g., mono or stereo cameras), optical sensors, radar, lidar, ultrasonic sensors, thermal or infrared sensors, as well as various other sensors, such as sensors that emit and/or receive electromagnetic radiation.

Operating parameter sensors 1348 are configured to sense various operation parameters of the mobile machine 100 or components of mobile machine 100. For instance, operating parameter sensors 1348 can include position sensors that sense the position (e.g., height, angle, depth, extension, etc.) of various components of mobile machine 100. Detecting the position can include detecting the spacing between one or more components, or the position of one component relative to another component. Operating parameter sensors 1348 can include sensors that detect the flow rate of various materials, such as the flow rate of crop material, the flow rate of material to be applied to the field (e.g., material to sprayed), the flow rate of seeds to be planted, the flow rate of fluid, such as hydraulic fluid or air, used to drive one or more actuators. Operating parameters sensors 1348 can include sensors that detect the pressure of fluid, such as hydraulic fluid or air. Operating parameter sensors 1348 can include power sensors, such as current or voltage sensors, that detect a power output by the powerplant (e.g., internal combustion engine, electric motor, etc.) or the power provided to a subsystem or component of mobile machine 100. Operating parameter sensors 1348 can include speed sensors that detect a speed with which a component of mobile machine 100 operates. Operating parameter sensors can include sensors that detect a downforce applied to one or more components of mobile machine 100. Operating parameter sensors 1348 can include various other sensors.

Geographic position sensors 1346 illustratively sense or detect the geographic position or location of mobile machine 100. Geographic position sensors 1346 can include, but are not limited to, a global navigation satellite system (GNSS) receiver that receives signals from a GNSS satellite transmitter. Geographic position sensors 1346 can also include a real-time kinematic (RTK) component that is configured to enhance the precision of position data derived from the GNSS signal. Geographic position sensors 1346 can include a dead reckoning system, a cellular triangulation system, or any of a variety of other geographic position sensors.

Heading/speed sensors 1352 detect a heading and speed at which mobile machine 100 is traversing the worksite during the operation. This can include sensors that sense the movement of ground-engaging elements (e.g., wheels or tracks of a towing vehicle or an implement, or both), or can utilize signals received from other sources, such as geographic position sensor 1346, thus, while heading/speed sensors 1352 as described herein are shown as separate from geographic position sensor 1346, in some examples, machine heading/speed is derived from signals received from geographic positions sensor 1346 and subsequent processing. In other examples, heading/speed sensors 1352 are separate sensors and do not utilize signals received from other sources.

Weather sensors 1350 are configured to sense various weather characteristics relative to the worksite. For example, weather sensors 1350 can detect the direction and speed of wind traveling over the worksite. Weather sensors 1350 can detect precipitation, humidity, temperature, as well as numerous other conditions. In some examples, weather data is derived from a remote weather service or station as well.

Other sensors 1352 can include various other sensors that sense various other characteristics. Other sensors 1352 can include any of the other sensors described in FIGS. 1-5.

Sensors 1310 can comprise any number of different types of sensors. Such as potentiometers, Hall Effect sensors, various mechanical and/or electrical sensors. Sensors 1310 can also comprise various electromagnetic radiation (ER) sensors, optical sensors, imaging sensors, thermal sensors, lidar, radar, ultrasonic, sonar, radio frequency sensors, audio sensors, inertial measurement units, accelerometers, pressure sensors, flowmeters, etc. Additionally, while multiple sensors are shown detecting or otherwise sensing respective characteristics, sensors 1310 can include a sensor configured to sense or detect a variety of the different characteristics and can produce a single sensor signal indicative of the multiple characteristics. For instance, sensors 1310 can comprise an imaging system. The imaging system can generate an image that is indicative of multiple characteristics.

Controllable subsystems 1302 illustratively include one or more actuators 1314, steering subsystem 1316, propulsion subsystem 1318, and can include other subsystems 1320 as well. The controllable subsystems 302 are now briefly described.

Actuators 1314 are generally configured to control the position (e.g., height, roll, tilt, etc.) or otherwise actuate movement of various components of mobile machine 100. Actuators 1314 can also be configured to apply a force (e.g., a downforce, etc.) to various components of mobile machine 100. Actuators 1314 can be a variety of different types of actuators, such as hydraulic actuators, pneumatic actuators, electromechanical actuators and a variety of other types of actuators. In some examples, actuators 1314 can be in the form of motors, such as hydraulic motors, pneumatic motors, and electrical motors. In some examples, actuators 1314 can include pumps or valves. Actuators 1314 can include any of the actuators described above in FIG. 1-5.

Steering subsystem 1316 is configured to control the heading of mobile machine 100, by steering the ground engaging elements (e.g., wheels or tracks). Steering subsystem 1316 can adjust the heading of mobile machine 100 based on action signals generated by control system 1304. For example, based on sensor signals generated by sensors 1310 indicative of agricultural characteristics, such as residue characteristics, control system 1304 can generate action signals to control steering subsystem 1316 to adjust the heading of mobile machine 100. In another example, control system 1304 can generate action signals to control steering subsystem 1316 to adjust the heading of mobile machine 100 to comply with a commanded route, such as an operator or user commanded route, or, and as will be described in more detail below, a route based on an residue characteristic confidence output, such as a residue characteristic confidence map, generated by residue characteristic confidence system 1330, as well as various other commanded routes.

Propulsion subsystem 1318 is configured to propel mobile machine 100 over the worksite surface, such as by driving movement of ground engaging elements (e.g., wheels or tracks). It can include a powerplant, such as an internal combustion engine or other type of powerplant, a set of ground engaging elements, as well as other power train components. In one example, propulsion subsystem 1318 can adjust the speed of mobile machine 100 based on action signals generated by control system 1304, which can be based upon various characteristics sensed or detected by sensors 1310, a residue characteristic confidence output, such as a residue characteristic confidence map, generated by residue characteristic confidence system 1330, as well as various other bases, such as operator or user inputs.

Other subsystem(s) 1320 can include various other controllable subsystems.

Control system 1304 is configured to receive or otherwise obtain various data and other inputs, such as sensor signals, user or operator inputs, data from data stores, and various other types of data or inputs. Based on the data and inputs, control system 1304 can make various determinations and generate various action signals.

Control system 1304 can include residue characteristic confidence system 1330. Residue characteristic confidence system 1330 can, based on information accessed within data stores (e.g., 1308, 1378, etc.) or data received from sensors (e.g., 1310, 1382, etc.), determine a confidence level in the residue characteristics of a worksite indicated by a prior residue map and generate various residue characteristic confidence outputs indicative of the determined residue characteristic confidence level. For example, residue characteristic confidence system 1330 can generate residue characteristic confidence outputs as representations indicative of the residue characteristic confidence level for the worksite or for various portions of the worksite. The representations indicative of the residue characteristic confidence level for the worksite or various portions of the worksite can be qualitative or quantitative, and expressed in a variety of ways. The representations can be numeric, such as percentages (e.g., 0%-100%) or scalar values, gradation or scaled (e.g., A-F, "high, medium, low", 1-10, etc.), advisory (e.g., caution, proceed, slow, scout first, avoid, etc.), as well as various other representations. Additionally, residue characteristic confidence system 1330 can generate, as a residue characteristic confidence output, a residue characteristic confidence map that indicates the residue characteristic confidence level for the worksite or for particular portions (e.g., locations) of the worksite.

The residue characteristic confidence outputs can be used by control system 1304 to generate a variety of action signals to control an action of mobile machine 100 as well as other components of agricultural system 1300, such as vehicles 1370, remote computing systems 1368, etc. For example, based on the residue characteristic confidence output, control system 1304 can generate an action signal to provide an indication (e.g., alert, display, notification, recommendation, etc.) on a variety of interfaces or interface mechanisms, such operator interfaces or user interfaces 1364. The indication can include an audio, a visual, or a haptic output. In another example, based on the residue characteristic confidence output, control system 1304 can generate an action signal to control an action of one or more of the various components of agricultural system 1300, such as operating parameters of one or more of controllable subsystems 1302 or controllable subsystems 1380. For instance, based on the residue characteristic confidence output, control system 1304 can generate an action signal to control actuators(s) 1314. Control system 1304 can also control steering subsystem 1316 to control a heading of mobile machine 100, and propulsion subsystem 1318 to control a speed of mobile machine 100 based on the residue characteristic confidence outputs. These are examples only. Control system 1304 can generate any number of action signals based on a residue characteristic confidence output generated by residue characteristic confidence system 1330 to control any number of actions of the components in agricultural system 1300.

Control system 1304 can include various other items 1334, such as other controllers. For example, control system 1304 can include a dedicated controller corresponding to each one of the various controllable subsystems. Such dedicated controllers may include one or more actuator controllers to control the one or more actuators 1314, controller, a steering subsystem controller, a propulsion subsystem controller, as well as various other controllers for various other controllable subsystems. Additionally, control system 1304 can include various logic components, for example, sensor signal processing logic, such as image processing logic. Sensor signal processing logic can process sensor signals generated by sensors 1310 (e.g., images generated by perception systems 342), to extract data, such as characteristic values, from the sensor signals. Signal processing logic can utilize a variety of processing functionalities, such as RGB, edge detection, black/white analysis, machine learning, neural networks, pixel testing, pixel clustering, shape detection, filtering, such as noise filtering, categorization, aggregation, as well any number of other suitable image processing and data extraction functionalities.

FIG. 6 also shows that data stores 1308 can include map data 1336, supplemental data 1338, as well as various other data 1340. Map data 1336 can include one or more maps of a worksite that indicate characteristics (or values of characteristics) at geographic locations of the worksite. The maps can include, for example, residue maps that map residue characteristics (or values of residue characteristics) at different geographic locations across the worksite. The maps can also include, for example, topographic maps, soil type maps, soil moisture maps, crop genotype maps (e.g., derived from a planting operation on the worksite), vegetative index maps, optical characteristic maps, yield maps, field feature maps (e.g., that show locations and characteristics, such as directionality, of field features such as tiling standpipes, field drains, drainage ditches, etc.), as well as a variety of other types of maps. The maps can include georeferenced data represented in various ways, such as geotagged data, rasters, polygons, point clouds, as well in various other ways. The map can be generated based on outputs from sensors during a survey or fly-over of the worksite as well from previous passes or operations of a mobile machine on the worksite. The maps may be generated on the basis of data that is collected during a bare field condition when the field surface has substantially no obscurity due to vegetation, such as during post-harvest, prior to planting, right after planting, etc. The maps can be used in the control of mobile machine 100 as it travels over the worksite, or, as will be described further below, as a baseline.

Supplemental data 1338 can include a variety of data indicative of various characteristics relative to the worksite that is obtained or collected (e.g., generated) at a time later than the time the data for the prior map (e.g., prior residue map) was collected (e.g., generated). In one example, supplemental data 1338 includes any of a variety of data that can indicate a characteristic or condition that can affect the residue characteristics of the worksite. This can include data obtained or collected prior to mobile machine 100 operating on the worksite as well as in-situ data (e.g., from sensors 1310 or 1382). Supplemental data can include weather data (e.g., precipitation data, such as amount and type, wind data, such as speed and direction, as well as weather events such as the occurrence of tornadoes, hurricanes, storms, tsunamis, etc.), environmental data (e.g., waves and tides), event data (e.g., fires, volcanoes, floods, earthquakes, etc.), topographic data (e.g., generated by sensors on a machine traveling over the worksite, fly over, such as lidar data, additional operation, etc.), vegetation data (e.g., images of the vegetation, vegetation genotype, vegetation height, vegetation density, yield, biomass, crop volume, weed type, weed density, weed height, vegetative index data, such as NDVI and/or LAI data, vegetation state data, such as whether the vegetation is down or standing, the magnitude and direction of downing, etc.), activity data (e.g., data that indicates that human activity occurred on the worksite, such as operations of other machines, etc.), additional images of the worksite, as well as various other supplemental data. Supplemental data can be obtained from various sources, such as machines performing surveys or flyovers of the worksite, machine performing operations at the worksite, various other sensors, such as fixed sensors in the worksite, weather stations, news sources, the Internet, operator or user inputs, human surveys of the worksite, as well as a variety of other sources. Supplemental data can also be obtained or collected by and received from sensors on mobile machine 100 or sensors on vehicles 1370 during operation (e.g., in-situ) or prior to operation.

The supplemental data 1338 can be indicative of a variety of characteristics relative to the worksite. Based on the supplemental data, residue characteristic confidence system 1330 can determine a confidence in the residue characteristics of the worksite indicated by a prior residue map. In one example, residue characteristic confidence system 1330 can determine whether a change to the residue characteristics of the worksite has occurred or has likely occurred based on the indications provided by the supplemental data. For example, if certain weather conditions have occurred (e.g., certain levels of precipitation or wind, or both) after the data for the prior residue map was collected, residue characteristic confidence system 1330 can determine that the residue characteristic at the worksite, or the residue characteristic at particular geographic locations within the worksite, has changed or has likely changed. For example, based on high levels of rainfall occurring after the data for a residue map was collected, residue characteristic confidence system 1330 can determine that the residue levels indicated by the residue map have or have likely changed. For example, residue may be moved from one location on the field to another location on the field (or to a location off the field) due to water run-off. This is merely an example. Residue characteristic confidence system 1330 can determine a confidence in the residue characteristics of the worksite or of particular geographic locations within the worksite based on any number of indications provided by supplemental data, and any combinations thereof. Further, it will be noted that the term likely means, in one example, a threshold likelihood or probability that a current residue characteristic level deviates by a threshold amount from residue characteristics indicated by the prior residue map. In one example, the threshold can be input by an operator or user or set automatically by residue characteristic confidence system 1330 indicating a level of deviation from the residue characteristics indicated by the prior residue map.

Other data 1340 can include a variety of other data, such as historical data relative to operations on the worksite, historical data relative to characteristics and conditions relative to the worksite, as well as historical data indicative of the occurrence of historical residue characteristic changes to the worksite due to various conditions (e.g., weather). This type of information can be used by residue characteristic confidence system 1330 to determine a likelihood of a change in residue characteristics occurring or having occurred presently.

Figure 7:
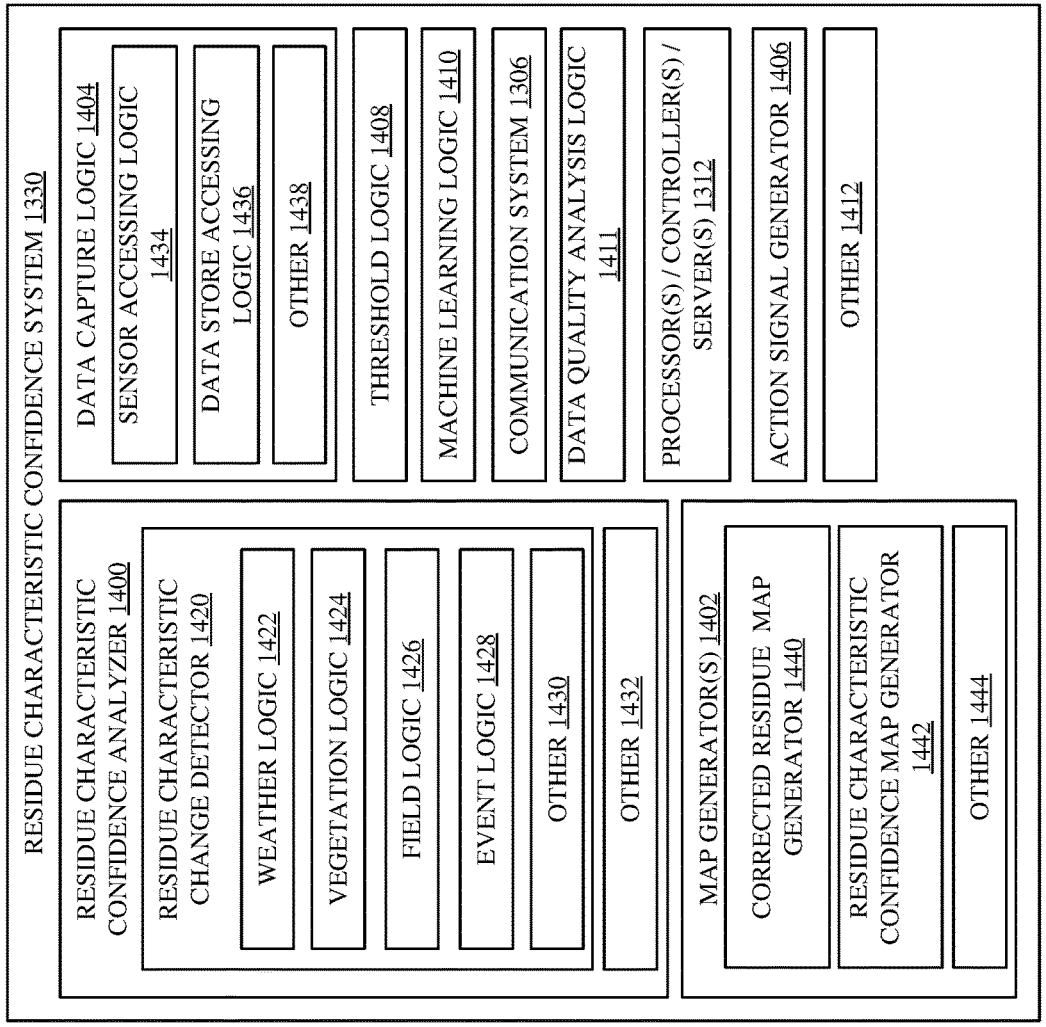
FIG. 7 is a block diagram of one example of a residue characteristic confidence system, in more detail.

FIG. 7 is a block diagram illustrating one example of residue characteristic confidence system 1330 in more detail. Residue characteristic confidence system 1330 can include communication system 1306, one or more processors, controllers, or servers 1312, residue characteristic confidence analyzer 1400, map generator(s) 1402, data capture logic 1404, action signal generator 1406, threshold logic 1408, machine-learning logic 1410, data quality analysis logic 1411, and can include other items 1412 as well. Residue characteristic confidence analyzer 1400, itself, can include residue characteristic change detector 1420 and it can include other items 1432 as well. Map generator(s) 1402, itself, can include corrected residue map generator 1440, residue characteristic confidence map generator 1442, and can include other items 1444 as well. Data capture logic 1404, itself, can include sensor accessing logic 1434, data store accessing logic 1436, and it can include other items 1438 as well.

In operation, residue characteristic confidence system 1330 determines a confidence level in the residue characteristics relative to a worksite as indicated by a prior residue map of the worksite, based on, among other things, available supplemental data relative to the worksite. In some examples, residue characteristic confidence system 1330 determines a confidence level in the residue characteristics relative to a worksite as indicated by a prior residue map of the worksite, based on supplemental data relative to the worksite, as well as based on various other data, such as data indicated by the prior residue map, and a variety of other data. As an example, residue characteristic confidence system 1330 can determine a confidence level in the residue characteristics relative to a worksite as indicated by a prior residue map of the worksite, based on supplemental data as well as residue characteristics indicated in the prior residue map. Residue characteristic confidence system 1330 can generate a variety of residue characteristic confidence outputs, such as various representations of the residue characteristic confidence level, a corrected residue map, or a residue characteristic confidence map, as well as various other outputs. Residue characteristic confidence system 1330 can generate action signals to control the operation of various components of agricultural system 1300 (e.g., mobile machine 100, vehicles 1370, remote computing systems 1368, etc.), as well as to control the operation of various components or items of the components of agricultural system 1300, such as controllable subsystems 1302 of mobile machine 100. Further, residue characteristic confidence system 1330 can generate action signals to provide indications such as displays, recommendations, alerts, notifications, as well as various other indications on an interface or interface mechanism, such as on operator interfaces 1360 or user interfaces 1364, or both. The indications can include audio, visual, or haptic outputs.

The residue characteristic confidence level can be indicative of a confidence that the residue characteristics of the worksite are the same (or substantially the same) or are otherwise accurately or reliably represented by the residue characteristics in the prior residue map of the worksite. In some examples, the residue characteristic confidence level can indicate a likelihood that the residue characteristics of the worksite, as indicated by the prior residue map, have changed, or the residue characteristic confidence level can indicate a likelihood that the residue characteristics of the worksite, as indicated by the prior residue map, are the same (or substantially the same) or are otherwise accurately or reliably represented by the prior residue map of the worksite. In some examples, a representation of the residue characteristic confidence level can indicate both the likelihood that the residue characteristics of the worksite, as indicated by the prior residue map, are the same (or substantially the same) or are otherwise accurately or reliably represented by the residue characteristics in the prior residue map, and a likelihood that the residue characteristics, as indicated by the prior residue map, have changed. For instance, a representation in the form of a percentage, such as "80%" can indicate an 80% likelihood that the residue characteristics of the worksite are the same (or substantially the same) or are otherwise accurately or reliably represented by the prior residue map, and therefore the representation simultaneously indicates a 20% likelihood that the residue characteristics of the worksite have changed. This is merely an example.

Data capture logic 1404 captures or obtains data that can be used by other items in residue characteristic confidence system 1330. Data capture logic 1404 can include sensor accessing logic 1434, data store accessing logic 1436, and other logic 1438. Sensor accessing logic 1434 can be used by residue characteristic confidence system 1330 to obtain or otherwise access sensor data (or values indicative of the sensed variables/characteristics) provided from sensors 1310, as well as other sensors such as sensors 1382 of vehicles 1370, that can be used to determine a residue characteristic confidence level. For illustration, but not by limitation, sensor accessing logic 1434 can obtain sensor signals indicative of characteristics relative to a residue characteristic of the worksite at which mobile machine 100 or vehicles 1370 are operating. Such characteristics may be indicative of a change in the residue characteristics at the worksite.

Additionally, data store accessing logic 1436 can be used to obtain or otherwise access data previously stored on data stores 1308 or 1378, or data stored at remote computing systems 1368. For example, this can include map data 1336, supplement data 1338, as well as a variety of other data 1340. For illustration, but not by limitation, data store accessing logic 1436 can obtain data indicative of characteristics relative to the worksite at which mobile machine 100 or vehicles 1370 are operating or are to operate. Such characteristics may be indicative of a change in the residue characteristics of the worksite such as weather data, event data, activity data, environmental data, vegetation data, field data, as well as various other data.

Upon obtaining various data, residue characteristic confidence analyzer 1400 analyzes the data to determine a confidence level in the residue characteristics indicated or otherwise provided by a prior residue map. Residue characteristic confidence analyzer 1400 can include residue characteristic change detector 1420, and it can include other items 1432. Residue characteristic change detector 1420, itself, can include weather logic 1422, vegetation logic 1424, field logic 1426, event logic 1428, and can include various other logic 1430 as well.

Based upon the residue characteristic confidence level, residue characteristic confidence system 1330 can use action signal generator 1406 to generate a variety of action signals to control the operation of the components of agricultural system 1300 (e.g., mobile machine 100, remote computing systems 1368, vehicles 1370, etc.) or to provide indications, such as displays, recommendations, or other indications (e.g., alerts) on an interface or interface mechanisms. The indications can include audio, visual, or haptic outputs. For instance, based on the residue characteristic confidence level, residue characteristic confidence system 1330 can generate an action signal to control parameters (e.g., position, speed, etc.) of various components of mobile machine 100, to control the travel speed of mobile machine 100, to control the heading or route of mobile machine 100, and/or to control various other operating parameters of mobile machine 100. In another example, based on the residue characteristic confidence level, a display, recommendation, and/or other indication can be generated and surfaced to an operator 1362 on an operator interface 1360 or to a remote user 1366 on a user interface 1364, or both. Based on the generated displays, operators 1362 or remote users 1366 can manually (e.g., via an input on an interface) adjust the settings or operation of a component of agricultural system 1300. These are merely examples, and residue characteristic confidence system 1330 can generate any number of action signals used to control any number of machine settings or operations of any number of machines or to generate any number of displays, recommendations, or other indications.

It will be noted that residue characteristic confidence analyzer 1400 can implement or otherwise utilize a variety of functionalities, such as various image processing functionalities, statistical analysis techniques, various models (e.g., residue model, such as a residue drift model, as well as various other models), numeric equations, neural networks, machine learning, knowledge systems (e.g., expert knowledge systems, operator or user knowledge systems, etc.), fuzzy logic, rule-based systems, as well as various other functionalities and any combinations thereof.

Residue characteristic change detector 1420 determines change (e.g., deviation) or a likelihood of change to the residue characteristics of the worksite from the residue characteristics indicated by the prior residue map. In some examples, determining a change comprises determining a change or a likely change in the residue characteristics of the worksite, not indicated by the prior residue characteristic map. In other examples, determining a change comprises detecting a characteristic relative to the worksite that is indicative of a likely change to the residue characteristics of the worksite. For instance, the detection of weather conditions (e.g., heavy or light precipitation, heavy or low wind, as well as a variety of other weather conditions) or weather events (e.g., flood), that indicate a likely change to the residue characteristics of the worksite. In another example, the detection of characteristics relative to the worksite (e.g., such as downed crop, standing water, as well as a variety of other characteristics), that indicate a likely change to the residue characteristics of the worksite. For instance, the presence of downed crop may indicate the occurrence of high winds, and thus a likelihood that residue at the field may have moved. Standing water at the field may also indicate the occurrence of heavy precipitation or flooding, and thus a likelihood that residue at the field may have moved.

It will be noted that while a single characteristic can indicate a change or a likely change in the residue characteristics of the worksite, it can also be that a combination of a variety of characteristics form the basis for the detection or determination that a change or likely change has occurred. As an example, such a combination of characteristics can include a consideration of the weather conditions (e.g., wind speed and direction), the topographic characteristics of the worksite or of a particular area of the worksite, and the previous moisture of the worksite or particular area of the worksite. For example, higher moisture residue may be less likely to move during wind conditions. Additionally, genotypes of plants may have unique characteristics, such as the size and density of material other than grain (which eventually becomes residue). These genotype specific characteristics may make plant residue movement more or less likely in given circumstances. Further, topographic characteristics of the field can make residue movement more or less likely. For example, high areas of the field may be exposed to more wind as well more weather conditions (such as more sun exposure which may dry the ground or the residue more than in low spots). Additionally, water will run-off high spots of the field, and such run-off may cause the migration of residue. Thus, topographic characteristics of the worksite may make residue movement more or less likely. Further, soil characteristics, such as soil type or soil moisture, or both, may make residue movement more or less likely. For example, residue may be more likely to become embedded in higher moisture soil or soils of certain types, and thus will be less likely to migrate in given circumstances.

Additionally, characteristics of the residue, which may be indicated by the prior residue map, may make movement more or less likely. For example, the size of the residue may make movement more or less likely. For instance, settings of an agricultural harvester may produce residue of variable size. The larger the residue the less likely it may be to move in given circumstances. These are merely some examples. In another example, the row direction, spacing, and orientation of residue (e.g., cut crop stalks or stubble) can also effect the likelihood of a change in residue characteristics at the field. For instance, taller stubble may make residue movement less likely than for shorter stubble as the residue may be prevented from movement by the taller standing stubble. For example, taller stubble may prevent residue from moving in high winds as the residue may be prevented from blowing over and past the taller crop stubble. In another example, the direction and spacing of the crop row (and thus the stubble row) relative to the wind direction may play a factor in how residue will move. For instance, residue may be prevented from blowing across the rows but may move in the space between the rows in the direction of the rows relative to the direction of the wind. These are merely examples. In any case, it can be seen that residue characteristic change detector 1420 can determine a change or a likely change in the residue characteristics of the worksite based on characteristics of the residue, which may be provided by the prior residue map, in addition to a consideration of supplemental data.

It will be understood that a variety of characteristics can be considered by residue characteristic change detector 1420 when determining if a change in residue characteristics occurred or likely occurred.

Weather logic 1422 is configured to analyze weather data accessed from data stores, received from sensors, such as weather sensors 1350, or operator or user inputs, or other sources such as remote weather services or stations, internet sources, etc. Weather logic 1422 determines if the residue characteristics of the worksite (as indicated by the prior residue map) have changed or are likely to have changed. For instance, weather logic 1422 can receive various data indicative of weather conditions that occurred in the time after the data was collected for the prior residue map, such as precipitation types (e.g., hail, rain, snow, various other precipitation) and levels (e.g., amounts, such as inches or size, or both, as well as time span in which it occurred), temperature, humidity, wind speeds and direction, and various other weather conditions. As an example, assume that weather logic 1422 receives weather data that indicates that the worksite received wind at speeds of 50 miles per hour (MPH) from the Northwest over a 4 hour period. Weather logic 1422 can determine that a change in the residue characteristics of the worksite or of particular geographic locations within the worksite has occurred or has likely occurred or that the residue characteristics indicated (e.g., estimated, predicted, etc.) by the prior residue map are no longer accurate. This determination can be based solely on the weather data, or it can be based on a combination of the weather data and other characteristics relative to the worksite such as vegetation type (e.g., genotype of plant(s) the residue is from), previous residue moisture levels, soil characteristics (e.g., soil type, soil moisture, etc.), topographic characteristics, as well as various other characteristics.

In another example, weather logic 1422 can receive or otherwise obtain various data indicative of weather events that occurred in the time after the data for the prior map was collected, such as storms, tornadoes, hurricanes, tsunamis, floods, as well as various other weather events. For example, weather logic 1422 can receive weather data that indicates that the worksite flooded and can determine that a change in the residue characteristics of the worksite or of particular geographic locations within the worksite has occurred or has likely occurred. Weather logic 1422 can make these determinations based on various models, such as weather models, river gage readings, water run-off models, as well as various other models.

Vegetation logic 1424 is configured to analyze vegetation data which may be accessed from data stores, received from sensors, such as imaging sensors that image the worksite during an aerial survey (e.g., satellite, drone, fly-over, etc.), as well as various other sources of vegetation data. Vegetation logic 1424 determines whether a change in the residue characteristics of the field from that indicated by the prior residue characteristic map has occurred or is likely to have occurred. For instance, vegetation logic 1424 can receive various data indicative of vegetation characteristics or conditions that occurred or otherwise presented in the time after the data for the prior map was collected. This data can include vegetation data such as vegetation state data, such as the occurrence of vegetation downing as well as the direction and magnitude of downing, crop row spacing and direction, vegetation moisture data, vegetation stress, vegetation density, vegetation height, vegetative index data, such as NDVI data or LAI data, as well as various other vegetation data. For example, vegetation logic 1424 can receive vegetation data (e.g., LAI, NDVI, etc.) that indicates that the vegetation is less vigorous than an expected level at the worksite or at particular geographic locations of the worksite and can determine that a change in the residue characteristics of the worksite or of particular geographic locations within the worksite has occurred or has likely occurred. For instance, less vigorous vegetation growth or density, can be an indicator of dry conditions at the worksite, which may indicate that the residue at the worksite is dryer, and more likely to move. Additionally, areas with heavy residue levels may also experience less vegetation growth. Thus, less vigorous vegetation growth or density, or a lack of vegetation growth, may be an indicator of residue levels. In another example, the relative size of vegetation at the field may make residue movement more or less likely or may confine residue movement. For instance, taller or denser vegetation may prevent movement of residue during high winds. Additionally, the spacing and direction of crop rows at the field may make residue movement more or less likely or may confine residue movement. For instance, residue may be prevented from blowing across crop rows during high winds but may move in the space between crop rows in the direction of the rows. These are merely some examples.

This determination can be based solely on the vegetation data, or it can be based on a combination of the vegetation data and other characteristics relative to the worksite. For example, based on the vegetation data (e.g., vegetation moisture data, etc.) and weather data (e.g., high winds), vegetation logic 1424 can determine that a change in the residue characteristics likely occurred at the worksite or at a particular geographic location within the worksite, for example, due to high winds at the worksite where the residue was relatively dry, the residue likely moved. This is merely an example.

Field logic 1426 is configured to analyze field data accessed from data stores, received from sensors such as field characteristic sensors, or received from operator or user inputs, as well as various other sources of field data. Field logic 1426 can determine whether a change in the residue characteristics of the worksite from that indicated by the prior residue map has occurred or is likely to have occurred. For instance, field logic 1426 can receive various data indicative of topographic characteristics (e.g., slope, elevation, etc.) of the field, soil characteristics of the field, such as soil moisture, soil type, soil compaction, field features, such as the location and directionality of drainage feature such as drainage tiles, drainage ditches, etc., as well as a variety of other field characteristics. For example, field logic 1426 can receive field data that indicates that the soil at the worksite or at particular geographic locations within the worksite is at a certain level of moisture and based on the moisture level soil logic 1426 may determine that it is more or less likely that residue characteristics have changed. For instance, a sudden increase in soil moisture may indicate the occurrence of heavy precipitation or flooding, which may cause residue movement. These are merely some examples.

In other examples, this determination can be based on a combination of field data and other characteristics relative to the worksite. For example, based on field data, such as soil moisture or soil type, the topography of the field, and weather data, such as wind speed and direction, field logic 1426 may determine a likelihood that residue characteristics changed. Additionally, field logic 1426 can make these determinations based on a variety of models.

Event logic 1428 is configured to analyze event data accessed from data stores, received from sensors, received from operator or user inputs, as well as various other sources of event data, such as news sources. Event logic 1428 can determine whether a change in the residue characteristics of the worksite from that indicated by the prior residue map has occurred or is likely to have occurred. For instance, event logic 1428 can receive various data indicative of events that occurred in the time after the data for the prior residue map was collected, such as, event data indicative of the occurrence of natural events (e.g., volcanoes, fires, earthquakes, as well as various other natural events) as well as event data indicative of human activity, as well as various other event data. As an example, event logic 1428 can receive event data that indicates that a fire or a volcano eruption occurred near (or near enough) to the worksite such that ash from fire(s) or volcano(es) or other sediment deposit may have occurred and can determine that a change in the residue characteristics of the worksite or of particular geographic locations within the worksite has occurred or has likely occurred. This determination can be based solely on the event data, or it can be based on a combination of the event data and other characteristics relative to the worksite. For example, event logic 1428 can determine that residue deposit has occurred or has likely occurred at the worksite or at a particular geographic location within the worksite based on the event data indicating the occurrence of a fire or a volcano eruption and weather characteristics (e.g., wind speed and direction during time of fire or volcano eruption). These are merely some examples.

In another example, event logic 1428 can receive various event data indicative of the occurrence of non-natural activities occurring at the worksite in the time after the data for the prior residue map was collected, such as event data that indicates that another operation occurred (e.g., agricultural planting operation, agricultural spraying operation, agricultural tillage operation, agricultural irrigation operation, etc.), and can determine that a change in the residue characteristics has occurred or has likely occurred. For instance, event logic 1428 can receive event data indicative of a planting or tillage operation occurring at the worksite after the data for the prior residue map was collected and before the current operation is to be performed and determines that a change in the residue characteristics at the worksite or at particular geographic locations within the worksite has occurred or has likely occurred. For examples, the machines performing the previous operation may include tools that interact with the residue at the field at move the residue. Event logic 1428 can, in making such a determination, also consider various other data, such as weather data, to determine the likelihood of a change in the residue characteristics of the field. These are merely examples. Additionally, event logic 1428 can make these determinations using various models.

Other logic 1430 can include various other logic configured to analyze a variety of other data (e.g., accessed from data store(s), received from sensor(s), operator/user inputs, as well as various other sources of data) and determine if a change in the residue characteristics of the worksite (as indicated by the prior residue map) has occurred or is likely to have occurred.

It will be noted that these are merely some examples of the logic and the operations of the logic that can be included as part of residue characteristic confidence system 1330.

It will be understood that the determination(s) that a change in the residue characteristics of a worksite of particular geographic locations within the worksite has occurred or has likely occurred can be based on a single type of data or on a combination of data, as well on a single characteristic or on a combination of various characteristics. In some examples, the number of indications can affect the residue characteristic confidence level. For instance, the presence of a single characteristic (e.g., high winds) can indicate that a change has occurred or has likely occurred, however the presence of multiple characteristics can indicate that a change has occurred or has likely occurred to a greater or lesser degree. For example, while an indication that high winds have occurred can indicate a change in a residue characteristic, high wind combined with, for instance, data that indicates residue is located at higher elevations, that residue is oriented in a certain direction relative to the wind direction or that that residue row (e.g., stubble row) is in a certain direction relative to the wind direction, the stubble height, and/or that the residue was relatively dry at the time of the high wind, can affect the confidence value in the residue characteristics of that particular location (as indicated by the prior residue map) to a greater degree. For example, it can lead to determination that a change to the residue characteristics has likely occurred to a relatively higher degree of likelihood. Keeping with the above example, an indication that the field has experienced high wind, without accompanying indication(s), such as the elevation of the residue, the orientation of the residue, the residue row direction, the stubble height, and/or the residue moisture can affect the confidence value to a lesser degree. For example, it can lead to a determination that a change to the residue characteristics may have occurred with a relatively lower degree of likelihood. These are merely examples.

Map generator(s) 1402 are configured to generate a variety of maps based on the prior residue map(s) (as well as other maps contained in map data 1336), the supplemental data 1338, as well as various other data 1340. In some examples, the supplemental data 1338 provides an indication of a determined change in the residue characteristics of the worksite. In such a case, corrected (or supplemental) residue characteristic map generator 1440 can incorporate the determined change to the residue characteristics as indicated by the supplemental data with the prior residue map to generate a corrected (or supplemental) residue map. For example, in some instances, residue characteristics of the worksite may be detectable by or visible to various sensor(s) used to generate supplemental data such that a change in the residue characteristics of the worksite (as indicated by the prior map) can be determined with a degree of certainty. In such a case, the corrected residue map generated by corrected residue map generator 1440 will reflect the change in the residue characteristics at the worksite.

In some examples, the supplemental data provides an indication of a characteristic or a condition relative to the worksite that can indicate that a change in the residue characteristic(s) of the worksite has likely occurred but cannot be confirmed with a level of certainty by the system(s) (e.g., sensor(s)) or humans collecting or otherwise inputting the data). This can be the case, for example, when a residue characteristic of the worksite is not visible due to various obscurants or when further surveying of the field is not available. In such examples, residue characteristic confidence map generator 1442 can generate a residue characteristic confidence map that indicates, among other things, the residue characteristic confidence value at the worksite or at particular geographic locations within the worksite. The residue characteristic confidence map (some examples of which are provided below) can be generated as an interactive map layer on an interactive map such that the user or operator is able to manipulate the functionality of the map layer or the map. For instance, the user or operator may be able to switch the display between the residue characteristic confidence map and the prior residue map, or to generate a split-screen with one part showing the prior residue map and another part showing the residue characteristic confidence map. Additionally, the user or operator can manipulate the display of the confidence value representation for the worksite or for particular geographic locations of the worksite, such as by changing the representation of the confidence value, or by displaying both the representation of the confidence value and the corresponding residue characteristic (or value thereof) as indicated by the prior residue map. Additionally, the map display may further include an indication of the location of mobile machine 100 on the worksite as represented by the map. These are merely examples.

It will also be understood that map generator(s) 1402 can, in some examples, generate a map that includes corrected residue characteristics and residue characteristic confidence levels. For example, for the areas of the worksite where the residue characteristics can be detected with a degree of certainty (e.g., the residue characteristic of the worksite is actually visible or further survey has been conducted), corrected or updated residue characteristics can be provided, and for the areas of the worksite where the residue characteristics cannot be detected with a degree of certainty (e.g., the residue characteristic of the worksite is not visible or no further survey is available) a residue characteristic confidence level for those areas can be provided. In this way, the map can be a mix of corrected residue characteristics and residue characteristic confidence levels. Additionally, a map can be generated that has a combination of the residue characteristics as indicated by the prior map, corrected residue characteristics, and residue characteristic confidence levels.

As illustrated in FIG. 7, residue characteristic confidence system 1330 can include action signal generator 1406. Action signal generator 1406 can generate a variety of action signals, used to control an action of components of agricultural system 1300. For instance, action signal(s) can be used to control an operation of mobile machine 100, such as controlling one or more actuators 1314 to adjust operating parameters of mobile machine 100, controlling propulsion subsystem 1318 to control a speed of mobile machine 100, controlling steering subsystem 1316 to control a heading of mobile machine 100, as well as controlling and/or adjusting a variety of other operating parameters. In another example, action signal(s) are used to provide displays, recommendations, and/or other indications (e.g., alerts) on an interface or interface mechanism, such as to an operator 1362 on an operator interface 1360 or to a remote user 1366 on a user interface 1364. The indications can include audio, visual, or haptic outputs. The indication can be indicative of the residue characteristic outputs, such as the residue characteristic confidence value or representation of the residue characteristic confidence value, a corrected residue characteristic map, a residue characteristic confidence map, as well as a variety of other displays. Additionally, action signal generator 1406 can generate action signals to control the operation of vehicles 1370 to, for instance, travel to locations on the worksite to further scout the locations to collect additional data. Similarly, action signals can be generated to recommend to the operator or user to send out a human scout to locations of the worksite to further scout the locations to collect additional data. In other examples, action signal generator 1406 can generate action signals to direct (such as by providing an indication on an interface mechanism) a human to drive, ride, or walk to an area to scout the area to collect additional data. This may include visually scouting the area or the assistance of various sensing devices (such as handheld devices) operated by the human or included on a vehicle operated by a human. The direction may be given by at least one of audio, visual, or haptic guidance. These are merely examples. Residue characteristic confidence system 1330 can generate any number of a variety of action signal(s) used to control any number of actions of any number of components of agricultural system 1300.

Threshold logic 1408 is configured to compare various characteristics of the worksite to a variety of thresholds. The thresholds can be automatically generated by system 1330 (such as by machine learning logic 1410), input by an operator or a user, or generated in various other ways. For example, thresholds may be used to determine a level of deviation from an expected value, or a level of deviation from the surrounding areas of the worksite to determine areas of the worksite that may have residue characteristic changes. For instance, if a characteristic relative to the worksite (or relative to a particular geographic location within the worksite) occurs at a threshold amount or deviates by a threshold amount from an expected level of the characteristic, then residue characteristic confidence system 1330 can be controlled to generate a residue characteristic confidence value for the worksite or the particular geographic location within the worksite, indicating that a residue characteristic change may be likely or may have occurred. For example, wind speed or precipitation levels at or above a threshold may indicate that residue movement has likely occurred. This is merely one example.

Additionally, threshold logic 1408 is configured to compare the various residue characteristic confidence values to a variety of thresholds. The thresholds can be automatically generated by system 1330 (such as by machine learning logic 1410), input by an operator or a user, as well generated in various other ways. The thresholds can be used to determine how much the residue characteristics of the worksite (as indicated by supplemental data and the corresponding residue characteristic confidence level) can deviate from the residue characteristics indicated by the prior residue map before a control of the machine(s) and/or adjustment of the operating parameters of the machine(s) in undertaken, or before a display, recommendation, or other indication (e.g., alert) is provided on an interface or interface mechanism. The indication can include audio, visual, or haptic outputs. For instance, an operator or a user can input a threshold of 95% residue characteristic confidence level, such that, only when the residue characteristic confidence level is below 95% will some action signal be generated. Additionally, the threshold may be used in the assignment of representations of the confidence value. For instance, in the example of "high, medium, and low" as representations of the residue characteristic confidence level, a threshold may indicate a range of residue characteristic confidence levels to assign to each representation. For example, 90%-99% may be represented as "high", 70%-89% may be represented as "medium", and anything below 70% may be represented as "low." These are merely examples.

FIG. 7 also shows that residue characteristic confidence system 1330 can include machine learning logic 1410. Machine learning logic 1410 can include a machine learning model that can include machine learning algorithm(s), such as, but not limited to, memory networks, Bayes systems, decision tress, Eigenvectors, Eigenvalues and Machine Learning, Evolutionary and Genetic Algorithms, Expert Systems/Rules, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning, and the like.

Machine learning logic 1410 can improve the determination of residue characteristic confidence levels by improving the algorithmic process for the determination, such as by improving the recognition of characteristics and conditions relative to the worksite that indicate change to the residue characteristics of the worksite. For example, machine learning logic 1410 can learn relationships between characteristics, factors, and/or conditions that affect the residue characteristics of the worksite. Machine learning logic 1410 can also utilize a closed-loop style learning algorithm such as one or more forms of supervised machine learning.

As illustrated in FIG. 7, residue characteristic confidence system 1330 can include data quality analysis logic 1411. In determining a confidence level in the residue characteristics of a worksite as indicated by a prior residue map, residue characteristic confidence system 1330 can utilize data quality outputs generated by data quality analysis logic 1411. Data quality analysis logic 1411 can identify or determine a quality of data, for instance a quality of data used to generate a prior residue map and/or the quality of supplemental data.

In determining the confidence in residue characteristics indicated by a prior residue map, residue characteristic confidence system can take into account the quality of the data used to generate the prior residue map as determined or identified by data quality analysis logic 1411. Data quality analysis logic 1411 can utilize various data (e.g., metadata) that indicates conditions and/or characteristic under which the data for the prior map was collected or under which the supplemental data was collected. For example, the time at which the data was collected, the sensor(s), the sensor capabilities and settings, environmental conditions (e.g., weather, meteorological conditions, obscurants, etc.), field conditions (e.g., bare field condition, etc.), the source from which it was collected, as well as a variety of other quality criteria.

Based on the data quality output indicating a quality of the data for the generation of the prior map or the quality of the supplemental data, or both, residue characteristic confidence system 1330 may determine a confidence in the residue characteristics indicated by the prior residue map. In some examples, residue characteristic confidence system 1330 may obtain or recommend obtaining an alternative prior residue map and/or use or recommend using different data for the generation of the prior residue map. Additionally, the quality of data used for the generation of the prior residue map or the quality of the supplemental data may affect the determination of the likelihood that the residue characteristics have changed.

Figure 8:
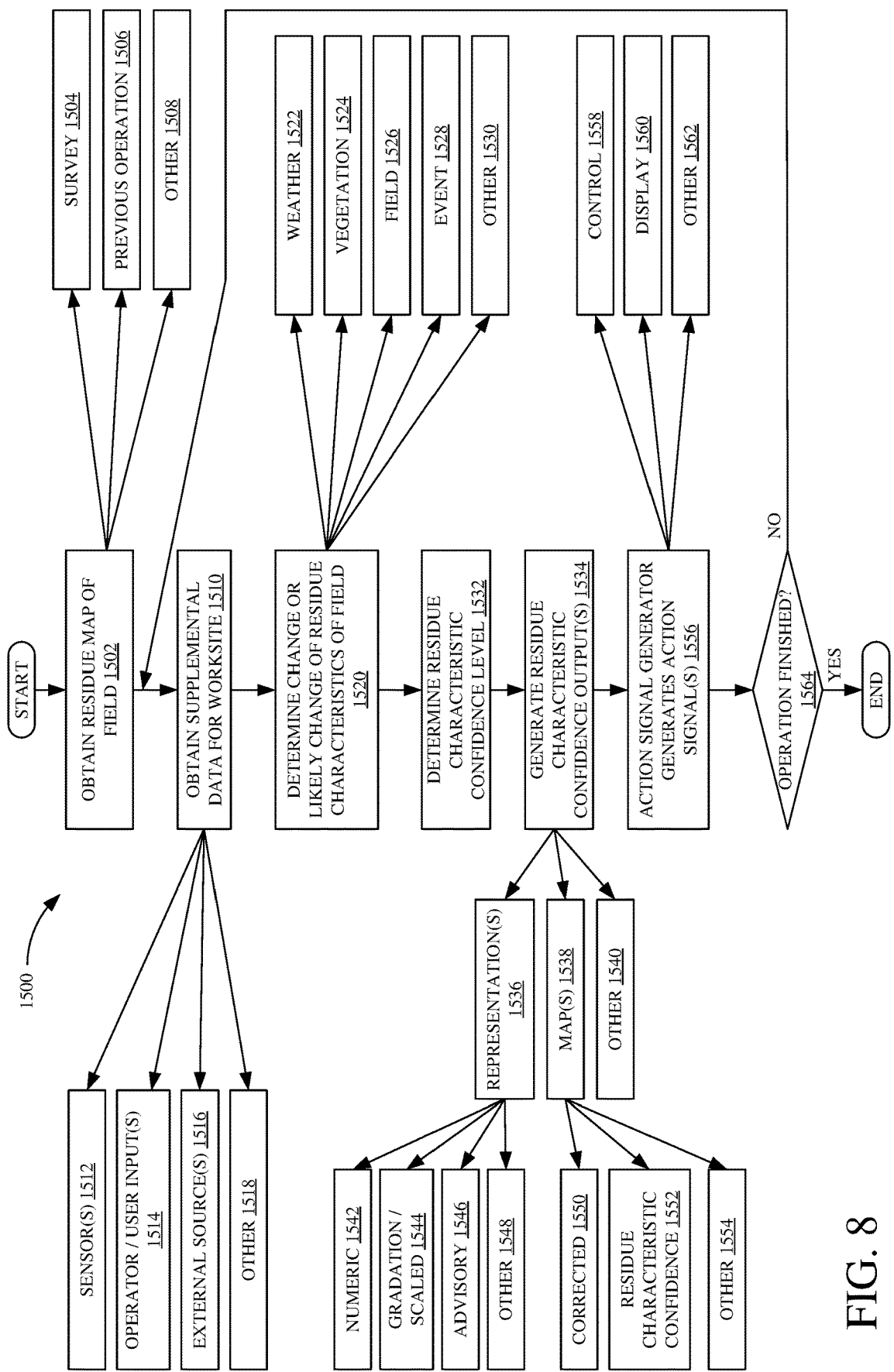
FIG. 8 is a flow diagram showing example operations of the residue characteristic confidence system illustrated in FIG. 7.

FIG. 8 is a flow diagram showing an example of the operation of the residue characteristic confidence system 1330 shown in FIG. 7 in determining a confidence in the residue characteristics of the worksite as indicated by the prior residue map based on supplemental data and generating a residue characteristic confidence output based on the determination. It is to be understood that the operation can be carried out at any time or at any point through an agricultural operation, or even if an agricultural operation is not currently underway. Further, while the operation will be described in accordance with mobile machine 100, it is to be understood that other machines with a residue characteristic confidence system 1330 can be used as well.

Processing begins at block 1502 where data capture logic 1404 obtains a residue map of a worksite (e.g., as a baseline). The residue map can be based on a survey of the worksite (e.g., an aerial survey, a satellite survey, a survey by a ground vehicle, a human survey, etc.) as indicated by block 1504, based on data from a previous operation on the worksite as indicated by block 1506, as well as based on various other data, or a combination of data, as indicated by block 1508.

Once a residue map of the worksite has been obtained at block 1502, processing proceeds at block 1510 where data capture logic 1404 obtains supplemental data for the worksite. The supplemental data can be obtained or otherwise received from various sensor(s) as indicated by block 1512, operator/user input as indicated by block 1514, various external sources (e.g., weather stations, the Internet, news sources, etc.) as indicated by block 1516, as well as from various other sources of supplemental data, as indicated by block 1518.

Once the data is obtained at blocks 1502 and 1510, processing proceeds at block 1520 where, based on the residue map (e.g., prior residue map) and the supplemental data, residue characteristic change detector 1420 of residue characteristic confidence system 1330 determines a change or a likely change in the residue characteristics of the worksite (as indicated by the prior residue map). The supplement data can indicate various characteristics, such as weather characteristics indicated by weather data and analyzed by weather logic 1422 as indicated by block 1522, vegetation characteristics indicated by vegetation data and analyzed by vegetation logic 1424 as indicated by block 1524, field characteristics indicated by field data and analyzed by field logic 1426 as indicated by block 1526, event characteristics indicated by event data and analyzed by event logic 1428 as indicated by block 528, as well as a variety of other characteristics indicated by various other data and analyzed by various other logic, as indicated by block 1530. It will be noted that residue characteristic change detector 1420 can determine a change or a likely change in the residue characteristics of the worksite (as indicated by the prior residue map) based further on characteristics of the residue, which may be indicated by the prior residue map. Thus, residue characteristic change detector 1420 can determine a change or a likely change in the residue characteristics of the worksite based on a combination of the characteristic(s) indicated by the supplemental data and residue characteristic(s).

Processing proceeds at block 1532 where, based on the determined change or determined likelihood of change to the residue characteristics of the worksite, residue characteristic confidence analyzer 1400 of residue characteristic confidence system 1330 determines a residue characteristic confidence level indicative of a confidence in the residue characteristics of the worksite or the residue characteristics of particular geographic locations within the worksite, as indicated by the prior residue map.

Processing proceeds at block 1534 where, based on the residue characteristic confidence level(s), residue characteristic confidence system 1330 generates residue characteristic confidence output(s). The residue characteristic confidence outputs can include representation(s) of the residue characteristic confidence level(s) as indicated by block 1536, maps as indicated by block 1538, as well as various other outputs, or combinations thereof, as indicated by block 1540. The representations(s) at block 1536 can include numeric representations, such as percentages or scalar values, as indicated by block 1542, gradation and/or scaled values, such A-F, "high, medium, low", 1-10, as indicated by block 1544, advisory representations, such as caution, proceed, slow, scout first, as indicated by block 1546, as well as various other representations, including various other metrics and/or values, or combinations thereof, as indicated by block 1548.

The maps at block 1538 can be generated by map generator(s) 1402 and can include corrected residue characteristic maps as indicated by block 1550, residue characteristic confidence maps as indicated by block 1552, as well as various other maps, as indicated by block 1554. In one example, other maps can include a map that includes both corrected residue characteristic information and residue characteristic confidence level(s). In another example, other maps can include a map that includes one or more of corrected residue characteristic information, residue characteristic confidence level(s), and/or residue characteristics as indicated by the prior residue map.

In one example, once residue characteristic confidence output(s) have been generated at block 1534, processing proceeds at block 1556 where action signal generator 1406 generates one or more action signal(s). In one example, action signals can be used to control the operation of one or more machines, such as controlling one or more controllable subsystems 1302 of mobile machine 100, controlling vehicles 1370, etc., as indicated by block 1558. For instance, action signal generator 1406 can generate action signals to control the speed of mobile machine 100, or the route (e.g., travel path) of mobile machine 100, adjust the position of a component of mobile machine 100, adjusting a speed of operation of a component of mobile machine 100, as well as controlling and/or adjusting a variety of other operating parameters or machine settings. In another example, a display, recommendation, or other indication can be generated to an operator 1362 on an operator interfaces 1360 or to a remote user 1366 on a user interface 1364, or both, as indicated by block 1560. The display can include an indication of the residue characteristic confidence level, a display of a map, such as a corrected residue characteristic map or a residue characteristic confidence map, or a map having one or more of corrected residue characteristics, residue characteristic confidence representations, and/or residue characteristics as indicated by the prior residue characteristic map. Any number of various other action signal(s) can be generated by action signal generator 1406 based on the residue characteristic confidence output(s), as indicated by block 1562.

Processing proceeds at block 1564 where it is determined whether the operation of mobile machine 100 is finished at the worksite. If, at block 1564, it is determined that the operation has not been finished, processing proceeds at block 1510 where additional supplemental data may be obtained. If, at block 1564, it is determined that the operation has been finished, then processing ends.

FIGS. 9-14 are pictorial illustrations of examples of the various maps that can be used by or generated by a residue characteristic confidence system 1330 shown in FIG. 7.

Figure 9:
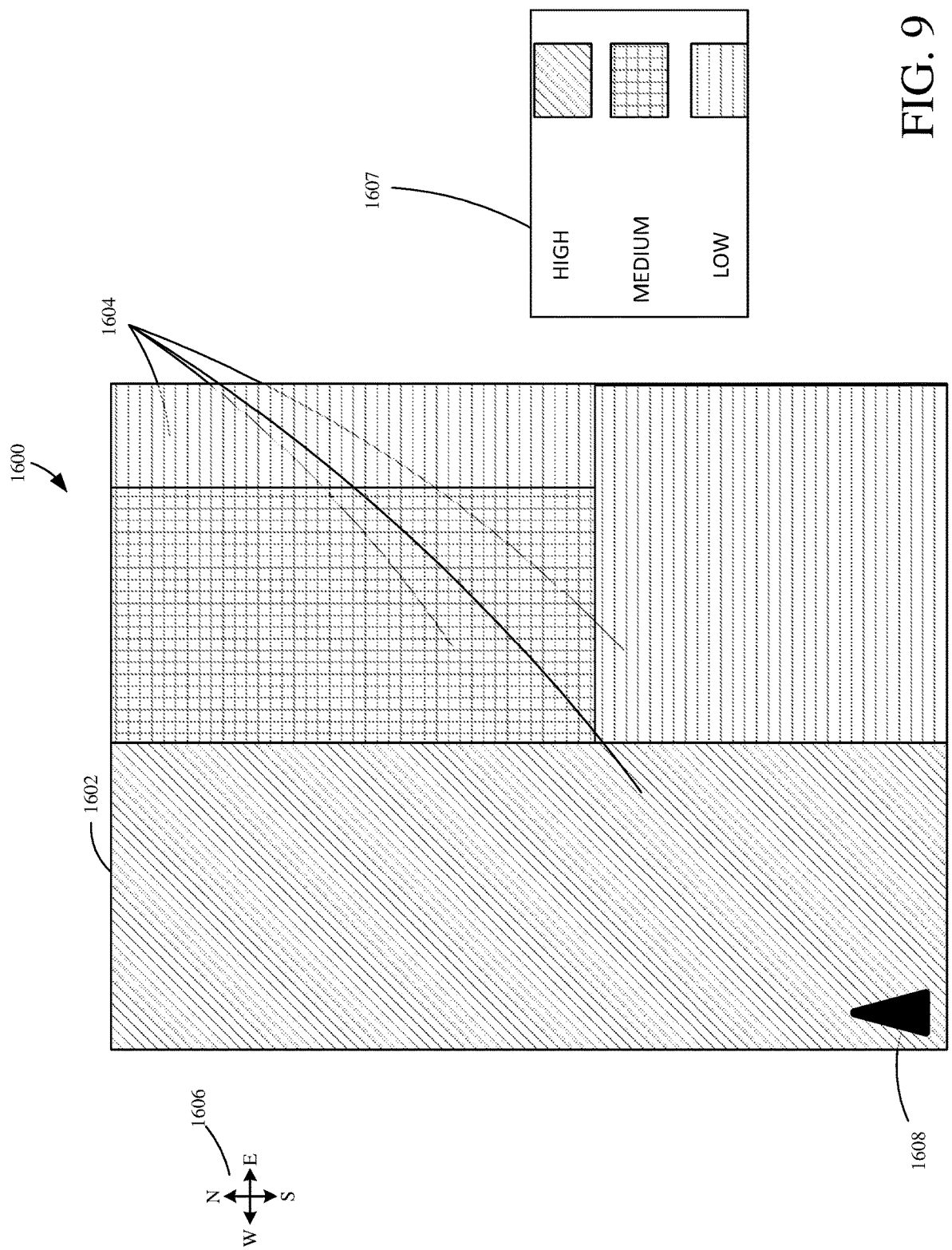
FIG. 9-14 are pictorial illustrations showing example maps that can be generated by the residue characteristic confidence system illustrated in FIG. 7.

FIG. 9 is one example of a prior (or baseline) residue map 1600 of a worksite that can be obtained and used by residue characteristic confidence system 1330. Residue map 1600 shows residue characteristics of worksite 1602 upon which mobile machine 100 is to operate. In the example illustrated in FIG. 9, residue map 1600 shows residue level (or amount) at different locations in the worksite. Residue map 1600 can include residue characteristic value representations 1604, compass rose 1606, legend 1607, and mobile machine indicator 1608. While certain items are illustrated in FIG. 9 it will be understood that the residue map 1600 can include various other items. Generally speaking, residue map 1600 indicates residue characteristics of worksite 1602 such as residue levels (or amounts) at worksite 1602 as indicated by residue characteristic value representations 1604 (illustratively shown as residue level (or amount) values). Residue map 1600 further includes compass rose 1606 to indicate the disposition of worksite 1602 and items on map 1600 or worksite 1602 relative to North, South, East, and West. Residue characteristic map 1600 further includes legend 1607 which provides a key to representations on map 1600, such as a key to residue characteristic value representations 1604, illustratively shown as representing "HIGH" (e.g., high level of residue), "MEDIUM" (e.g., medium level of residue), and "LOW" (e.g., low level of residue). While high, medium, and low are shown, various other representations can be utilized, such as other representations discussed herein. Additionally, while residue level (or amount) is illustrated as the residue characteristic of interest in FIG. 9 it is to be understood that various other residue characteristics (e.g., residue distribution, residue size, etc.) can also be used, alternatively or additionally. Residue map 1600 can further include an indication of the position and/or heading of mobile machine 100, as represented by indicator 1608 which is shown in the southwestern corner of worksite 1602 heading North. Additionally, while the residue characteristic value representations 1604 are organized in the form of zones in FIG. 9, in other examples, the residue characteristic value representations 1604 can further indicate, beyond a location of the residue characteristic values, row or pass data, such as organizing the residue characteristic values per row or per pass. For example, the residue characteristic value representations can organize the residue characteristic values by prospective passes or rows of the mobile machine 100, the prospective passes can be based on the location, heading (or route), and/or dimensions of the mobile machine 100.

Figure 10:
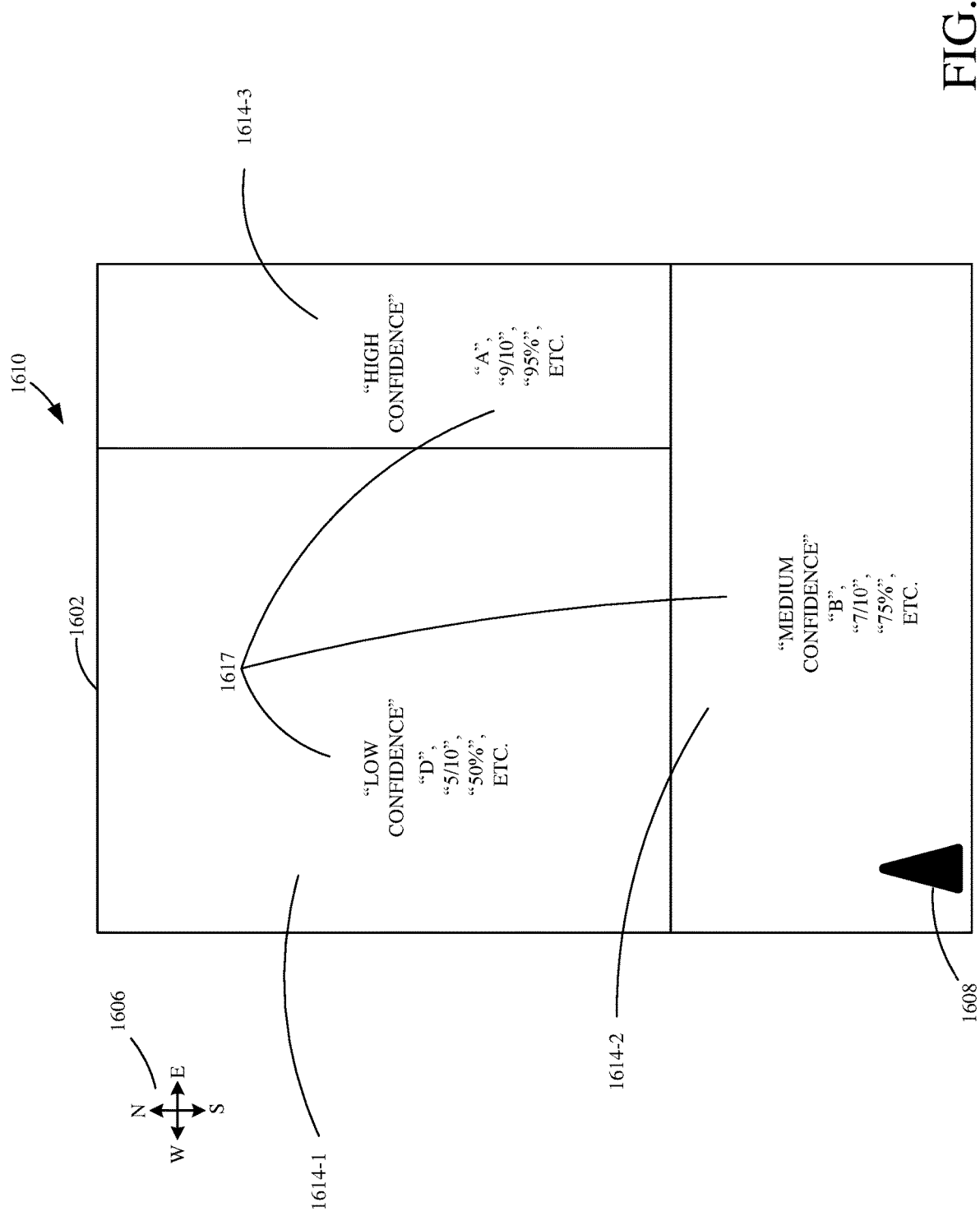

FIG. 10 is one example of a map 1610 that can be generated by residue characteristic confidence system 1330, based on a prior residue map, such as map 1600 and supplemental data relative to worksite 1602. In the illustrated example, map 1610 is a residue characteristic confidence map 1610 generated by residue characteristic confidence map generator 1442. Residue characteristic confidence map 1610 generally indicates a confidence level in the residue characteristics of worksite 1602 that are shown on residue map 1600. As can be seen, residue characteristic confidence map 1610 can include residue characteristic confidence zones 1614 (shown as 1614-1 to 1614-3) and residue characteristic confidence level representations 1617. A number of different examples of residue characteristic confidence level representations 1617 are shown in FIG. 10. For instance, FIG. 10 shows that representations 1617 can be numeric representations (e.g., 95%) as well as gradation and/or scaled representations (e.g., A-F, 1-10, "high, medium, low", etc.). As can be seen, the residue characteristic confidence level and the corresponding residue characteristic confidence level representations 1617 can vary across worksite 1602, as indicated by confidence zones 1614-1 to 1614-3.

In one example, residue characteristic confidence system 1330 may have received supplemental data indicating that worksite 1602 experienced high wind conditions over a period of time, and based on this supplemental data, residue characteristic confidence system 1330 can determine that a change in the residue characteristics (e.g., residue level (or amount)) of worksite and/or of particular geographic locations within worksite 1602 has occurred or has likely occurred. For example, based on the residue characteristics as indicated by residue map 1600 of worksite 1602 and the supplemental data (e.g., amount of wind, wind direction, wind duration, etc.), residue characteristic confidence system 1330 can determine that the area of the field represented by 1614-1 likely experienced a change in residue characteristic (e.g., residue level (amount)) due to the wind condition on worksite 1602 and thus indicates that the confidence level in the residue characteristics for that area is "low" (or some other representation). In one example, the area of the field represented by 1614-1 may be a high spot (or may have a higher elevation relative to the other areas of the field). If the supplemental weather data indicates that the field experienced high winds, confidence system 1330 may determine that the residue in the area of the field represented by 1614-1 likely moved, such as to other areas of the field or off the field.

In the same example, confidence system 1330 may determine that the residue characteristics in the area represented by 1614-3 are likely the same (or that there is a low likelihood of change) due to the wind conditions. For instance, it may be that the previous residue level (amount) in the area represented by 1614-3 was low, and that given the wind direction (e.g., coming out of the Northwest) it is unlikely that residue accumulated there. Thus, confidence system 1330 may determine that the residue level (amount) is likely still low in area 1614-3. Thus, the confidence level in the residue characteristics for area 1614-3 is "high" (or some other representation).

In the same example, confidence system 1330 may determine that the residue characteristics in the area represented by 1614-2 may have changed, but not to the same degree of likelihood as say area 1614-1. For example, given the wind speed and direction, there may be a higher degree of likelihood that some change has occurred in the residue characteristics of area 1614-2 than say area 1614-3. For example, the prior soil moisture levels of the area represented by 1614-2 may have relatively higher than other areas of the field, and thus, residue may be less likely to move from area 1614-2 in high wind conditions. However, it may be that residue from area 1614-1 shifted to and accumulated in area 1614-2. Thus, the confidence level in the residue characteristics for area 1614-2 is "medium" (or some other representation) as there may be some likelihood of change.

It will be noted that this is merely an example, and that various other characteristics relative to the worksite, including various other characteristics indicated by supplemental data, can be considered by residue characteristic confidence system 1330. Additionally, it is to be understood that residue characteristic confidence system 1330 can use any number of models in determining the residue characteristic confidence level, for instance, in the provided example, a residue shift model.

Figure 11:
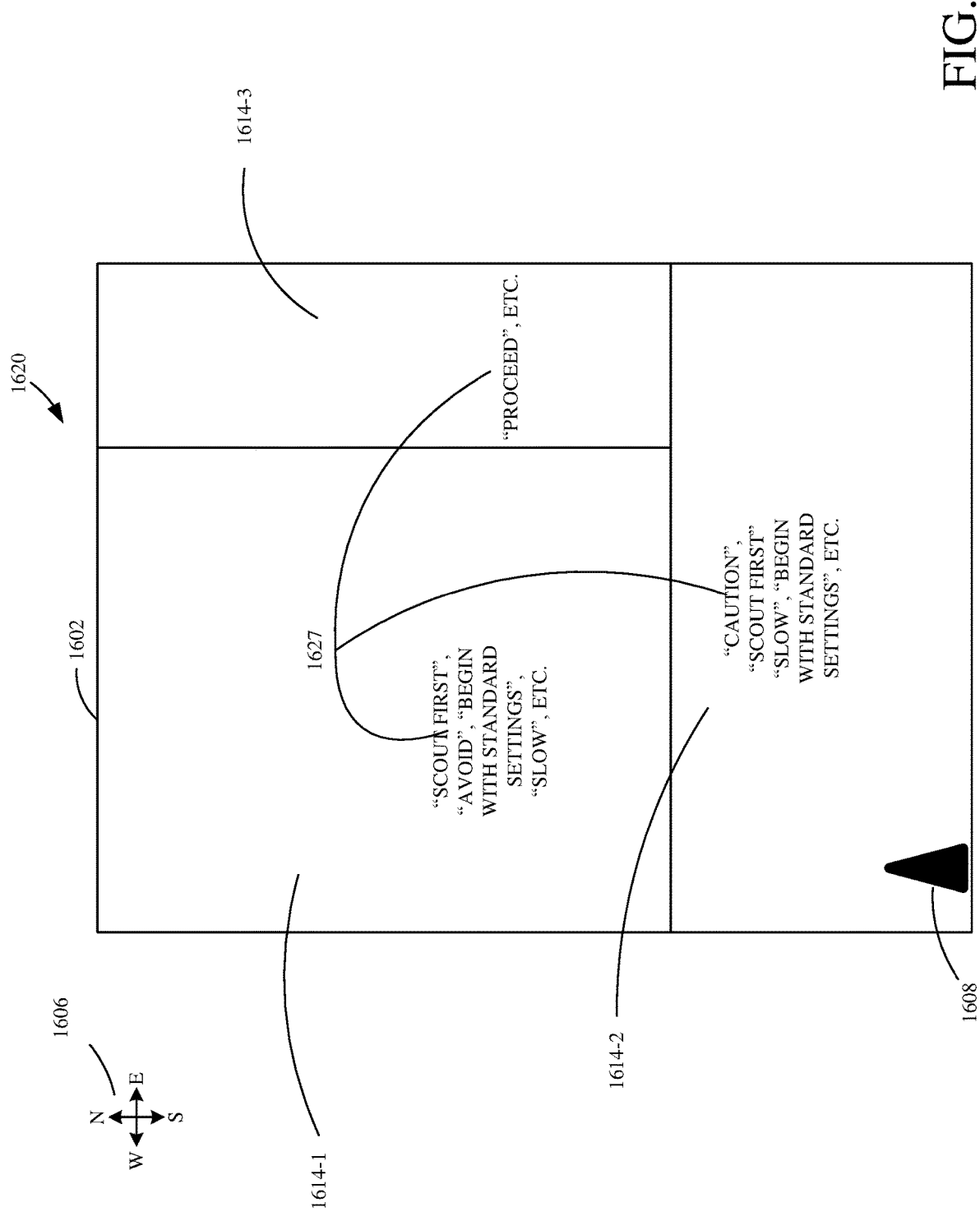

FIG. 11 is one example of a residue characteristic confidence map 1620 that can be generated by residue characteristic confidence system 1330, based on a prior residue map, such as map 1600 and supplemental data relative to worksite 1602. Residue characteristic confidence map 1620 is similar to residue characteristic confidence map 1610 except that the residue characteristic confidence level is represented by advisory residue characteristic confidence level representations 1627, which can indicate an action to be taken or a recommendation, such as a recommendation of an action to be taken either while operating on worksite 1602 or prior to operating on worksite 1602. As described above, the residue characteristic confidence level can vary across worksite 1602, as represented by residue characteristic confidence zones 1614 (shown as 1614-1 to 1614-3). Each of the zones 1614 can have a different advisory residue characteristic confidence level as represented by 1627. In this way, the control of machine 100 as it operates across worksite 1602 can also vary depending on which confidence zone 1614 machine 100 is operating in. In one example, confidence zones 1614 can act as "control zones" for mobile machine 100 such that mobile machine 100 is controlled in a certain manner in one control zone as compared to another control zone.

For example, proceeding with the previous example provided above in FIG. 10, in zone 1614-1 where it was determined that a change in the residue characteristics likely occurred, or at least that the confidence level in the residue characteristics as indicated by prior residue map 1600 is "low", residue characteristic confidence system 1330 can provide an advisory residue confidence level representation 1627, such as, "scout first", "avoid", "begin with standard settings", etc., as well as various other advisory representations. These advisory representations can be used to automatically control machine operation (e.g., by control system 1304) or can be used by the operator/user to control the operation of various machines, such as mobile machine 100, vehicles 1370, as well as various other components of computing architecture 1300.

For instance, in the example of "scout first", residue characteristic confidence system 1330 could generate an action signal to automatically control a vehicle (e.g., vehicles 1370) to travel to zone 1614-1 to collect further data (e.g., via sensors 1382) prior to mobile machine 100 operating in zone 1614-1, as well as generate an action signal to provide a display, alert, recommendation, or some other indication on an interface or interface mechanism (e.g., on operator interfaces 1360, user interfaces 1364, as well as various other interfaces or interface mechanisms) that zone 1614-1 should first be scouted (e.g., by a human, by a vehicle, etc.) prior to mobile machine 100 operating there. The indication can include audio, visual, or haptic outputs. In other examples, residue characteristic confidence system 1330 can generate a route and an action signal to automatically control a heading of mobile machine 100 such that it travels along the edge of zone 1614-1 but not into zone 1614-1. In such an example, the mobile machine 100 can perform a scouting operation such that, as it travels to (or along) the edge of zone 1614-1, sensors on-board mobile machine 100 (e.g., sensors 1310) or operator 1362 can detect characteristics within zone 1614-1 prior to operating within zone 1614-1. Residue characteristic confidence system 1330 can also generate an action signal to provide a display, alert, recommendation, or some other indication, such as a recommended route of mobile machine 100 across worksite 1602, on an interface or interface mechanism. The indication can include audio, visual, or haptic outputs. Once additional data for area 1614-1 is collected, the residue characteristic confidence level can be dynamically redetermined by confidence system 1330 such that operation on worksite 1602 can be adjusted. Additionally, in the event that the additional data has a sufficient level of certainty, residue characteristics of zone 1614-1 can be generated, such as in the form of a supplemental or corrected residue characteristic map.

In the example of "avoid", residue characteristic confidence system 1330 can generate a route and an action signal to automatically control a heading of mobile machine 100 such that it avoids traveling into zone 1614-1, and to generate an action signal to provide a display, alert, recommendation, or some other indication, such as a recommended route of mobile machine 100 across worksite 1602, on an interface or interface mechanism. The indication can include audio, visual, or haptic outputs.

In the example of "begin with standard settings", residue characteristic confidence system 1330 can generate action signals to automatically control subsystems of machine 100 to operate at standard settings, at least until further data is collected, such as by on-board sensors of machine 100, in area 1614-1. In the same example, confidence system 1330 may generate an action signal to provide a display, alert, recommendation, or some other indication, such as a recommendation to initially operate in area 1614-1 with standard settings. The indication can include audio, visual, or haptic outputs.

In the example of "slow", residue characteristic confidence system 1330 can generate action signals to automatically control a travel speed of machine 100 to travel at a relatively slow speed throughout zone 1614-1, or at least until further data is collected, such as by on-board sensors of machine 100, in area 1614-1. In the same example, confidence system 1330 may generate an action signal to provide a display, alert, recommendation, or some other indication, such as a recommendation to initially travel slowly in area 1614-1. The indication can include audio, visual, or haptic outputs.

In other examples, in areas of reduced confidence, control of the agricultural machine may be returned (if previously operating automatically or semiautomatically) to an operator and/or user such that the operator and/or user may observe the field (and characteristics thereof) in front of and/or around the agricultural machine, such as via sensor(s) (e.g., 1310, 1382, etc.), and control the machine according to what is observed.

In zone 1614-2 where, in the example of FIG. 10, it was determined that there was a possibility that a change in the residue characteristics of worksite 1602 occurred, or at least that the confidence level in the residue characteristics indicated by prior residue map 1600 is "medium", residue characteristic confidence system 1330 can provide an advisory residue characteristic confidence level representation 1627, such as, "scout first", "caution", "slow", or various other advisory representations. These advisory representations can be used to automatically control machine operation (e.g., by control system 1304) or can be used by the operator or user to control the operation of various machines, such as mobile machine 100, vehicles 1370, as well as various other components of computing architecture 1300.

For instance, in the example of "caution" or "slow", residue characteristic confidence system 1330 can generate an action signal to automatically control a machine (e.g., by controlling the propulsion subsystem 1318 of mobile machine 100) to travel at a slower speed throughout zone 1614-2 as compared to other zones or at a speed slow enough for sensor signals generated by sensors on-board the machine (e.g., sensors 1310) to be used to control the operation of the machine in a timely enough fashion to avoid consequences of varied residue characteristics on worksite 1602 in zone 1614-2. As an example, propulsion subsystem 1318 of mobile machine may be controlled to propel mobile machine 100 at a speed which allows a sensor signal generated by observation sensor system(s) 1342 indicative of upcoming residue characteristics, to be used to adjust one or more operating parameters of mobile machine 100 to account for the change in residue characteristics. Additionally, residue characteristic confidence system 1330 can generate an action signal to provide a display, alert, recommendation, or some other indication on an interface or interface mechanism, such as an indication to the operator or user that the speed of the machine should be reduced, an indication that the operator should pay particularly close attention to the worksite ahead of the machine, or various other indications. The indication can include an audio, visual, or haptic output.

In zone 1614-3, in the example of FIG. 10, it was determined that a change in the residue characteristics was unlikely, or at least that the confidence level in the residue characteristics, for the area represented by zone 1614-3, as indicated by prior residue map 1600 is "high". Therefore, residue characteristic confidence system 1330 can provide an advisory residue characteristic confidence level representation 1627, such as, "proceed" or various other advisory representations. For example, residue characteristic confidence system 1330 can generate an action signal to automatically control a machine (e.g., mobile machine 100) to operate based on the residue characteristics indicated by prior residue map 1600. Additionally, residue characteristic confidence system 1330 can generate an action signal to provide a display, alert, recommendation, or some other indication on an interface or interface mechanism to the operator or user so the operator or user can use prior residue map 1600 for operating mobile machine 100. The indication can include an audio, visual, or haptic output. Residue characteristic confidence system 1330 can generate control signals to control various other components of computing architecture 1300, as well as various other machines, at least while in zone 1614-3.

Indicator 1608 provides an indication of the location and heading of mobile machine 100 on worksite 1602, and, in some examples, residue characteristic confidence system can generate an action signal to control an operation of mobile machine 100 as well as to provide a display, alert, recommendation, or some other indication on an interface or interface mechanism based on the position of mobile machine 100 on worksite 1602. The indication can include an audio, visual, or haptic output. For instance, residue characteristic confidence system 1330 can automatically control the machine to change operation upon exit from one zone 1614 and entrance into another zone 1614, such as automatically adjusting an operating parameter of the machine upon exit from zone 1614-2 and entrance into zone 1614-1. Additionally, residue characteristic confidence system 1330 can provide an indication to the operator that the machine has entered a different zone.

Figure 12:
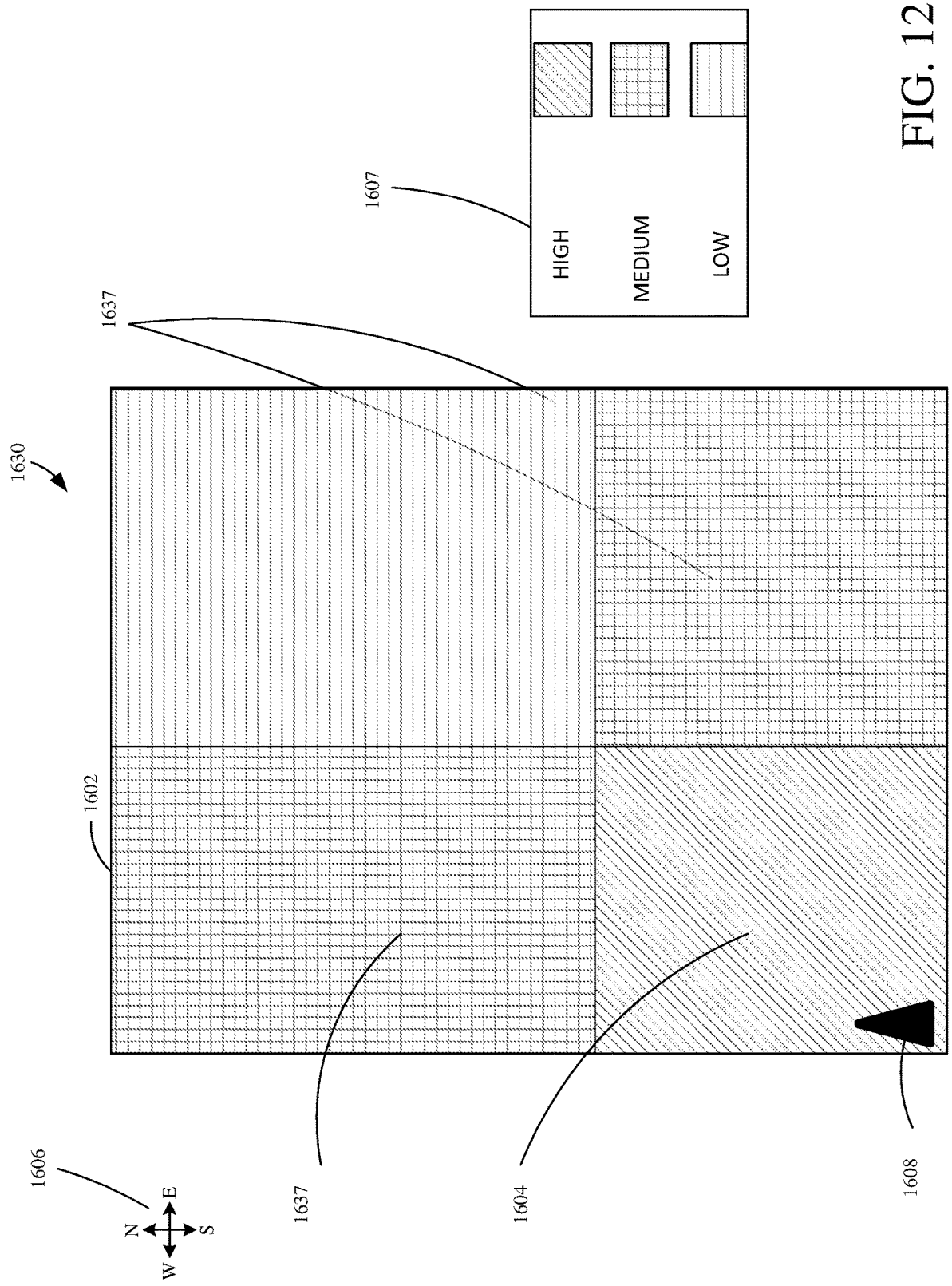

FIG. 12 is one example of a corrected (or supplemental) residue map 1630 of a worksite that can be generated by residue characteristic confidence system 1330, based on supplemental data relative to worksite 1602. As described above, in some instances the collected supplemental data will provide an accurate or relatively accurate indication of the residue characteristics of the worksite such that the actual or a substantial approximation of the actual residue characteristics of the worksite can be determined by residue characteristic confidence system 1330. For instance, a subsequent aerial survey of worksite 1602 (performed sometime after the data was collected for the prior residue map 1600) can provide sensor signal(s) (e.g., images) that provide accurate indications of the residue characteristics of worksite 1602. In one example, corrected residue characteristic map 1630 can be generated and used as a new baseline to replace prior residue map 1600. In another example, and particularly if corrected residue map 1630 is generated at a time close enough to the performance of the operation on worksite 1602, it can be used by control system 1304 or operator 1362 or user 1366 to control of mobile machine 100 as well as other components of agricultural system 1300.

As shown in FIG. 12, corrected residue map 1630 is similar to residue map 1600. Corrected residue map 1630 can include corrected residue characteristic value representations 1637 which indicate the corrected residue characteristics of worksite 1602 (e.g., corrected residue characteristic values, such as corrected residue level (amount) values). In the example shown, corrected residue map 1630 can also include residue characteristic value representations 1604 which remain unchanged from the prior map 1600. In some examples, the original representations (e.g., 1604) and the corrected representations (e.g., 1637) can be visually differentiated such that the operator and/or user can differentiate them (and thus their source). The representations can be differentiated in any number of ways, such as different colors, different fonts, different intensities, bolding, as well various other stylistic differences. Though not shown in FIG. 12, the previous representations (e.g., 1604) which have been corrected can also be displayed (or referenced) on corrected residue map 1630 and displayed in any number of ways to differentiate them, such as using dashed lines, different colors, as well as various other stylistic differences. In another example, the previous representations which have been corrected, need not be displayed. As illustrated in FIG. 12, corrected residue characteristic map 1630 shows that worksite 1602 experienced a change in residue characteristics, such as a change in the residue level (amount( ) for various areas of the worksite 1602.

Figure 13:
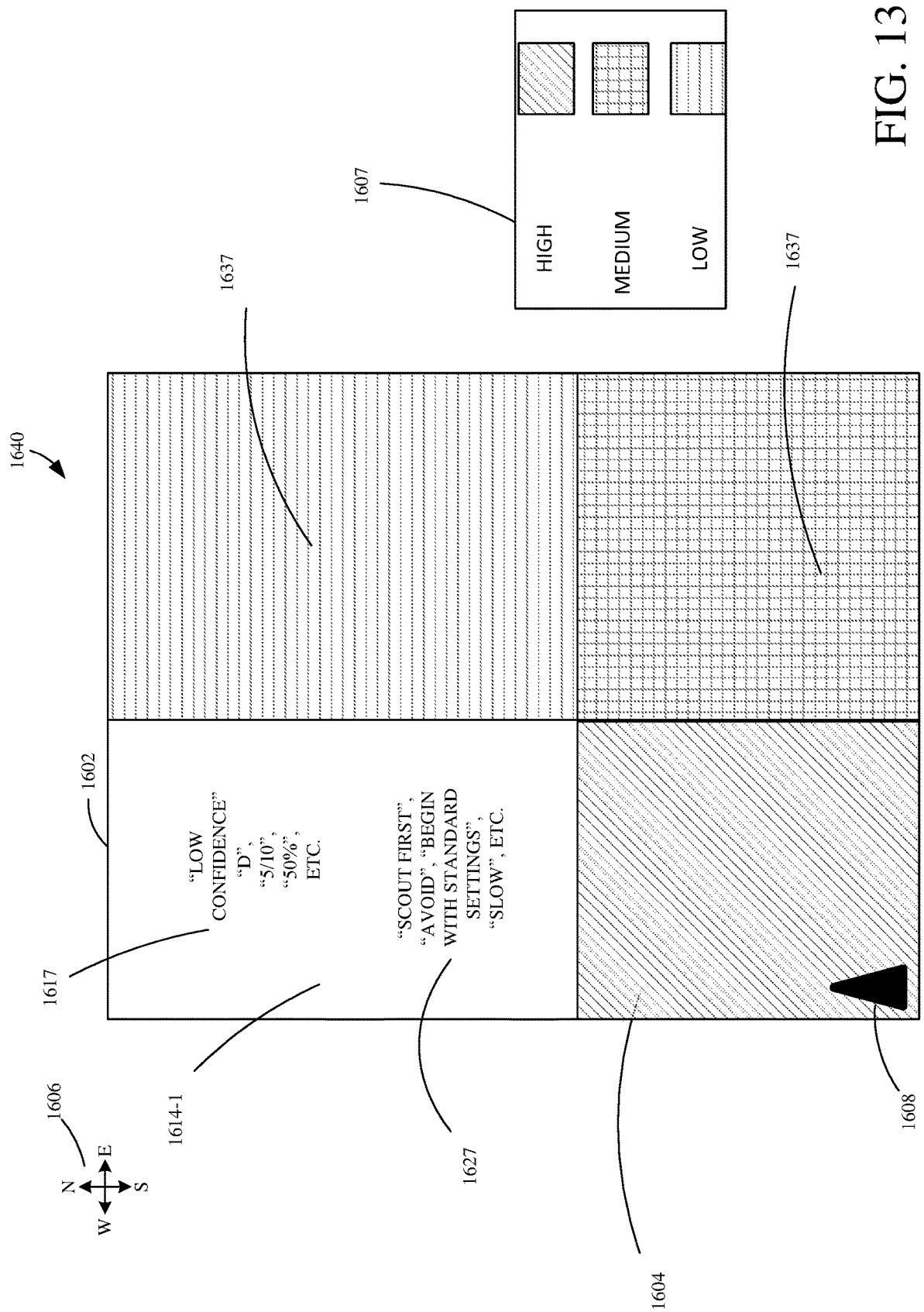

FIG. 13 is one example of a mixed residue map 1640 of a worksite that can be generated by residue characteristic confidence system 1330, based on a prior residue map, such as map 1600, and supplemental data relative to worksite 1602. In some examples, supplemental data can, for at least some areas of the worksite, provide indications of residue characteristics of worksite 1602 that are of a sufficient level of certainty or accuracy such that corrected residue characteristics can be generated, while for other areas of the worksite 1602 the supplemental data can be used to determine a confidence level in the residue characteristics as indicated by the prior residue map. For instance, in some areas of worksite 1602, the residue characteristics may be detectable such that the residue characteristic can be determined (e.g., can be accurately or reliably determined), while for other areas, the residue characteristics may not be detectable (or at least not reliably detectable). For example, obscurants (e.g., cloud cover) may prevent detection in some areas, while not preventing detection in other areas. In other examples, certain areas of the field may have been surveyed (e.g., by another machine, by a human, etc.) whereas other areas were not surveyed. In some examples, there may exist fixed sensors on the worksite 1602 in certain areas (or that can detect certain areas) but not in other areas. These are merely examples.

In such examples, a mixed residue map 1640 can be generated that includes both representations of corrected residue characteristics (as indicated by corrected residue characteristic representations 1637) as well as representations of residue characteristic confidence levels (as represented by confidence zones 1614 and confidence level representations 1617 and 1627). In this way, the operator or user can be provided with a map the indicates, for areas of the field where the residue characteristics are known to a certain level of accuracy or certainty (which can be based on a threshold as described above), the corrected residue characteristics and/or the original residue characteristics as indicated by the prior residue map. For areas of the field where the residue characteristics are not known to a certain level of accuracy or certainty map 1640 can show the confidence level in the residue characteristics indicated by the prior residue map.

Figure 14:
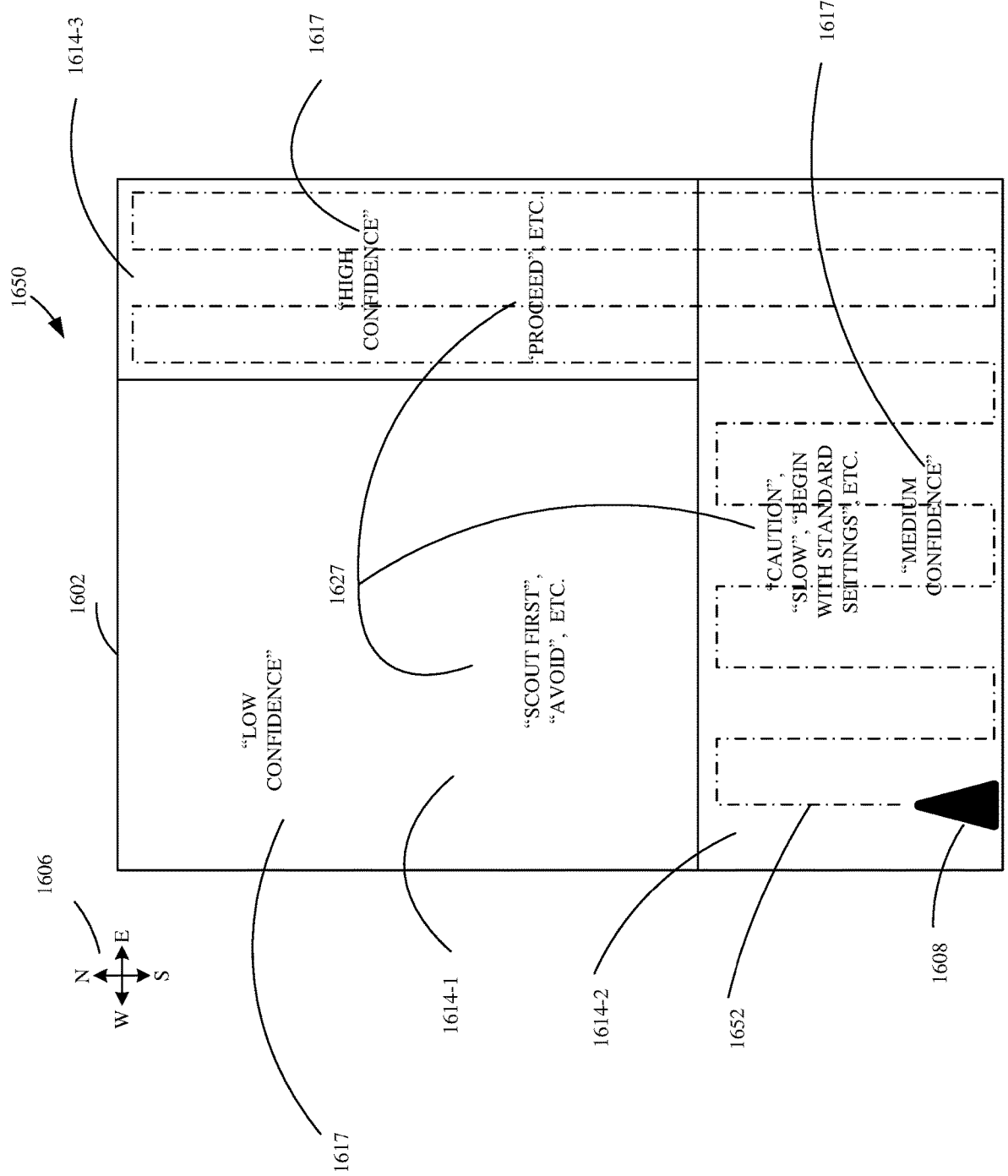

FIG. 14 is one example of a residue characteristic confidence map 1650 that can be generated by residue characteristic confidence system 1330, based on a prior residue map, such as map 1600, and supplemental data relative to worksite 1602. As illustrated, residue characteristic confidence map 1650 also includes an indication of a route 1652 generated by residue characteristic confidence system 1330 for a machine (e.g., mobile machine 100) to travel along. Route 1652 can be used by control system 1304 to automatically control the operation of mobile machine 100 as it travels across worksite 1602. For instance, route 1652 can be used by control system 1304 to generate an action signal to control one or more controllable subsystems 1302 of mobile machine 100, such as steering subsystem 1316 to control a heading of mobile machine 100 and propulsion subsystem 1318 to propel mobile machine 100 along route 1652.

Additionally, the control of mobile machine 100 can be varied as it operates across worksite 1602, based on its position within or proximity to confidence zones 1614. For example, in confidence zone 1614-3, mobile machine 100 can be controlled based on the residue characteristics indicated by a prior residue map, such as map 1600, because the residue characteristic confidence level representation 1617 is "high" and the advisory representation 1627 is "proceed". Whereas, in zone 1614-2, mobile machine 100 can be controlled to adjust speed (e.g., travel slower) because the residue characteristic confidence level representation 1617 is "medium" and the advisory representation 1627 is "slow". As can further be seen, route 1652 can direct mobile machine 100 to travel around and/or along the perimeter, or the edge of, but avoid travel into, zone 1614-1 as the residue characteristic confidence level representation 1617 is "low" and the advisory representation 1627 is "scout first" and/or "avoid". It should also be noted that route 1652 can be generated and displayed to an operator or a user, while the operation of the machine (e.g., the heading) is still controlled by the operator or user. In other examples, route 1652 may be used directly by a mobile machine operating in semi-autonomous or autonomous modes. Indicator 1608 can provide an indication of the position of the machine, and, in the case of operator or user control, can provide an indication of deviation from the recommended travel path (such as a line showing where the machine has actually traveled).

It will be noted that the various maps shown in FIGS. 9-14 do not comprise an exhaustive list and that residue characteristic confidence system 1330 can generate any number of maps that indicate any number of characteristics, conditions, and or items on or relative to a worksite. It will also be understood that any and all of the maps described above in FIGS. 9-14 can comprise map layers that can be generated by residue characteristic confidence system 1330 and can be displayed over other map layers (e.g., as an overlay), be displayed alongside other map layers (e.g., split screen), and/or individually selectable or toggleable by an operator or user, such as by an input on an actuatable input mechanism on a display screen (e.g., touch screen) on an interface mechanism. For instance, operator 1362 of mobile machine 100 may desire to switch between a display of the prior residue map 1600, the residue characteristic confidence map 1610, and the residue characteristic confidence map 1620 during operation. In this way, operator 1362 can be provided with an indication of what the last known residue characteristics were (e.g., via map 1600), what the residue characteristic confidence level across the worksite is (e.g., via map 1610), and what the advised operation of mobile machine 100 is across the worksite (e.g., via map 1620). In other examples, the maps can be combined such that features described and shown separately for each of the maps can be included on a single map.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It will also be that the various residue characteristic confidence outputs can be output to the cloud.

Figure 15:
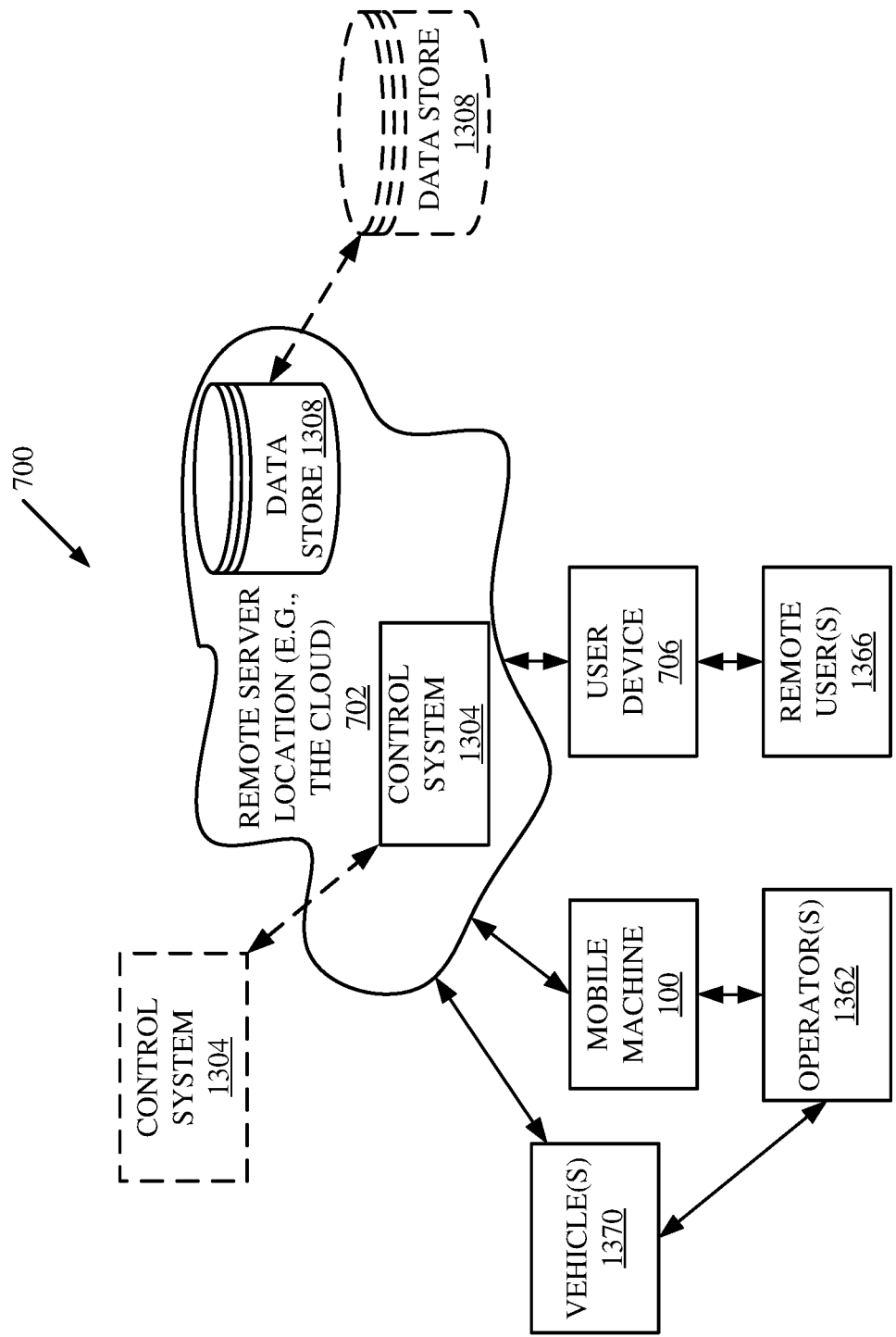
FIG. 15 is a block diagram showing one example of the architecture illustrated in FIG. 3 deployed in a remote server architecture.

FIG. 15 is a block diagram of a remote server architecture, which shows that components of agricultural system 1300 can communicate with elements in a remote server architecture, or that components of agricultural system 1300 can be located at a remote server location and can be accessed at the remote server location by other components of agricultural system 1300. In an example embodiment, remote server architecture 700 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 6 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 15, some items are similar to those shown in FIG. 6 and they are similarly numbered. FIG. 15 specifically shows that control system 1304 (or a portion thereof, such as residue characteristic confidence system 1330) can be located at a remote server location 702. Therefore, mobile machine 100, vehicles 1370, operator(s) 1362, and/or remote user(s) 1366, access those systems through remote server location 702.

FIG. 15 also depicts another embodiment of a remote server architecture. FIG. 15 shows that it is also contemplated that some elements of FIG. 6 are disposed at remote server location 702 while others are not. By way of example, data store 1308 or control system 1304 (or a portion of control system 1304, such as residue characteristic confidence system 1330) can be disposed at a location separate from location 702, and accessed through the remote server at location 702. Regardless of where they are located, they can be accessed directly by mobile machine 100, vehicles 1370, and/or operator(s) 362, as well as one or more remote users 1366 (via user device 706), through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the mobile machine comes close to the fuel truck for fueling, the system automatically collects the information from the mobile machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile machine until the mobile machine enters a covered location. The harvester, itself, can then send the information to the main network.

It will also be noted that the elements of FIG. 6 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 16:
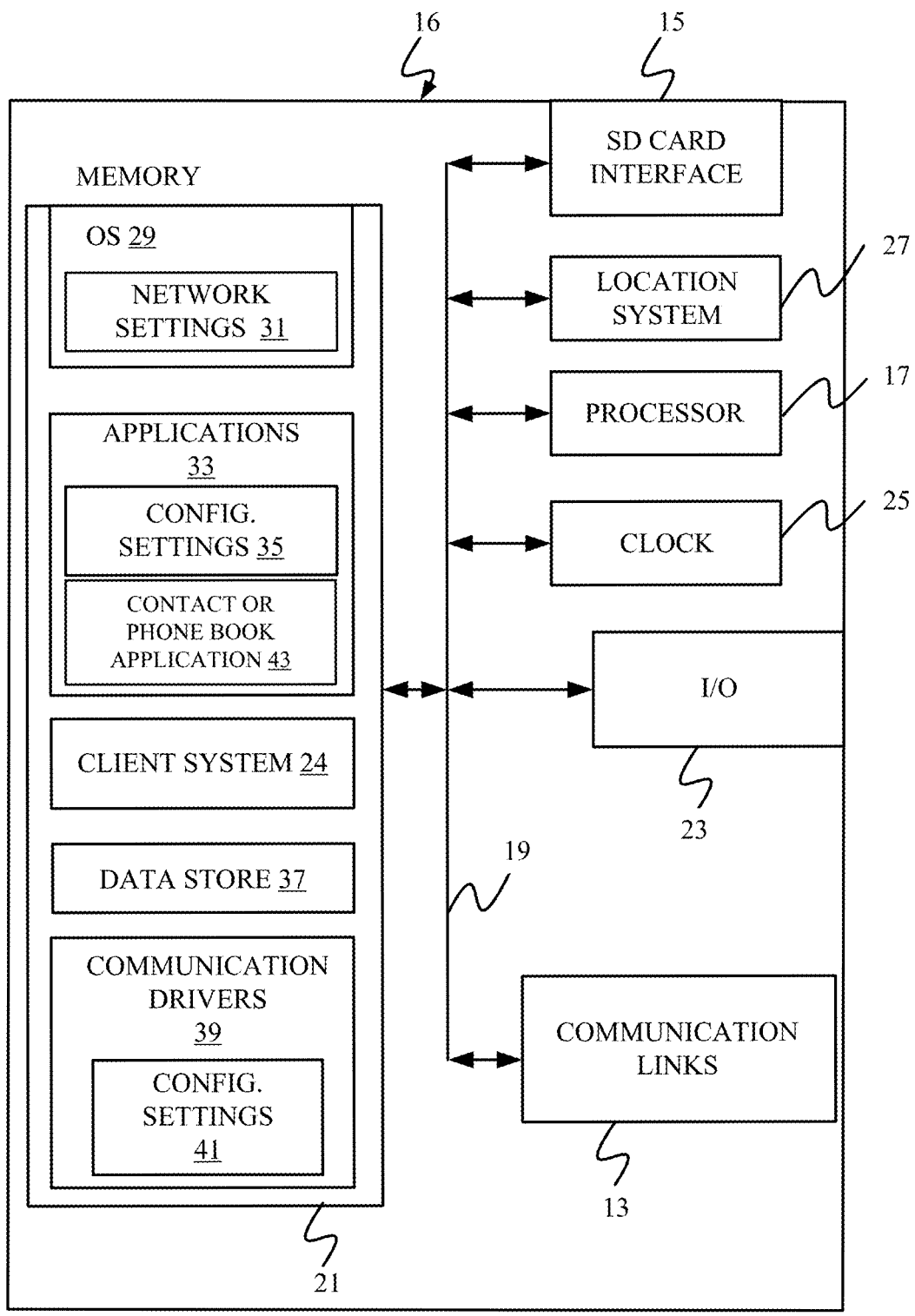
FIG. 16-18 show examples of mobile devices that can be used in the architecture(s) shown in the previous figure(s).
Figure 17:
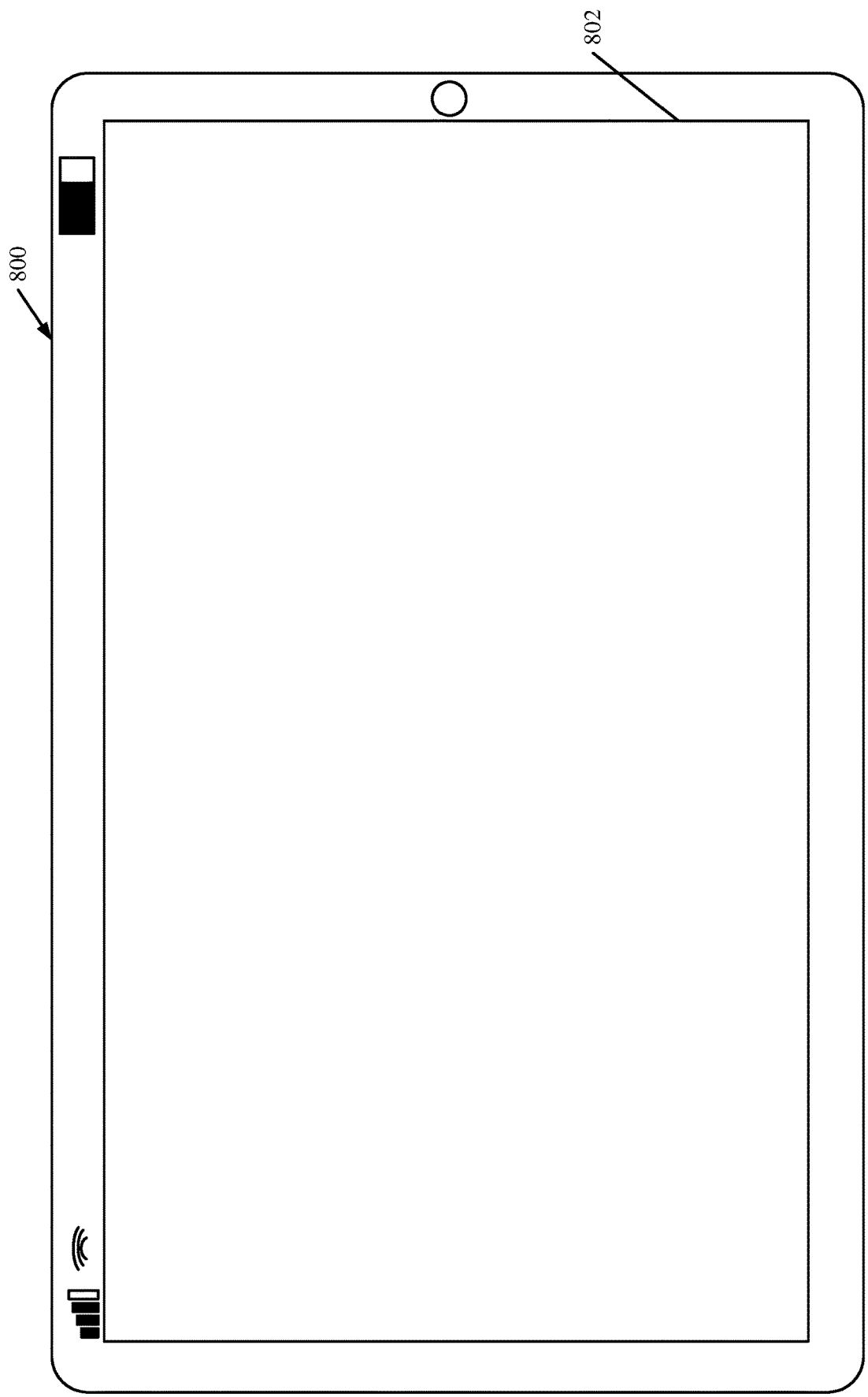
Figure 18:
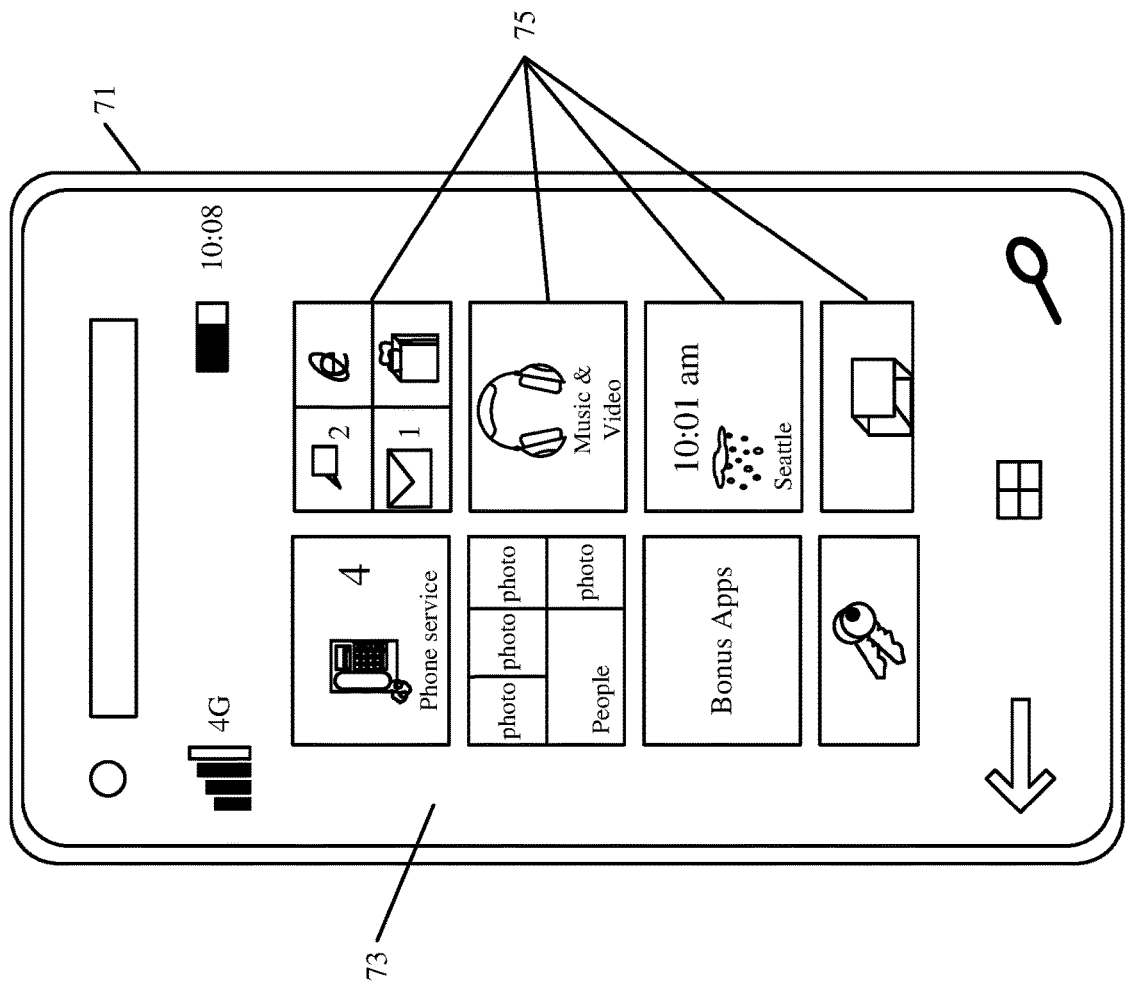

FIG. 16 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the residue characteristics, residue characteristic confidence outputs, as well as various other information. FIGS. 16-18 are examples of handheld or mobile devices.

FIG. 16 provides a general block diagram of the components of a client device 16 that can run some components shown in FIG. 6, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor(s) from previous FIGS. along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 17 shows one embodiment in which device 16 is a tablet computer 800. In FIG. 17, computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

FIG. 18 is similar to FIG. 17 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 19:
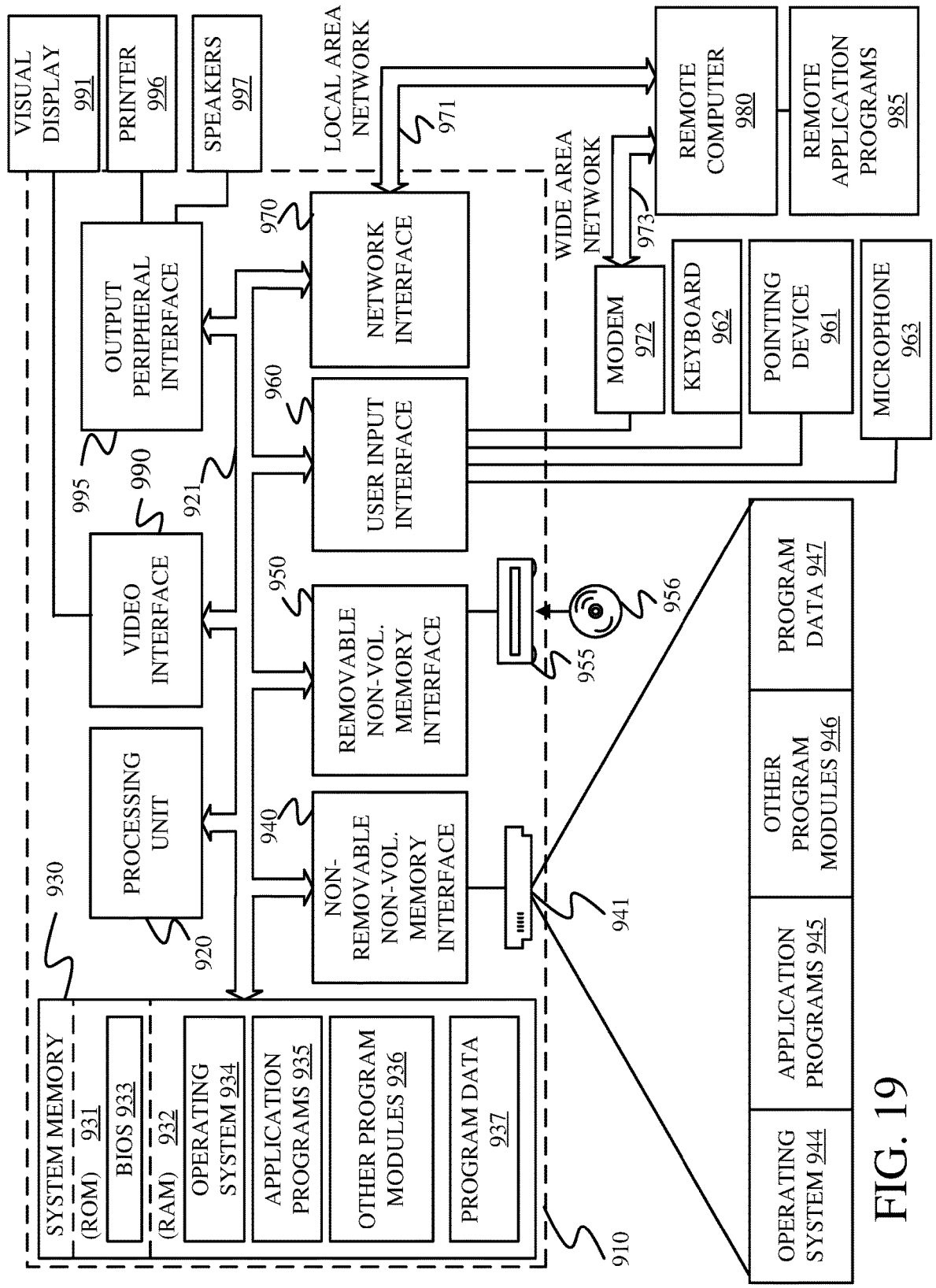
FIG. 19 is a block diagram showing one example of a computing environment that can be used in the architecture(s) shown in the previous figure(s).

FIG. 19 is one embodiment of a computing environment in which elements of FIG. 6, or parts of it, (for example) can be deployed. With reference to FIG. 19, an exemplary system for implementing some embodiments includes a general-purpose computing device in the form of a computer 910. Components of computer 910 may include, but are not limited to, a processing unit 920 (which can comprise processor(s) from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 6 can be deployed in corresponding portions of FIG. 19.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 19 illustrates operating system 934, application programs 935, other program modules 936, and program data 937.

The computer 910 may also include other removable/non-removable volatile/nonvolatile computer storage media. By way of example only, FIG. 19 illustrates a hard disk drive 941 that reads from or writes to non-removable, nonvolatile magnetic media, a magnetic disk drive 951, nonvolatile magnetic disk 952, an optical disk drive 955, and nonvolatile optical disk 956. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 910. In FIG. 19, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 19 illustrates, for example, that remote application programs 985 can reside on remote computer 980.

Further, example implementations of the invention(s) described herein may use one or more processors. If the implementation comprises multiple processors, they may be local or remote or a mixture, share information via wired, wireless, or utilizes a mixture of communication techniques, and/or fixedly or dynamically assign portions of computation to processors.

Processors may carry out their tasks with varying degrees of human supervision or intervention. Humans may be located at any appropriate process or communications node of the distributed system. Humans may be physically located on a work machine or at some other location. Example human interaction devices without limitation include screens, touch screens, wearable displays, audio or speech output such as ear buds or speakers, microphones, haptic output such as vibration or thermal devices, brain wave sensors, eye trackers, heart rate and other physiological sensors, or cameras for facial, gesture, or other body monitoring.

In some examples, processors can include systems-on-a-chip, embedded processors, servers, desktop computers, tablet computer, or cell phones.

In some embodiments, unauthorized monitoring, altering, or substitution of data communications are mitigated. Without limitation, example embodiments may partially or fully implement authentication of nodes sending or receiving data, wherein the authentication techniques may include, without limitation, physical unclonable functions (PUFs), encryption of data sent between nodes, and/or use of a distributed, immutable ledger of data updates (e.g., Blockchain), as well as various other authentication techniques, or combinations thereof.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a mobile agricultural machine, comprising:
    obtaining a residue map of a worksite that maps values of a residue characteristic to different geographic locations in a worksite, wherein the residue map is based on data collected at or prior to a first time;
    obtaining supplemental data indicative of a characteristic relative to the worksite, the supplemental data collected after the first time;
    generating, based on the residue map and the supplemental data, a residue characteristic confidence output indicative of a confidence level in a value of the residue characteristic of the worksite as indicated by the residue map, wherein the confidence level is indicative of a likelihood that the value of the residue characteristic, as indicated by the residue map, has changed; and
    controlling one or more controllable subsystems of the mobile agricultural machine based on the residue characteristic confidence output, wherein controlling the one or more controllable subsystems of the mobile agricultural machine based on the residue characteristic confidence output comprises one or more of:
        controlling an actuator of the mobile agricultural machine to drive movement of a component of the mobile agricultural machine to change a position of the component relative to a surface of the worksite based on the residue characteristic confidence output;
        controlling a propulsion subsystem of the mobile agricultural machine to control a travel speed of the mobile agricultural based on the residue characteristic confidence output; or
        controlling a steering subsystem of the mobile agricultural machine to control a heading of the mobile agricultural machine based on the residue characteristic confidence output.

2. The method of claim 1, wherein generating the residue characteristic confidence output comprises:
    generating a map of the worksite that includes an indication of the confidence level.

3. The method of claim 1, wherein generating the residue characteristic confidence output comprises:
    determining a plurality of confidence levels, wherein each one of the plurality of confidence levels is indicative of a likelihood that a respective value of the residue characteristic of a corresponding one of a plurality of geographic locations within the worksite, as indicated by the residue map, has changed.

4. The method of claim 3, and further comprising:
    determining a plurality of confidence zones, each one of the plurality of confidence zones corresponding to a respective one of the plurality of confidence levels, wherein an operation of the mobile agricultural machine is based on a presence of the mobile agricultural machine in one of the plurality of confidence zones.

5. The method of claim 1 and further comprising:
    controlling the mobile agricultural machine to collect additional data corresponding to the worksite.

6. The method of claim 1 and further comprising:
    controlling an interface mechanism communicably coupled to the mobile agricultural machine to provide an indication of the residue characteristic confidence output.

7. An agricultural system comprising:
    one or more processors; and
    memory storing instructions executable by the one or more processors that, when executed by the one or more processors, cause the one or more processors to:
        obtain a residue map of a worksite that indicates a value of a residue characteristic of the worksite, wherein the residue map is based on data collected at or prior to a first time;
        obtain supplemental data indicative of a characteristic relative to the worksite, the supplemental data collected after the first time and the characteristic relative to the worksite of a different type than the residue characteristic;
        generate, based on the residue map and the supplemental data, a residue characteristic confidence output indicative of a confidence level in the value of the residue characteristic of the worksite as indicated by the residue map, wherein the confidence level is indicative of a likelihood that the value of the residue characteristic, as indicated by the residue map, has changed; and
        control one or more controllable subsystem of the mobile agricultural machine based on the residue characteristic confidence output
    wherein the instructions, when executed by the one or more processors, cause the one or more processors to control one or more controllable subsystems of the mobile agricultural machine based on the residue characteristic confidence output by one or more of:
        controlling an actuator of the mobile agricultural machine to drive movement of a component of the mobile agricultural machine based on the residue characteristic confidence output;
        controlling a propulsion subsystem of the mobile agricultural machine to control a speed at which the mobile agricultural machine travels across the worksite based on the residue characteristic confidence output; or
        controlling a steering subsystem of het mobile agricultural machine to control a heading of the mobile agricultural machine based on the residue characteristic confidence output.

8. The agricultural system of claim 7, wherein the instructions, when executed by the one or more processors, further cause the one or more processors to
    determine a likelihood that the value of the residue characteristic of the worksite, as indicated by the residue map, has changed based on the supplemental data; and determine the confidence level based on the likelihood that the value of the residue characteristic of the worksite, as indicated by the residue map, has changed.

9. The agricultural system of claim 7, wherein the residue characteristic confidence output includes a representation of the residue characteristic confidence level.

10. The agricultural system of claim 7, wherein the memory storing instructions, when executed by the one or more processors, further cause the one or more processors to:
generate a map of the worksite that includes an indication of the confidence level.

11. The agricultural system of claim 7, wherein the instructions, when executed by the one or more processors, further cause the one or more processors to control an interface mechanism to provide a recommendation to collect additional data corresponding to the worksite.

12. The agricultural system of claim 7, wherein the residue characteristic comprises a first residue characteristic, wherein the residue map further indicates a value of a second residue characteristic, the second residue characteristic different than the first residue characteristic;
wherein the residue characteristic confidence output is indicative of a confidence level in the value of the first residue characteristic of the worksite, as indicated by the residue map, is based on the supplemental data and is based on the value of the second residue characteristic as indicated by the residue map.

13. A mobile agricultural machine configured to perform an operation at a worksite, the mobile agricultural machine comprising:
one or more controllable subsystems including one or more of: (i) an actuator controllable drive movement of a component of the mobile agricultural machine; (ii) a propulsion subsystem controllable to control a travel speed of the mobile agricultural machine; or (iii) a steering subsystem controllable to control a heading of the mobile agricultural machine; and
a control system configured to:
obtain a residue map of a worksite that indicates values of a residue characteristic at different geographic locations in the worksite, wherein the residue map is based on data collected at or prior to a first time, the first time prior to the operation;
obtain supplemental data indicative of one or more characteristics relative to the worksite, the supplemental data generated after the first time and prior to the operation;
generate a residue characteristic confidence output indicative of a confidence level in the values of the residue characteristic as indicated by the residue map, based on the residue map and the supplemental data; and
control the one or more controllable subsystems during the operation based on the residue characteristic confidence output.

14. The method of claim 1, wherein the residue characteristic comprises residue distribution and wherein generating the residue characteristic confidence output comprises determining the confidence level, wherein the confidence level is indicative of a likelihood that residue distribution at the worksite, as indicated by the residue map, has changed.

15. The method of claim 1, wherein the first time is prior to planting at the worksite in a current season.

* * * * *